US012611761B2

(12) United States Patent
Ghouse et al.

(10) Patent No.: US 12,611,761 B2
(45) Date of Patent: Apr. 28, 2026

(54) GRINDER INCLUDING ENHANCED SENSING AND COMPONENT DETECTION

(71) Applicant: MILWAUKEE ELECTRIC TOOL CORPORATION, Brookfield, WI (US)

(72) Inventors: Alexander C. Ghouse, Ixonia, WI (US); Zachary J. Evans, Waukesha, WI (US); Ihor Sahan, Wauwatosa, WI (US); Wesley S. Bassindale, Wauwatosa, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 425 days.

(21) Appl. No.: 18/058,625

(22) Filed: Nov. 23, 2022

(65) Prior Publication Data

US 2023/0158658 A1 May 25, 2023

Related U.S. Application Data

(60) Provisional application No. 63/418,136, filed on Oct. 21, 2022, provisional application No. 63/370,903, (Continued)

(51) Int. Cl.
*B25F 5/02* (2006.01)
*B25F 5/00* (2006.01)

(52) U.S. Cl.
CPC ................ *B25F 5/02* (2013.01); *B25F 5/001* (2013.01)

(58) Field of Classification Search
CPC .................................. B25F 5/02; B25F 5/001
See application file for complete search history.

(56) References Cited

U.S. PATENT DOCUMENTS 2,496,612 A 2/1950 Wilhide
2,545,659 A 3/1951 Ginter
(Continued)

FOREIGN PATENT DOCUMENTS

CA 3110144 A1 2/2020
CN 2074697 U 4/1991
(Continued)

OTHER PUBLICATIONS

International Search Report and Written Opinion for Application No. PCT/US2022/080436 dated Apr. 25, 2023 (13 pages).
(Continued)

*Primary Examiner* — Lucas E. A. Palmer
(74) *Attorney, Agent, or Firm* — Michael Best & Friedrich LLP

(57) ABSTRACT

A grinder including a housing, a motor within the housing, and a first handle attached to the housing and including a first sensor configured to detect the presence of a user. The grinder includes a second handle attached to a pivot arm, the pivot arm attached to the housing and configured to be pivoted around the circumference of the housing, the second handle including a second sensor configured to detect the presence of the user. The grinder includes a controller configured to control the motor based upon the detection of the presence of the user by the first sensor and second sensor, and wherein the controller prevents the motor from operating when second sensor does not detect the presence of the user.

17 Claims, 46 Drawing Sheets

Related U.S. Application Data filed on Aug. 9, 2022, provisional application No. 63/282,964, filed on Nov. 24, 2021.

(56) References Cited

U.S. PATENT DOCUMENTS

| | | | |
|---|---|---|---|
| 3,336,703 | A | 8/1967 | Multer |
| 3,811,228 | A | 5/1974 | Nagashima et al. |
| 4,071,980 | A | 2/1978 | Kubo |
| 4,091,698 | A | 5/1978 | Obear et al. |
| 4,276,675 | A | 7/1981 | Pioch |
| 4,467,676 | A | 8/1984 | Ikeda et al. |
| 4,811,882 | A | 3/1989 | Steeves et al. |
| 4,841,929 | A | 6/1989 | Tuggle et al. |
| 4,942,795 | A | 7/1990 | Linke et al. |
| 5,035,087 | A | 7/1991 | Nishiguchi et al. |
| 5,201,146 | A | 4/1993 | Fushiya |
| 5,264,739 | A | 11/1993 | Gundlach |
| 5,456,147 | A | 10/1995 | Stange, Jr. |
| 5,697,258 | A | 12/1997 | Aiyama |
| 5,725,422 | A | 3/1998 | Leweck |
| 6,155,916 | A | 12/2000 | Rudolf et al. |
| 6,241,594 | B1 | 6/2001 | Lepold |
| 6,364,580 | B1 | 4/2002 | Dils et al. |
| 6,487,756 | B1 | 12/2002 | Vidal, Jr. |
| 6,499,172 | B1 | 12/2002 | McCracken |
| 6,602,122 | B1 | 8/2003 | Rudolf et al. |
| 6,626,735 | B2 | 9/2003 | Ammi |
| 6,794,593 | B2 | 9/2004 | Kraenzler et al. |
| 6,949,017 | B2 | 9/2005 | Koschel et al. |
| 6,979,155 | B2 | 12/2005 | Dils et al. |
| 7,063,606 | B2 | 6/2006 | Stierle et al. |
| 7,108,079 | B2 | 9/2006 | Sakai et al. |
| 7,108,593 | B2 | 9/2006 | Janson |
| 7,124,470 | B2 | 10/2006 | Alanis |
| 7,150,587 | B2 | 12/2006 | Dils et al. |
| 7,178,248 | B2 | 2/2007 | Richards |
| 7,178,436 | B2 | 2/2007 | Wilson |
| 7,182,150 | B2 | 2/2007 | Grossman |
| 7,217,069 | B2 | 5/2007 | Dils et al. |
| 7,237,990 | B2 | 7/2007 | Deng |
| 7,253,541 | B2 | 8/2007 | Kovarik et al. |
| 7,282,818 | B2 | 10/2007 | Kovarik |
| 7,322,427 | B2 | 1/2008 | Shimma et al. |
| 7,357,526 | B2 | 4/2008 | Zeiler |
| 7,392,568 | B2 | 7/2008 | Koschel et al. |
| 7,402,093 | B2 | 7/2008 | Sjolander et al. |
| 7,431,682 | B2 | 10/2008 | Zeiler et al. |
| 7,443,296 | B2 | 10/2008 | Mezhinsky et al. |
| 7,458,882 | B2 | 12/2008 | Izmailov |
| 7,658,237 | B2 | 2/2010 | Rudolf et al. |
| 7,665,541 | B2 | 2/2010 | Sakai et al. |
| 7,681,661 | B2 | 3/2010 | Sakai et al. |
| 7,740,425 | B2 | 6/2010 | Zeiler et al. |
| 7,796,040 | B2 | 9/2010 | Mezhinsky et al. |
| 7,887,559 | B2 | 2/2011 | Deng et al. |
| 7,954,348 | B2 | 6/2011 | Forgues et al. |
| 7,955,162 | B2 | 6/2011 | Boeck et al. |
| 8,035,487 | B2 | 10/2011 | Malackowski |
| 8,069,765 | B2 | 12/2011 | Mcintosh et al. |
| 8,157,826 | B2 | 4/2012 | Deng et al. |
| 8,221,197 | B2 | 7/2012 | Boeck et al. |
| 8,231,436 | B2 | 7/2012 | Boeck et al. |
| 8,317,106 | B2 | 11/2012 | Black et al. |
| 8,393,835 | B2 | 3/2013 | Wasielewski |
| 8,454,411 | B2 | 6/2013 | Boeck et al. |
| 8,460,070 | B2 | 6/2013 | Boeck et al. |
| 8,465,348 | B2 | 6/2013 | Boeck et al. |
| 8,500,769 | B2 | 8/2013 | Deng |
| 8,511,399 | B2 | 8/2013 | Kunz |
| 8,535,342 | B2 | 9/2013 | Malackowski et al. |
| 8,562,395 | B2 | 10/2013 | Boeck et al. |
| 8,662,964 | B2 | 3/2014 | Hiller |
| 8,777,698 | B2 | 7/2014 | O'Shannessy |
| 8,833,485 | B2 | 9/2014 | Svennung et al. |
| 8,926,409 | B2 | 1/2015 | Nordstrom |
| 8,937,544 | B2 | 1/2015 | Rigsby et al. |
| 9,010,454 | B2 | 4/2015 | Neubauer et al. |
| 9,033,762 | B2 | 5/2015 | Makiuchi |
| 9,061,392 | B2 | 6/2015 | Forgues et al. |
| 9,089,952 | B2 | 7/2015 | Gatling et al. |
| 9,138,846 | B2 | 9/2015 | Svennung et al. |
| 9,179,977 | B2 | 11/2015 | Rigsby et al. |
| 9,256,988 | B2 | 2/2016 | Wenger et al. |
| 9,314,900 | B2 * | 4/2016 | Vanko .................... H02K 7/145 |
| 9,358,664 | B2 | 6/2016 | Ikuta |
| 9,406,915 | B2 | 8/2016 | White et al. |
| 9,415,499 | B2 | 8/2016 | Brotto et al. |
| 9,452,520 | B2 | 9/2016 | Sawano et al. |
| 9,464,893 | B2 | 10/2016 | Vanko et al. |
| 9,498,294 | B2 | 11/2016 | Rigsby et al. |
| 9,537,335 | B2 | 1/2017 | Furui et al. |
| 9,577,450 | B2 | 2/2017 | Yoshikawa et al. |
| 9,583,745 | B2 | 2/2017 | White et al. |
| 9,583,793 | B2 | 2/2017 | White et al. |
| 9,595,839 | B2 | 3/2017 | Furui et al. |
| 9,604,295 | B1 | 3/2017 | Halsey |
| 9,701,006 | B2 | 7/2017 | Borst |
| 9,707,026 | B2 | 7/2017 | Malackowski et al. |
| 9,751,185 | B2 | 9/2017 | Wolf et al. |
| 9,762,153 | B2 | 9/2017 | Forster et al. |
| 9,769,984 | B2 | 9/2017 | Osawa et al. |
| 9,769,985 | B2 | 9/2017 | Nakadate et al. |
| 9,769,990 | B2 | 9/2017 | Koizumi et al. |
| 9,776,315 | B2 | 10/2017 | Cannaliato et al. |
| 9,780,583 | B2 | 10/2017 | Furui et al. |
| 9,871,484 | B2 | 1/2018 | White et al. |
| 9,893,384 | B2 | 2/2018 | Velderman et al. |
| 9,917,457 | B2 | 3/2018 | Wenger et al. |
| 9,955,993 | B2 | 5/2018 | Deng |
| 9,962,807 | B2 | 5/2018 | Klee et al. |
| 9,987,694 | B2 | 6/2018 | Halsey |
| 9,998,893 | B2 | 6/2018 | Esenwein et al. |
| 10,040,178 | B2 | 8/2018 | Kondo et al. |
| 10,045,606 | B2 | 8/2018 | Cirincione, II et al. |
| 10,050,572 | B2 | 8/2018 | Pant et al. |
| 10,052,733 | B2 | 8/2018 | Ely et al. |
| 10,056,582 | B2 | 8/2018 | White et al. |
| 10,090,692 | B2 | 10/2018 | Yoshikawa et al. |
| 10,124,455 | B2 | 11/2018 | Ito et al. |
| 10,136,722 | B1 | 11/2018 | Cirincione, II et al. |
| 10,177,701 | B2 | 1/2019 | White et al. |
| 10,193,111 | B2 | 1/2019 | Varipatis et al. |
| 10,201,889 | B2 | 2/2019 | Morris et al. |
| 10,236,819 | B2 | 3/2019 | White et al. |
| 10,243,491 | B2 | 3/2019 | Cox et al. |
| 10,250,178 | B2 | 4/2019 | White et al. |
| 10,291,173 | B2 | 5/2019 | Cox et al. |
| 10,307,886 | B2 | 6/2019 | Arthur et al. |
| 10,322,502 | B2 | 6/2019 | Wirnitzer et al. |
| 10,333,453 | B2 | 6/2019 | Forster et al. |
| 10,333,454 | B2 | 6/2019 | Forster et al. |
| 10,361,651 | B2 | 7/2019 | White et al. |
| 10,391,622 | B2 | 8/2019 | Tanaka et al. |
| 10,396,573 | B2 | 8/2019 | Furui et al. |
| 10,406,718 | B2 | 9/2019 | Arthur et al. |
| 10,411,558 | B2 | 9/2019 | Forster et al. |
| 10,449,662 | B2 | 10/2019 | Moreau et al. |
| 10,469,006 | B2 | 11/2019 | Pant et al. |
| 10,486,281 | B2 | 11/2019 | Selfors et al. |
| 10,507,557 | B2 | 12/2019 | Meiser et al. |
| 10,523,087 | B2 | 12/2019 | Lewis et al. |
| D873,119 | S | 1/2020 | Moreau et al. |
| 10,541,639 | B2 | 1/2020 | White et al. |
| 10,608,574 | B2 | 3/2020 | White et al. |
| 10,615,733 | B2 | 4/2020 | Cox et al. |
| 10,625,409 | B2 | 4/2020 | Tanaka et al. |
| 10,630,223 | B2 | 4/2020 | Yamaguchi et al. |
| 10,658,903 | B2 | 5/2020 | Forster et al. |
| 10,661,423 | B2 | 5/2020 | Schlegel et al. |
| 10,680,494 | B2 | 6/2020 | Lewis et al. |
| 10,682,753 | B2 | 6/2020 | Numata |
| 10,706,640 | B2 | 7/2020 | Wenger et al. |
| 10,749,360 | B2 | 8/2020 | Furui et al. |
| 10,821,570 | B2 | 11/2020 | Tomonaga et al. |

(56) References Cited

U.S. PATENT DOCUMENTS 10,821,627 B2 11/2020 Hanussek et al.
10,840,559 B2 11/2020 Velderman et al.
10,857,645 B2 12/2020 Schadow et al.
10,883,660 B2 1/2021 Nishimiya et al.
10,894,310 B2 1/2021 Cannaliato et al.
10,960,509 B2 3/2021 Ely et al.
10,965,229 B2 3/2021 Pant
10,972,041 B2 4/2021 White et al.
10,978,746 B2 4/2021 Velderman et al.
11,020,846 B2 6/2021 Kawano et al.
11,114,870 B2 9/2021 Furui et al.
11,173,593 B2 11/2021 Moreau et al.
11,191,347 B1 12/2021 Krivda
11,207,756 B2 12/2021 Dey, IV et al.
11,212,909 B2 12/2021 Smith et al.
11,446,841 B2 9/2022 Kachi et al.
11,872,683 B2 1/2024 Nace et al.
11,919,141 B2 3/2024 Turner et al.
11,938,610 B2 3/2024 Öberg et al.
12,030,170 B2 * 7/2024 Kaneko ................. B24B 23/028
12,194,611 B2 1/2025 Nace et al.
12,202,097 B2 1/2025 Zhou et al.
2002/0054798 A1 5/2002 Dils et al.
2002/0131267 A1 9/2002 Van Osenbruggen
2002/0134811 A1 9/2002 Napier et al.
2003/0070822 A1 4/2003 Kanzaki et al.
2003/0093103 A1 5/2003 Malackowski et al.
2003/0116333 A1 * 6/2003 Voulkidis ............. B25D 17/043 173/104
2004/0060178 A1 4/2004 Willer et al.
2005/0136814 A1 6/2005 Rudolf et al.
2005/0161241 A1 * 7/2005 Frauhammer ........... B25F 5/026 173/1
2005/0239383 A1 10/2005 O'Shannessy
2006/0234617 A1 10/2006 Francis et al.
2007/0114049 A1 5/2007 Steverding et al.
2007/0117499 A1 5/2007 Chen
2007/0212991 A1 * 9/2007 Izmailov ................. B25F 5/026 451/359
2008/0034518 A1 2/2008 Lindroth
2008/0311795 A1 12/2008 Brotto et al.
2010/0064481 A1 * 3/2010 Martin .................... B25F 5/026 16/426
2010/0077898 A1 4/2010 Smith et al.
2010/0316457 A1 12/2010 Wasielewski
2011/0003541 A1 1/2011 Liu et al.
2011/0017030 A1 1/2011 Chambers
2011/0042533 A1 2/2011 Austin
2011/0088921 A1 4/2011 Forgues et al.
2011/0114345 A1 * 5/2011 Schlesak ................ B25D 17/00 173/1
2011/0133696 A1 6/2011 Scrimshaw et al.
2012/0279742 A1 11/2012 Roser
2013/0055860 A1 3/2013 French
2013/0160304 A1 6/2013 Tate
2013/0162188 A1 * 6/2013 Koeder ................. B23B 45/001 318/434
2014/0151079 A1 6/2014 Furui et al.
2014/0231113 A1 * 8/2014 Steurer ..................... B25F 5/00 173/1
2014/0270908 A1 9/2014 Hiller
2015/0148937 A1 5/2015 Wolf
2015/0170848 A1 6/2015 Kannan et al.
2015/0306747 A1 10/2015 Theureaux et al.
2016/0167186 A1 6/2016 Chan et al.
2016/0226278 A1 8/2016 Wenger et al.
2016/0329729 A1 11/2016 Brotto et al.
2016/0375570 A1 * 12/2016 Boeck ................ G05B 19/4062 700/169
2017/0008159 A1 * 1/2017 Boeck .................... G05B 19/00
2017/0072529 A1 3/2017 Yusou et al.
2017/0072533 A1 3/2017 Yoshizaki et al.
2017/0126051 A1 5/2017 Cox et al.
2017/0303984 A1 10/2017 Malackowski
2017/0338753 A1 11/2017 Forster et al.
2018/0009096 A1 1/2018 Grazioli et al.
2018/0090979 A1 3/2018 Forster et al.
2018/0178366 A1 6/2018 Matei
2018/0199955 A1 7/2018 Deng
2018/0236629 A1 8/2018 Gonzalez
2018/0248507 A1 8/2018 Vanko et al.
2018/0326554 A1 11/2018 Schadow et al.
2018/0345433 A1 12/2018 Sudo et al.
2019/0262972 A1 8/2019 Nakamura et al.
2019/0298122 A1 10/2019 Tahara et al.
2019/0308309 A1 10/2019 Gregorich et al.
2019/0341872 A1 11/2019 Cox et al.
2019/0341873 A1 11/2019 Cox et al.
2019/0358758 A1 11/2019 Ullrich et al.
2020/0030936 A1 1/2020 Knudson et al.
2020/0030938 A1 1/2020 Knudson et al.
2020/0030957 A1 1/2020 Heimrich
2020/0036307 A1 1/2020 Pant
2020/0055174 A1 2/2020 Matei
2020/0060744 A1 2/2020 Malackowski et al.
2020/0077775 A1 3/2020 Moreau et al.
2020/0078920 A1 3/2020 Ikeda
2020/0091797 A1 3/2020 Lewis et al.
2020/0122288 A1 4/2020 Kuhlmann
2020/0122292 A1 4/2020 Kuhlmann
2020/0133229 A1 4/2020 Girt et al.
2020/0162011 A1 5/2020 Cox et al.
2020/0180124 A1 6/2020 Ellice et al.
2020/0180132 A1 6/2020 Schlegel et al.
2020/0186006 A1 6/2020 Vanko et al.
2020/0194747 A1 6/2020 Rudolph et al.
2020/0203986 A1 6/2020 Barreau et al.
2020/0215676 A1 7/2020 Tanaka et al.
2020/0223029 A1 7/2020 Yoshida et al.
2020/0223053 A1 7/2020 Nick et al.
2020/0227695 A1 7/2020 Jones et al.
2020/0228046 A1 7/2020 White et al.
2020/0235694 A1 7/2020 White et al.
2020/0259395 A1 8/2020 Lewis et al.
2020/0266752 A1 8/2020 White et al.
2020/0316766 A1 10/2020 Machida
2020/0335834 A1 10/2020 Velderman et al.
2020/0343744 A1 10/2020 Furui et al.
2020/0382045 A1 12/2020 White et al.
2020/0384627 A1 12/2020 Numata
2020/0403553 A1 12/2020 White et al.
2020/0412294 A1 12/2020 Cox
2021/0023690 A1 1/2021 Lachica Koch et al.
2021/0039240 A1 2/2021 Iida
2021/0053175 A1 2/2021 Otani et al.
2021/0060756 A1 3/2021 Turner et al.
2021/0060757 A1 3/2021 Swaminathan et al.
2021/0107130 A1 4/2021 Yoshikane et al.
2021/0121967 A1 4/2021 Vetter
2021/0123737 A1 4/2021 Vetter
2021/0127327 A1 4/2021 Vetter et al.
2021/0170563 A1 6/2021 Cannaliato et al.
2021/0187697 A1 6/2021 Zhou. XI et al.
2021/0205976 A1 * 7/2021 Matei ........................ G08B 7/06
2021/0205977 A1 7/2021 Machida et al.
2021/0220959 A1 7/2021 Matsubara et al.
2021/0221022 A1 7/2021 Haas et al.
2021/0245353 A1 8/2021 Crowell et al.
2021/0251720 A1 8/2021 Jhaveri et al.
2021/0328399 A1 10/2021 Radtke et al.
2021/0331299 A1 10/2021 Ellice et al.
2021/0359444 A1 11/2021 Lienau et al.
2021/0367435 A1 11/2021 Furui et al.
2022/0063007 A1 3/2022 Widlroither et al.
2022/0285985 A1 * 9/2022 Sato ......................... H02J 50/60
2023/0119351 A1 4/2023 Sugiura et al.
2023/0139444 A1 * 5/2023 Kok ..................... H03K 17/962 324/686
2023/0158658 A1 5/2023 Ghouse et al.
2023/0166379 A1 6/2023 Suzuki
2024/0033894 A1 * 2/2024 Inage ...................... B25F 5/026

(56) References Cited

U.S. PATENT DOCUMENTS

| | | | | |
|---|---|---|---|---|
| 2024/0072690 A1* | 2/2024 | Ropella | .................... | H02K 5/02 |
| 2024/0278377 A1* | 8/2024 | Ropella | ................... | B25F 5/001 |
| 2024/0342871 A1* | 10/2024 | Chen | ..................... | B25B 21/004 |

FOREIGN PATENT DOCUMENTS

| | | | | |
|---|---|---|---|---|
| CN | 1079314 | C | 2/2002 | |
| CN | 2538463 | Y | 3/2003 | |
| CN | 200942512 | Y | 9/2007 | |
| CN | 100341653 | C | 10/2007 | |
| CN | 201226692 | Y | 4/2009 | |
| CN | 201239909 | Y | 5/2009 | |
| CN | 101579852 | A | 11/2009 | |
| CN | 101584288 | A | 11/2009 | |
| CN | 101607397 | A | 12/2009 | |
| CN | 101633144 | A | 1/2010 | |
| CN | 101745840 | A | 6/2010 | |
| CN | 201685165 | U | 12/2010 | |
| CN | 101120642 | B | 5/2012 | |
| CN | 102613013 | B | 7/2013 | |
| CN | 203156527 | U | 8/2013 | |
| CN | 104117893 | A | 10/2014 | |
| CN | 203936884 | U | 11/2014 | |
| CN | 104209866 | A | 12/2014 | |
| CN | 204308242 | U | 5/2015 | |
| CN | 204382032 | U | 6/2015 | |
| CN | 205870208 | U | 1/2017 | |
| CN | 206296780 | U | 7/2017 | |
| CN | 107443320 | A | 12/2017 | |
| CN | 108081141 | A | 5/2018 | |
| CN | 207593722 | U | 7/2018 | |
| CN | 207746863 | U | 8/2018 | |
| CN | 208084060 | U | 11/2018 | |
| CN | 208468027 | U | 2/2019 | |
| CN | 209335345 | U | 9/2019 | |
| CN | 209503762 | U | 10/2019 | |
| CN | 209648388 | U | 11/2019 | |
| CN | 110625575 | A | 12/2019 | |
| CN | 209774565 | U | 12/2019 | |
| CN | 210209874 | U | 3/2020 | |
| CN | 210232551 | U | 4/2020 | |
| CN | 210550226 | U | 5/2020 | |
| CN | 211220126 | U | 8/2020 | |
| CN | 211439409 | U | 9/2020 | |
| CN | 211615197 | U | 10/2020 | |
| CN | 211728698 | U | 10/2020 | |
| CN | 211760566 | U | 10/2020 | |
| CN | 111958435 | A | 11/2020 | |
| CN | 212020654 | U | 11/2020 | |
| CN | 212044060 | U | 12/2020 | |
| CN | 212095940 | U | 12/2020 | |
| CN | 110524493 | B | 4/2021 | |
| CN | 212918850 | U | 4/2021 | |
| CN | 213004531 | U | 4/2021 | |
| CN | 213795824 | U | 7/2021 | |
| CN | 214080771 | U | 8/2021 | |
| CN | 214135418 | U | 9/2021 | |
| CN | 216138684 | U | 3/2022 | |
| CN | 216371550 | U | 4/2022 | |
| CN | 216442263 | U | 5/2022 | |
| DE | 3229183 | A1 | 2/1984 | |
| DE | 3516099 | A1 | 11/1986 | |
| DE | 19507955 | A1 | 9/1996 | |
| DE | 10042178 | C1 | 12/2001 | |
| DE | 10115635 | C1 | 10/2002 | |
| DE | 20311904 | U1 | 10/2003 | |
| DE | 102004032789 | A1 | 2/2006 | |
| DE | 102008040570 | A1 | 1/2010 | |
| DE | 102010054744 | A1 | 6/2012 | |
| DE | 102011007403 | A1 | 10/2012 | |
| DE | 102012017376 | A1 | 12/2013 | |
| DE | 102012112832 | A1 | 6/2014 | |
| DE | 102013211997 | A1 | 1/2015 | |
| DE | 102013221323 | A1 | 4/2015 | |
| DE | 102012010077 | B4 | 9/2016 | |
| DE | 102015208252 | A1 | 11/2016 | |
| DE | 102015221685 | A1 | 5/2017 | |
| DE | 102005020409 | B4 | 3/2018 | |
| DE | 102017201560 | A1 | 8/2018 | |
| DE | 102017201563 | A1 | 8/2018 | |
| DE | 102017201565 | A1 | 8/2018 | |
| DE | 102017201567 | A1 | 8/2018 | |
| DE | 102017203218 | A1 | 8/2018 | |
| DE | 102018201006 | A1 | 7/2019 | |
| DE | 102018108068 | A1 | 10/2019 | |
| DE | 102018214811 | A1 | 3/2020 | |
| DE | 102016209215 | B4 | 7/2020 | |
| DE | 102018251705 | A1 | 7/2020 | |
| DE | 102018128241 | B4 | 12/2020 | |
| EP | 0558893 | B1 | 5/1996 | |
| EP | 1059025 | A2 | 12/2000 | |
| EP | 2292385 | A2 | 3/2011 | |
| EP | 2329923 | A2 | 6/2011 | |
| EP | 2641700 | A1 | 9/2013 | |
| EP | 2946710 | B1 | 8/2017 | |
| EP | 2656977 | B1 | 1/2019 | |
| EP | 3023196 | B1 | 3/2019 | |
| EP | 3495899 | A1 * | 6/2019 | ........... B24B 23/028 |
| EP | 3689542 | A1 | 8/2020 | |
| EP | 3892420 | A1 | 10/2021 | |
| EP | 3517254 | B1 | 11/2021 | |
| EP | 4327984 | A1 | 2/2024 | |
| GB | 2580886 | A | 8/2020 | |
| JP | 2009220213 | A2 | 10/2009 | |
| JP | 2013233636 | A2 | 11/2013 | |
| JP | 5805437 | B2 | 11/2015 | |
| JP | 5899471 | B2 | 4/2016 | |
| JP | 3214996 | U | 2/2018 | |
| JP | 2020192655 | A | 12/2020 | |
| WO | WO2005063451 | A1 | 7/2005 | |
| WO | WO2005072911 | A1 | 8/2005 | |
| WO | 2008009624 | A1 | 1/2008 | |
| WO | WO2009092672 | A1 | 7/2009 | |
| WO | WO2010067789 | A1 | 6/2010 | |
| WO | WO2013072201 | A2 | 5/2013 | |
| WO | 2017051892 | A1 | 3/2017 | |
| WO | WO2018166904 | A1 | 9/2018 | |
| WO | WO2018177932 | A1 | 10/2018 | |
| WO | WO2019002092 | A1 | 1/2019 | |
| WO | WO2019057639 | A1 | 3/2019 | |
| WO | WO2019068608 | A1 | 4/2019 | |
| WO | WO2019110303 | A1 | 6/2019 | |
| WO | WO2019137818 | A1 | 7/2019 | |
| WO | WO2020012746 | A1 | 1/2020 | |
| WO | WO2020054631 | A1 | 3/2020 | |
| WO | 2020216822 | A1 | 10/2020 | |
| WO | WO2020241086 | A1 | 12/2020 | |
| WO | WO2020260069 | A1 | 12/2020 | |
| WO | WO2020260079 | A1 | 12/2020 | |
| WO | WO2021024867 | A1 | 2/2021 | |
| WO | WO2021043558 | A1 | 3/2021 | |
| WO | WO2021069662 | A1 | 4/2021 | |
| WO | WO2021099221 | A1 | 5/2021 | |
| WO | WO2021111135 | A1 | 6/2021 | |
| WO | WO2021129978 | A1 | 7/2021 | |
| WO | WO2021166399 | A1 | 8/2021 | |
| WO | WO2021192850 | A1 | 9/2021 | |
| WO | WO2021206139 | A1 | 10/2021 | |

OTHER PUBLICATIONS

Fein, "CCG18-115BLPD-SEC and CCG18-125BLPD-SEC," Instruction Manual dated Feb. 14, 2022 (89 pages).

Fein Power Tools UK, "Fein Power Tools UK Display," <https://www.linkedin.com/posts/fein-industrial-power-tools-uk-ltd-_after-much-excitement-and-anticipation-behind-activity-6932326995007578112-Uo2T/#:%7E:text=A%E2%80%A6> LinkedIn post dated May 17, 2022 (3 pages).

Mills, LinkedIn post depicting a Fein Power Tools UK product video, <https://www.linkedin.com/posts/andy-mills-a166b74a_day-two-of-the-safety-health-expo-at-excel-activity-6932641890395688961-QMJe/?utm_source=share&utm_medium=member_desktop&rcm=

(56) References Cited

OTHER PUBLICATIONS

ACoAADlb8uoBnJ4Fgod7A3xAr3SfUTbXxhwIXPg> LinkedIn post dated May 18, 2022 (1 page).
Ota-Tuote Oy, "Fein is the Red Dot Design 2022 Winner," <https://www.otatuote.fi/ajankohtaista/fein-on-red-dot-design-2022-voittaja> article dated Mar. 29, 2022 (2 pages including English translation).
Tomorrow's Health and Safety, "Fein Launches Patented High-safety Angle Grinder," <https://www.tomorrowshs.com/products-and-services/fein-launches-patented-high-safety-angle-grinder> article dated May 24, 2022 (2 pages).
HSE Network, "Fein to set new construction sector standards with revolutionary reveal at Safety & Health Expo," <https://www.hse-network.com/fein-to-set-new-construction-sector-standards-with-revolutionary-reveal-at-safety-health-expo/> press release dated Apr. 2022 (3 pages).
Bauer, "20V Hypermax™ Lithium 18GA Brad Nailer," 20131C-B, Owner's Manual and Safety Instructions, @2020 (20 pages).
Stuart, "What's the Point of a Dual-Trigger Cordless Band Saw?" <https://toolguyd.com/dual-trigger-cordless-band-saws/> article dated Jan. 21, 2020 (5 pages).
Rosendin, "Rosendin and DeWalt Create New Dual Switch Design of Portable Band Saw to Increase Worksite Safety," <https://www.youtube.com/watch?v=oWyBOVQgUvs> video published to YouTube on May 1, 2019 (1 page).
Mashiter, LinkedIn post depicting Fein Power Tools UK products, <https://www.linkedin.com/posts/lauramashiter_pragencylife-pragency-powertools-activity-6932781463864004608-h811/?utm_source=share&utm_medium=member_desktop&rcm=ACoAAA319UwBE5onB1_OdiSeQMFyUYNJ_X76xgk> LinkedIn post dated May 18, 2022 (1 page).
Bouygues Construction, "Bouygues Construction and Fein Launch a very High-Safety Angle Grinder Developed Under an Exclusive Partnership," <https://mediaroom.bouygues-construction.com/bouygues-construction-and-fein-launch-a-very-high-safety-angle-grinder-developed-under-an-exclusive-partnership-2/> press release dated Mar. 28, 2022 (2 pages).
Bouygues Construction, "Bouygues Construction and Fein Join Forces to Develop a Very High Safety Angle Grinder for All Operators on Constructions Sites," <https://mediaroom.bouygues-construction.com/bouygues-construction-and-fein-join-forces-to-develop-a-very-high-safety-angle-grinder-for-all-operators-on-construction-sites/> press release dated Feb. 11, 2020 (2 pages).
Bouygues Construction, "Partnership Fein x Bouygues Construction," <https://www.youtube.com/watch?v=IXTjQR82Q4Q> video published to YouTube on Apr. 28, 2021 (1 page).
Fein, "FEIN Protago—safety angle grinder (work safety)" <https://www.youtube.com/watch?v=Wn9vMmXwtnM> video published to YouTube on Jun. 29, 2022 (1 page).

* cited by examiner

GRINDER INCLUDING ENHANCED SENSING AND COMPONENT DETECTION

RELATED APPLICATIONS

This applications claims the benefit of U.S. Provisional Patent Application No. 63/282,964, filed Nov. 24, 2021, U.S. Provisional Patent Application No. 63/370,903, filed Aug. 9, 2022, and U.S. Provisional Patent Application No. 63/418,136, filed Oct. 21, 2022, the entire content of each of which is hereby incorporated by reference.

FIELD

Embodiments described herein provide battery pack powered power tools.

SUMMARY

Embodiments described herein provide various systems and methods for operating a device, such as a grinder. Operating machinery, such as a grinder, presents a multitude of safety hazards for both a user and the user's surrounding environment. A grinder that includes systems and methods for improved safety by preventing or mitigating hazardous events from occurring is advantageous for a user of the grinder.

Embodiments described herein provide a grinder that includes a guard presence sensor for detecting the presence of a grind wheel guard on the grinder. If the guard is determined to not be present based on the output of the guard presence sensor, the grinder is prevented from operating. If the guard is determined to be present based on the output of the guard presence sensor, the grinder is permitted to operate. This prevents operation of the grinder unless the protective guard is properly attached.

In some embodiments, a grinder requires an operator to use two hands to operate the grinder. The presence of two hands of the operator is detected using sensors (e.g., grip or pressure sensors, touch sensors, electromechanical sensors, etc.). For example, one sensor can be located in the main body handle of the grinder (e.g., above an attached battery pack) to detect the operator's first hand. A second sensor can be positioned on the forward stabilizing second handle. The grinder may only be permitted to operate when the presence of both operator hands is detected on the grinder.

In some embodiments, the grinder includes loss of control mitigation. The grinder includes a sensor configured to detect a motion (e.g., linear, rotational, etc.) of the grinder that is indicative of a loss of control of the grinder. If a predetermined threshold of the motion is exceeded, loss of control is determined and the motor of the grinder is braked so that the user can regain control of the stopped grinder.

In some embodiments, the grinder includes a grinder wheel that can be used to grind (e.g., cut) through a workpiece. The grinder is configured to detect when the grinder has completed a cut through of the workpiece using operational parameters of the grinder. Once the grinder has been determined to have cut through a workpiece, the motor is stopped.

In some embodiments, the grinder can detect a type of component (e.g., a particular type of disk guard, a particular type of dust hood, etc.) connected to the grinder. The detection of the particular type of component connected to the grinder can be achieved using a sensor (e.g., an induction coil sensor, a Hall effect sensor, an optical sensor, wireless communication, etc.) for detecting the type of the component. After the grinder determines the particular type of component connected to the grinder, the grinder can take a control action based on the detected type of component connected to the grinder.

In some embodiments, the grinder includes a main power tool housing that includes a handle for being gripped by a user. The grinder also includes an accessory device attachment portion on the main power tool housing. The accessory device attachment portion is configured to receive an accessory device (e.g., a second handle to provide a second grip for an operator). Having an additional grip stabilizes the grinder and improves task efficiency and safety.

Grinders described herein include a housing, a motor within the housing, a first handle, a second handle, and a controller. The first handle includes a first sensor configured to detect a presence of a user. The first handle is attached to the housing. The second handle is attached to a pivot arm. The pivot arm is attached to the housing and is configured to be pivoted around a circumference of the housing. The second handle includes a second sensor configured to detect the presence of the user. The controller is configured to control the motor based upon the detection of the presence of the user by the first sensor and the second sensor. The controller prevents the motor from operating when second sensor does not detect the presence of the user by the second sensor.

In some aspects, the pivot arm further includes a locking mechanism. The locking mechanism is configured to lock the pivot arm into one of a plurality of different positions around the circumference of the housing.

In some aspects, the plurality of different positions around the circumference of the housing includes a left-handed position and a right-handed position.

In some aspects, the pivot arm further includes a pivot mechanism configured to pivot the second handle into one of a plurality of different positions with respect to the pivot arm.

In some aspects, the plurality of different positions with respect to the pivot arm include at least two discrete positions.

In some aspects, the second handle includes a microswitch sensor connected to a printed circuit board, the microswitch sensor configured to detect the presence of a second hand of the user.

In some aspects, the first sensor is configured to detect a first hand of the user, and the controller is configured to prevent the motor from operating if the first sensor does not detect the first hand of the user and the second sensor does not detect the second hand of the user.

In some aspects, the pivot arm further includes a wire routing portion through which wires are routed from the second handle to the housing.

In some aspects, the wire routing portion includes a first channel within the pivot arm and a second channel that extends into the housing.

In some aspects, the grinder further includes a wireless transmitter inside the second handle, and a wireless receiver inside the first handle. The wireless transmitter is configured to transmit a signal when the second sensor detects the presence of the user. The wireless receiver is configured to receive the signal and communicate to the controller that that the second sensor has detected the presence of the user.

In some aspects, the second sensor is configured to detect a second hand of the user, and the controller is configured to prevent the motor from operating if the second sensor does not detect the second hand of the user.

Methods described herein for operating a grinder include prohibiting, by a controller, the operation of the grinder, detecting, by a first sensor, a presence of a user's first hand, detecting, by a second sensor, the presence of the user's second hand, and controlling, by the controller, a motor of the power tool based on the first sensor detecting the presence of the user's first hand and the second sensor detecting the presence of the user's second hand.

In some aspects, the method further includes determining, by the controller, whether the second sensor has detected the presence of the user's second hand within a period of time after the first sensor detected the presence of the user's first hand.

In some aspects, the method further includes prohibiting, by the controller, the operation of the grinder if the second sensor has not detected the presence of the user's second hand within the period of time.

Grinders described herein include a housing, a motor located within the housing, a first handle, a second handle, a pivot mechanism, and a controller. The first handle includes a first sensor configured to detect the presence of a first hand of a user. The second handle is attached to a pivot arm. The pivot arm is attached to the housing and is configured to be pivoted around a circumference of the housing. The second handle includes a second sensor configured to detect the presence of a second hand of the user. The pivot mechanism is attached to the pivot arm and is configured to pivot the second handle into one of a plurality of different positions with respect to the pivot arm. The controller is configured to control the motor based upon the detection of the presence of the first hand of the user by the first sensor and the second hand of the user by the second sensor. The controller prevents the motor from operating when the second sensor does not detect the presence of the second hand of the user.

In some aspects, the pivot arm further includes a locking mechanism. The locking mechanism is configured to lock the pivot arm into one of a plurality of different positions around the circumference of the housing.

In some aspects, the plurality of different positions around the circumference of the housing includes a left-handed position and a right-handed position.

In some aspects, the plurality of different positions with respect to the pivot arm include at least two discrete positions.

In some aspects, the pivot arm further includes a wire routing portion through which wires are routed from the second handle to the housing.

In some aspects, the wire routing portion includes a first channel within the pivot arm and a second channel that extends into the housing.

Power tools described herein include a housing, a motor located within the housing, a first handle, a second handle including a sensor configured to detect a user characteristic, and a controller. The controller is configured to control the motor based on a signal from the sensor related to the user characteristic.

In some aspects, the power tool further includes a pivot arm configured to be pivoted into a plurality of different positions around a circumference of the housing.

In some aspects, the plurality of different positions around the circumference of the housing include a left-handed position and a right-handed position.

In some aspects, the power tool further includes a locking mechanism configured to secure the pivot arm into one of the plurality of different positions around the circumference of the housing.

In some aspects, the locking mechanism includes a switch biased into a locked position.

In some aspects, the locking mechanism includes a pivot joint configured to connect the pivot arm to the locking mechanism.

In some aspects, the pivot joint includes an aperture configured to receive a projection of the locking mechanism to lock the pivot arm into one of the plurality of different positions around the circumference of the housing.

In some aspects, the power tool further includes a pivot mechanism configured to pivot the second handle through a plurality of positions relative to the pivot arm.

In some aspects, the power tool further includes a component presence sensor configured to detect whether a component is connected to the power tool.

In some aspects, the power tool includes a component type indicator configured to provide an indication of the type of component connected to the power tool.

In some aspects, the component is a guard and the component presence sensor is a guard presence sensor.

In some aspects, the first handle includes a first switch operable to electrically connect a power source to the motor.

In some aspects, the power tool further includes the first switch is configured to function as a detector for detecting presence of a user's hand on the first handle.

In some aspects, the power tool further includes a second sensor configured to detect presence of a user's hand on the second handle.

In some aspects, the second sensor is one selected from the group consisting of: a grip sensor, a pressure sensor, a touch sensor, and an electromechanical sensor.

In some aspects, the power tool further includes a battery pack interface. The battery pack interface is configured to receive a rechargeable battery pack.

In some aspects, the power tool further includes a user input module. The user input module includes a display and an input device.

In some aspects, the display is configured to display a speed setting for the power tool, and the input device is configured to set the speed setting for the power tool.

In some aspects, the power tool further includes a second sensor configured to detect a fault condition of the power tool.

In some aspects, the second sensor is one selected from the group consisting of: a current sensor, a speed sensor, a Hall effect sensor, a temperature sensor, an accelerometer, a gyroscope, an inertial measurement unit, a pressure sensor, and an object presence sensor.

In some aspects, the controller is configured to detect at least one of a linear motion of the power tool or a rotational motion of the power tool.

In some aspects, a loss of control of the power tool is detected based on the at least one of the linear motion of the power tool or the rotational motion of the power tool.

In some aspects, the second handle includes a printed circuit board, the printed circuit board including one or more microswitch sensors.

In some aspects, the microswitch sensor is configured to detect the user characteristic.

In some aspects, the user characteristic is a presence of a user's hand.

In some aspects, the user characteristic is a grip force greater than a threshold value.

In some aspects, the second handle includes a second microswitch sensor configured to detect the user characteristic.

In some aspects, the power tool further includes an internal wire routing portion configured to provide a wired electrical connection between the second handle and the housing.

In some aspects, the wire routing portion includes a includes a first channel within the second handle, a second channel within a pivot mechanism of the second handle, and a third channel within a pivot arm of the power tool.

In some aspects, the wire routing portion includes a fourth channel within the housing configured to route a wire to a connector for electrically connecting the wire to the controller.

In some aspects, the second handle includes a first electrical contact and a second electrical contact configured to electrically connect to electrical contacts on the housing.

In some aspects, the first electrical contact and the second electrical contact are spring-loaded electrical contacts.

In some aspects, the housing includes a plurality of rails configured to slidingly receive corresponding rails of the second handle.

In some aspects, the housing includes a second plurality of rails configured to sliding receive the corresponding rails of the second handle.

In some aspects, the second plurality of rails are located on an opposite side of the housing than the plurality of rails.

In some aspects, the second handle includes a threaded screw for fastening the second handle to the housing.

In some aspects, the power tool further includes a pivoting mechanism connected between the second handle and the housing.

In some aspects, the pivoting mechanism is configured to pivot the second handle through a plurality of positions relative to the housing.

In some aspects, the plurality positions includes at least two pivoting positions relative to the housing.

In some aspects, the power tool is a grinder.

Power tools described herein include a housing, a motor located within the housing, a handle, a component presence sensor configured to detect whether a component is connected to the power tool, and a controller. The controller is configured to control the motor based on a signal from the component presence sensor related to whether component is connected to the power tool.

In some aspects, the power tool includes a component type indicator configured to provide an indication of the type of component connected to the power tool.

In some aspects, the component is a guard and the component presence sensor is a guard presence sensor.

In some aspects, the component presence sensor is an inductive sensor.

In some aspects, the inductive sensor includes an inductor capacitor circuit connected to an inductance-to-digital converter.

In some aspects, the inductance-to-digital converter is configured to measure a proximity to metal based on changes in an alternative current magnetic field resulting from an interaction with a metal target.

In some aspects, the metal target is component connected to the power tool.

In some aspects, the component is a guard connected to the power tool.

In some aspects, the component presence sensor is an electromechanical sensor that is configured to be actuated when the component is coupled to the power tool.

In some aspects, the component present sensor is an optical sensor that is configured to detect light reflecting off of the component to detect presence.

Power tools described herein include a housing, a motor located within the housing, a wireless receiver, a first handle, a second handle including a wireless transmitter configured to communicate with the wireless receiver, and a controller. The controller is configured to control the motor based on the wireless communication between the wireless transmitter and the wireless receiver.

In some aspects, the second handle includes a battery configured to power the wireless transmitter.

In some aspects, the second handle is electrically isolated from the housing.

Methods described herein for operating a power tool include prohibiting operation of the power tool, detecting a first user hand on a first handle of the power tool, detecting a second user hand on a second handle of the power tool, and allowing operation of the power tool when both the first user hand is detected on the first handle and the second user hand is detected on the second user handle. Detecting the second user hand on the second handle of the power tool includes detecting a user characteristic using a sensor.

In some aspects, the method further includes pivoting a pivot arm into a plurality of different positions around a circumference of a housing of the power tool.

In some aspects, the plurality of different positions around the circumference of the housing include a left-handed position and a right-handed position.

In some aspects, the method further includes securing, using a locking mechanism, the pivot arm into one of the plurality of different positions around the circumference of the housing.

In some aspects, the method further includes the locking mechanism includes a switch biased into a locked position.

In some aspects, the locking mechanism includes a pivot joint configured to connect the pivot arm to the locking mechanism.

In some aspects, the method further includes receiving, at an aperture of the pivot joint, a projection of the locking mechanism to lock the pivot arm into one of the plurality of different positions around the circumference of the housing.

In some aspects, the method further includes pivoting, using a pivot mechanism, the second handle through a plurality of positions relative to the pivot arm.

In some aspects, the method further includes detecting, using a component presence sensor, whether a component is connected to the power tool.

In some aspects, the method further includes indicating, using a component type indicator, the type of component connected to the power tool.

In some aspects, the component is a guard and the component presence sensor is a guard presence sensor.

In some aspects, the first handle includes a first switch operable to electrically connect a power source to the motor.

In some aspects, the method further includes detecting, using the first switch, presence of a user's hand on the first handle.

In some aspects, the method further includes detecting, using a second sensor, presence of a user's hand on the second handle.

In some aspects, the second sensor is one selected from the group consisting of: a grip sensor, a pressure sensor, a touch sensor, and an electromechanical sensor.

In some aspects, the method further includes receiving, at a battery pack interface, a rechargeable battery pack.

In some aspects, the power tool includes a user input module, the user input module including a display and an input device.

In some aspects, the method further includes displaying, using the display, a speed setting for the power tool, and setting, using the input device, a speed setting for the power tool.

In some aspects, the method further includes detecting, using a second sensor, a fault condition of the power tool.

In some aspects, the second sensor is one selected from the group consisting of: a current sensor, a speed sensor, a Hall effect sensor, a temperature sensor, an accelerometer, a gyroscope, an inertial measurement unit, a pressure sensor, and an object presence sensor.

In some aspects, the method further includes detecting, using a controller, at least one of a linear motion of the power tool or a rotational motion of the power tool.

In some aspects, the method further includes detecting a loss of control of the power tool based on the at least one of the linear motion of the power tool or the rotational motion of the power tool.

In some aspects, the second handle includes a printed circuit board, the printed circuit board including a microswitch sensor.

In some aspects, the method further includes detecting, using the microswitch sensor, the user characteristic.

In some aspects, the user characteristic is a presence of a user's hand.

In some aspects, the user characteristic is a grip force greater than a threshold value.

In some aspects, the method further includes detecting, using a second microswitch sensor, the user characteristic.

In some aspects, the method further includes providing, via an internal wire routing portion, a wired electrical connection between the second handle and the housing.

In some aspects, the wire routing portion includes a includes a first channel within the second handle, a second channel within a pivot mechanism of the second handle, and a third channel within a pivot arm of the power tool.

In some aspects, the wire routing portion includes a fourth channel within the housing, and the method further includes routing, through the fourth channel, a wire to a connector for electrically connecting the wire to a controller.

In some aspects, the method further includes electrically connecting, using a first electrical contact and a second electrical contact of the second handle, the second handle to electrical contacts on the housing.

In some aspects, the first electrical contact and the second electrical contact are spring-loaded electrical contacts.

In some aspects, the method further includes slidingly receiving, at a plurality of rails of the housing, corresponding rails of the second handle.

In some aspects, the method further includes slidingly receiving, at a second plurality of rails of the housing, the corresponding rails of the second handle.

In some aspects, the second plurality of rails are located on an opposite side of the housing than the plurality of rails.

In some aspects, the method further includes fastening, using a threaded screw of the second handle, the second handle to the housing.

In some aspects, the power tool incudes a pivoting mechanism connected between the second handle and the housing.

In some aspects, the method further includes pivoting, using the pivoting mechanism, the second handle through a plurality of positions relative to the housing.

In some aspects, the plurality positions includes at least two pivoting positions relative to the housing.

In some aspects, the power tool is a grinder.

Methods described herein for detecting a presence of an accessory on a power tool include monitoring a parameter of the power tool, monitoring a motion of the power tool, detecting a change in the parameter of the power tool, comparing, using a controller, the change in the parameter of the power tool to a predetermined threshold, determining, using the controller, if the change in the parameter of the power tool is less than the predetermined threshold, determining, when the change in the parameter of the power tool is less than the predetermined threshold, whether the motion of the power tool is greater than a motion threshold, and controlling, using the controller, a motor of the power tool when the motion based on whether the motion of the power tool is greater than the motion threshold.

In some aspects, the method further includes stopping the motor when the motion of the power tool is greater than the motion threshold.

In some aspects, the motion of the power tool is monitored using a gyroscope.

In some aspects, the parameter of the power tool is a motor current.

In some aspects, the change in the parameter of the power tool is a decrease in the motor current.

Methods described herein for detecting a presence of a component on a power tool include sending a current through a coil to generate a magnetic field, inducing eddy currents in the component to generate an opposing magnetic field, detecting a change in inductance in a circuit based on the opposing magnetic field, generating an output signal indicative of the change in inductance, determining, using a controller, whether the component is present on the power tool based on the output signal indicative of the change in inductance, and controlling, using the controller, operation of a motor based on whether the component is present on the power tool.

Methods described herein for operating a power tool include detecting a linear motion of the power tool, comparing the linear motion of the power tool to a loss of control threshold, stopping operation of the power tool when the linear motion of the power tool is greater than the loss of control threshold, detecting a rotational motion of the power tool, comparing the rotational motion of the power tool to a loss of control rotation threshold, stopping operation of the power tool when the rotational motion of the power tool is greater than the loss of control rotation threshold.

Methods described herein for operating a power tool include detecting a linear motion of the power tool, detecting a rotational motion of the power tool, incrementing a linear and rotational motion accumulator when either the linear motion of the power tool is greater than a first threshold or the rotational motion of the power tool is greater than a second threshold, comparing the linear and rotational motion accumulator to a maximum value, and stopping operation of the power tool when the linear and rotational motion accumulator reaches the maximum value.

Methods described herein for operating a power tool include monitoring a parameter of a motor related to a cutting operation of the power tool, and comparing the parameter of the motor to a threshold value. The threshold value corresponds to a completion of the cutting operation of the power tool. The methods further include stopping the motor when the parameter of the motor is less than the threshold value.

In some aspects, the parameter of the motor is a motor current.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
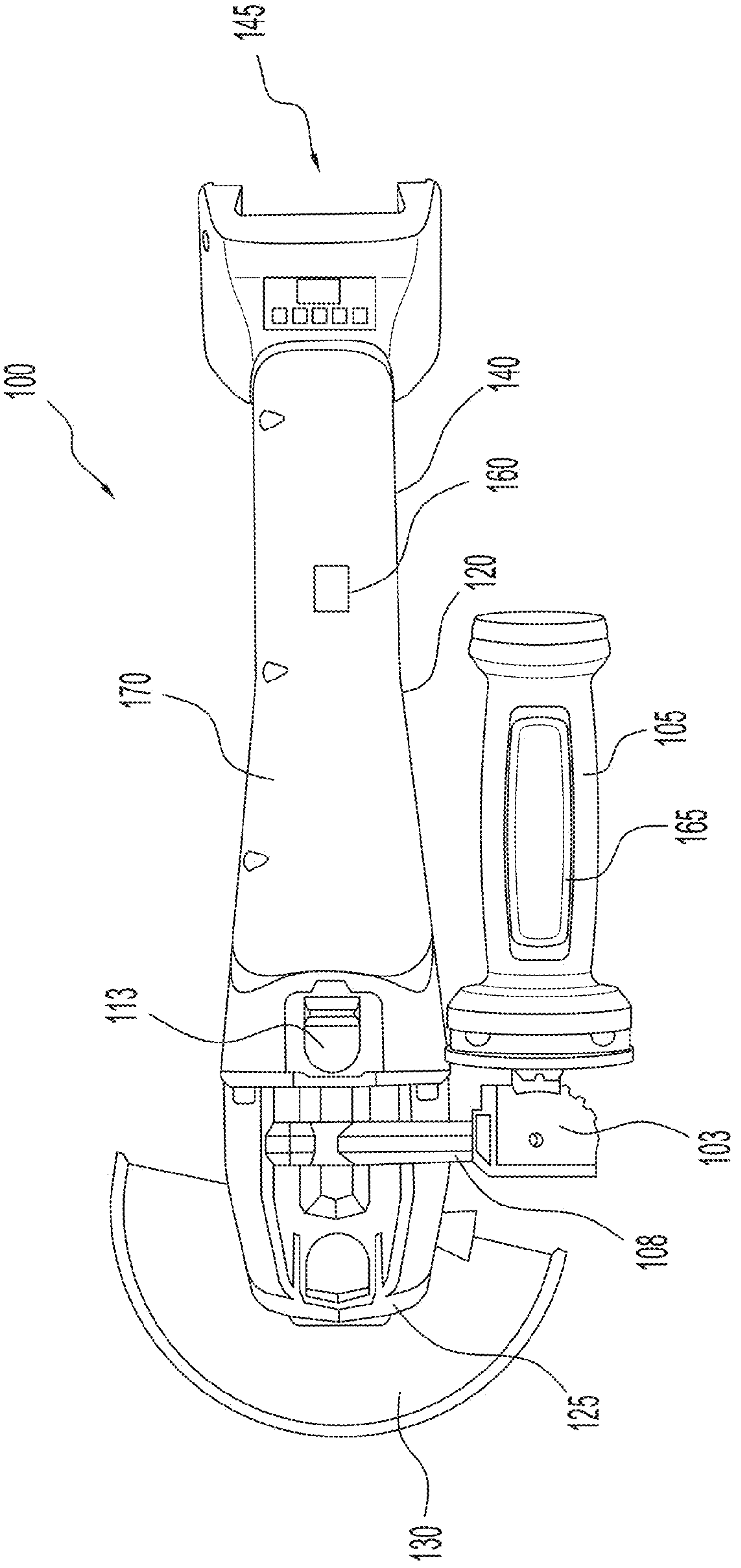
FIG. 1 illustrates a power tool according to some embodiments.

FIG. 1 illustrates a power tool, such as a portable rotary power tool, that implements several different methods and systems to control the tool and a motor of the tool. In some embodiments, the portable power tool is a grinder 100. The grinder 100 may include a main tool housing 120, a first handle 140 that extends along the main tool housing 120, and a second handle 105 that extends transversely in an outward direction from the main tool housing 120. A motor 210 (shown in FIG. 2) is located within the main tool housing 120. An output shaft 125 is coupleable to a tool holder that may be configured to receive an accessory 150, such as a cutting tool, a grinding disc, a rotary burr, a sanding disc, etc. Various types of accessories may be interchangeably attached to the tool holder and may be designed with different characteristics to perform different types of operations. For example, the accessory 150 may be made of a material and have dimensions suitable for performing a specific type of task. The characteristics of an accessory may affect the performance of the grinder 100 or may impose constraints on operation of the tool. For example, different accessory types may be configured to work at different rotational speeds or applied torques depending on the characteristics of the accessory and the task to be performed. During operation of the grinder 100, the motor and the output shaft 125 may be controlled to rotate at a wide range of speeds.

Due to the wide range of speeds, in some embodiments, the grinder 100 may include a guard 130 to protect a user or another object in the surrounding environment from the different accessory types that may be attached to the tool holder. In some embodiments, the guard 130 prevents a user from contacting the accessory 150. In some embodiments, the guard 130 provides protection against, for example, sparks.

In some embodiments, the first handle 140 may define a battery pack receptacle 145, which is positioned on an end of the first handle 140 opposite the main tool housing 120. The battery pack receptacle 145 is configured to selectively, mechanically, and electrically connect to a rechargeable battery pack (i.e., a power supply) for powering the motor 210. The battery pack is insertable into or attachable to the battery pack receptacle 145. The battery pack may include any of a number of different nominal voltages (e.g., 12V, 18V, 24V, 36V, 40V, 48V, etc.), and may be configured having any of a number of different chemistries (e.g., lithium-ion, nickel-cadmium, etc.). In some embodiments, the motor 210 may be powered by a remote power source (e.g., an AC electrical outlet) through a power cord and a power interface of the grinder 100. The first handle 140 further contains control electronics for the grinder 100.

The second handle 105 may allow a user to better control the operation of the grinder 100. In some embodiments, the first handle 140 and/or the second handle 105 include a variety of sensors to detect different operational characteristics and/or user characteristics (e.g., operator presence, grip pressure, etc.). For example, the first handle 140 includes a first sensor 160 for detecting the presence of a user's hand on the first handle 140, and the second handle 105 includes a second sensor 165 for detecting the presence of a user's second hand on the second handle 105. In some embodiments, the sensors 160, 165 are pressure sensors that detect the presence of a minimum grip pressure on the handles 140, 105. Various signals from the sensors located in the second handle 105 may be sent to the grinder 100's main control system and the operation of the motor 210 may be controlled based on the signals (e.g., enabling or disabling the motor 210, modifying a torque limit, etc.).

The second handle 105 includes a pivot mechanism 103. The pivot mechanism 103 enables the second handle 105 to pivot with respect to a pivot arm 108. The pivot mechanism 103 permits the second handle 105 to be pivoted through a plurality of different positions relative to the pivot arm 108. For example, the second handle is positioned at a zero-degree angle, or parallel relative to the main tool housing 120 of the grinder 100 (e.g., substantially parallel to the main tool housing 120). The second handle 105 can also be moved to another position, such as substantially perpendicular to the main tool housing 120 (e.g., at a 90-degree angle). In some embodiments, the second handle 105 can be positioned at five discrete positions using the pivot mechanism 103. In other embodiments, greater or fewer discrete positions are available for the second handle.

The pivot arm 108 allows the second handle 105 to be pivoted into a plurality of different positions around the circumference of the main tool housing 120. For instance, the pivot arm 108 may rotate into a first pivot position, such as a left-handed position as illustrated in FIG. 1, or a second pivot position, such as a right-handed position. In some embodiments, the second handle 105 may be pivoted to be respectively above the main tool housing 120 and substantially perpendicular to left-handed and right-handed positions (e.g., perpendicular to a cutting plane of the grinder 100). Other embodiments may include additional pivot positions for the second handle 105. Once the second handle 105 is rotated into one of the plurality of pivot positions, the pivot arm 108 can be secured in place by a locking mechanism 113, as described in greater detail below.

Figure 2:
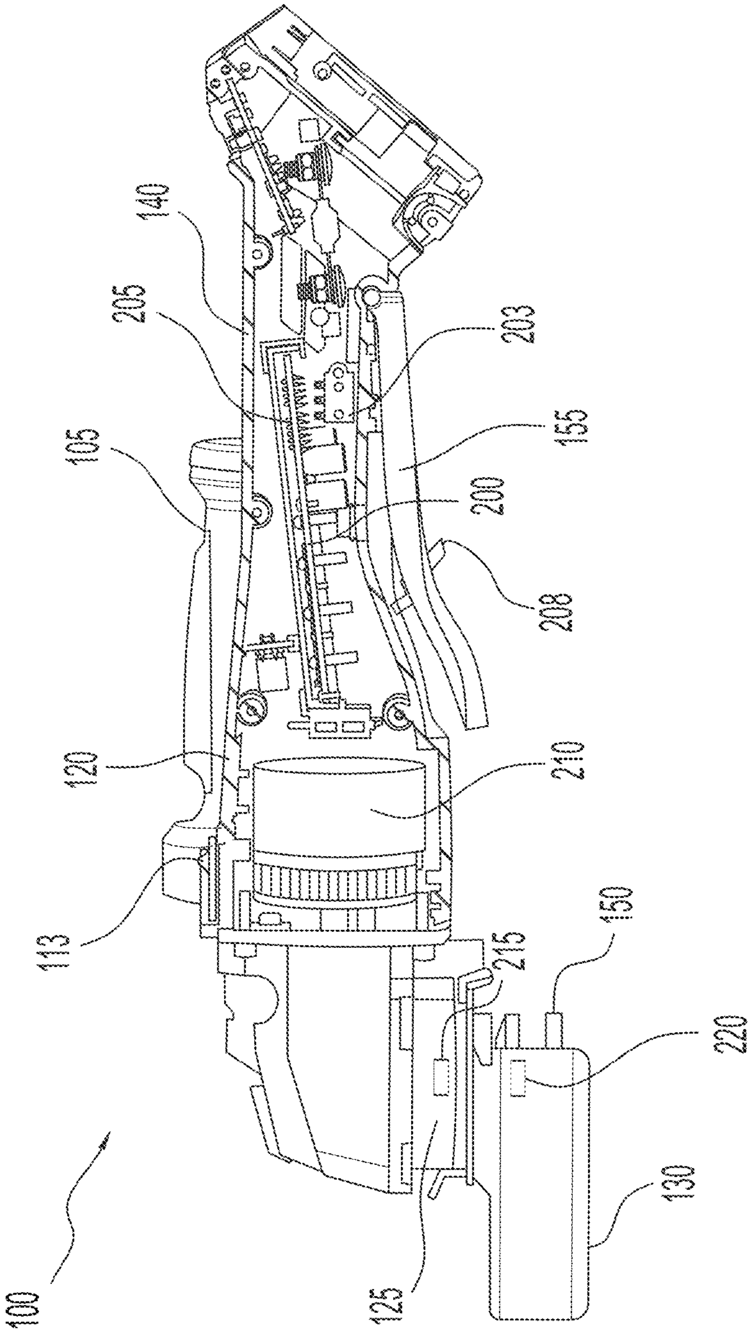
FIG. 2 illustrates a side section view of the power tool of FIG. 1 according to some embodiments.

FIG. 2 illustrates a side section view of the grinder 100. In some embodiments, a controller 200 (e.g., located on a printed circuit board) is located within the first handle 140. In some embodiments, various sensors 205 may also be located within the first handle 140. The output shaft 125 protrudes downwards, towards a potential workpiece. In some embodiments, the accessory 150 (e.g., a grinder blade) may be attached to the output shaft 125. Because an accessory 150, such as a grinder blade, is potentially hazardous to the user and the area surrounding the grinder, the guard 130 is also attached to the output shaft 125 and protrudes downward towards a workpiece and extends around the blade 150. This provides protection from the blade 150 and any potential debris that is produced during operation.

In some embodiments, the motor 210 is located between the output shaft 125 and the battery pack receptacle 145, and beneath a trigger 155 within the main tool housing 120. The trigger 155 is used to control the motor 210, which receives control signals from the controller 200 to control the output shaft 125 and other aspects of the grinder 100.

In some embodiments, the grinder 100 incudes a guard presence sensor 215 for detecting the presence of the guard 130. In some embodiments, the grinder 100 is prevented from operating (e.g., motor 305 is prevented from operating) when the guard presence sensor 215 does not detect the guard 130. The grinder 100 also includes a component type indicator 220. The component type indicator 220 is configured to provide an indication to the grinder 100 of the type of component (e.g., guard 130) that is connected to the grinder. For example, guards of different sizes may result in the grinder 100 operating differently. Although the component type indicator 220 is illustrated with respect to the guard 130, the component type indicator can additionally or alternatively be associated with another component of the grinder 100, such as the second handle 105, a dust hood, the accessory 150, etc.

The first handle 140 includes the switch or trigger 155 operable to electrically connect the power source (e.g., the battery pack) and the motor 210. In some embodiments, the trigger 155 may be a "lock-off" trigger having a paddle member and a lock-off member 208 supported by the paddle member. The paddle member is operable to actuate a switch 203 electrically connected to the controller 200. The switch 203 is configured to control selective activation and deactivation of the motor 210 during operation of the grinder 100. The lock-off member 208 is configured to selectively prevent operation of the paddle member (e.g., prevent activation of the switch 203). In some embodiments, the paddle member acts as the detection for a user's first hand on the first handle 140. In other embodiments, a user's hand is detected using other sensors (e.g., grip sensors, pressure sensors, touch sensors, electromechanical sensors, etc.).

Figure 3:
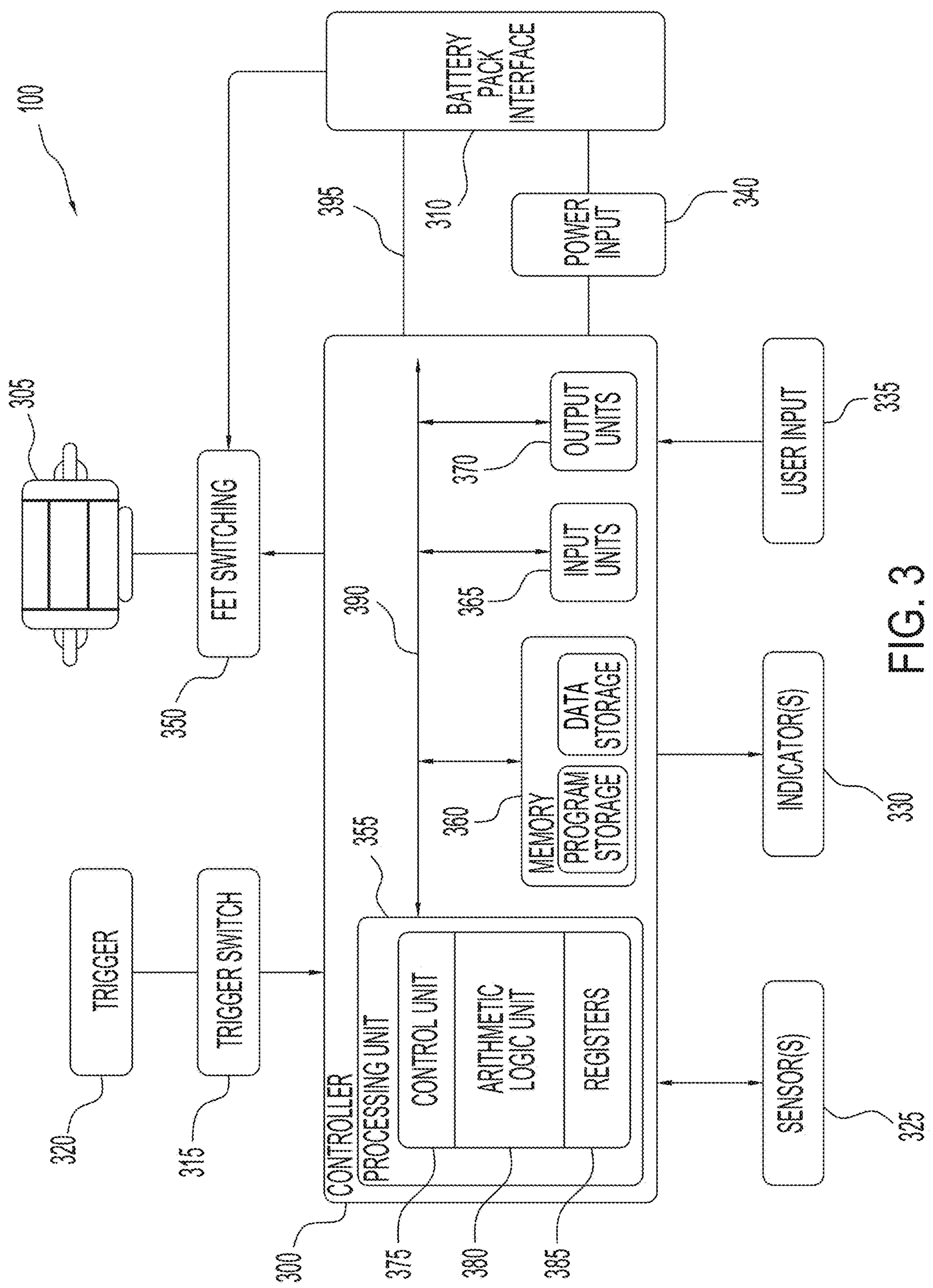
FIG. 3 illustrates a controller for the power tool of FIG. 1 according to some embodiments.

FIG. 3 illustrates a control system for the grinder 100. The control system includes a controller 300. The controller 300 is electrically and/or communicatively connected to a variety of modules or components of the grinder 100. For example, the illustrated controller 300 is electrically connected to a motor 305 (e.g., motor 210), a battery pack interface 310, a trigger switch 315 (connected to a trigger 320), one or more sensors or sensing circuits 325, one or more indicators 330, a user input module 335, a power input module 340, and a FET switching module 350 (e.g., including a plurality of switching FETs). The controller 300 includes combinations of hardware and software that are operable to, among other things, control the operation of the grinder 100, monitor the operation of the grinder 100, activate the one or more indicators 330 (e.g., an LED), etc.

The controller 300 includes a plurality of electrical and electronic components that provide power, operational control, and protection to the components and modules within the controller 300 and/or the grinder 100. For example, the controller 300 includes, among other things, a processing unit 355 (e.g., a microprocessor, a microcontroller, an electronic processor, an electronic controller, or another suitable programmable device), a memory 360, input units 365, and output units 370. The processing unit 355 includes, among other things, a control unit 375, an arithmetic logic unit ("ALU") 380, and a plurality of registers 385, and is implemented using a known computer architecture (e.g., a modified Harvard architecture, a von Neumann architecture, etc.). The processing unit 355, the memory 360, the input units 365, and the output units 370, as well as the various modules or circuits connected to the controller 300 are connected by one or more control and/or data buses (e.g., common bus 390). The use of one or more control and/or data buses for the interconnection between and communication among the various modules, circuits, and components would be known to a person skilled in the art in view of the embodiments described herein.

The memory 360 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 355 is connected to the memory 360 and executes software instructions that are capable of being stored in a RAM of the memory 360 (e.g., during execution), a ROM of the memory 360 (e.g., on a generally permanent basis), or another non-transitory computer readable medium such as another memory or a disc. Software included in the implementation of the grinder 100 can be stored in the memory 360 of the controller 300. The software includes, for example, firmware, one or more applications, program data, filters, rules, one or more program modules, and other executable instructions. The controller 300 is configured to retrieve from the memory 360 and execute, among other things, instructions related to the control processes and methods described herein. In other constructions, the controller 300 includes additional, fewer, or different components.

The motor 305 includes a rotor and a stator that surrounds the rotor. In some embodiments, the motor 305 is a brushless direct current ("BLDC") motor in which the rotor is a permanent magnet rotor and the stator includes coil windings that are selectively energized to drive the rotor. In other embodiments, the motor is a brushed motor. The stator is supported within the main tool housing 120 and remains stationary relative to the main tool housing 120 during operation of the grinder 100. The rotor is rotatably fixed to a rotor shaft and configured to rotate with the rotor shaft, relative to the stator, about a motor axis. A portion of the rotor shaft is associated with or corresponds to the output shaft 125 extending from the main tool housing 120. In some embodiments, the motor 305 is an outer rotor motor.

The battery pack interface 310 includes a combination of mechanical components (e.g., rails, grooves, latches, etc.) and electrical components (e.g., one or more terminals) configured to and operable for interfacing (e.g., mechanically, electrically, and communicatively connecting) the grinder 100 with a battery pack. For example, power provided by the battery pack to the grinder 100 is provided through the battery pack interface 310 to the power input module 340. The power input module 340 includes combinations of active and passive components to regulate or control the power received from the battery pack prior to power being provided to the controller 300. The battery pack interface 310 also supplies power to the FET switching module 350 to provide power to the motor 305. The battery pack interface 310 also includes, for example, a communication line 395 for provided a communication line or link between the controller 300 and the battery pack.

The indicators 330 include, for example, one or more light-emitting diodes ("LEDs"). The indicators 330 can be configured to display conditions of, or information associated with, the grinder 100. For example, the indicators 330 are configured to indicate measured electrical characteristics of the grinder 100, the status of the grinder 100, etc. The user input module 335 is operably coupled to the controller 300 to, for example, select a forward mode of operation or a reverse mode of operation, a torque and/or speed setting for the grinder 100 (e.g., using torque and/or speed switches), etc. In some embodiments, the user input module 335 includes a combination of digital and analog input or output devices required to achieve a desired level of operation for the grinder 100, such as one or more knobs, one or more dials, one or more switches, one or more buttons, etc.

The controller 300 is configured to determine whether a fault condition of the grinder 100 is present and generate one or more control signals related to the fault condition. For example, the sensing circuits 325 include one or more current sensors, one or more speed sensors, one or more Hall Effect sensors, one or more temperature sensors, an accelerometer, a gyroscope, an inertial measurement unit ["IMU"], one or more pressure sensors, one or more object presence sensors, etc. The controller 300 calculates or includes, within memory 360, predetermined operational threshold values and limits for operation of the grinder 100. For example, when a potential thermal failure (e.g., of a FET, the motor 305, etc.) is detected or predicted by the controller 300, power to the motor 305 can be limited or interrupted until the potential for thermal failure is reduced. If the controller 300 detects one or more such fault conditions of the grinder 100 or determines that a fault condition of the grinder 100 no longer exists, the controller 300 is configured to provide information and/or control signals to another component of the grinder 100 (e.g. the battery pack interface 310, the indicators 330, etc.).

Figure 4:
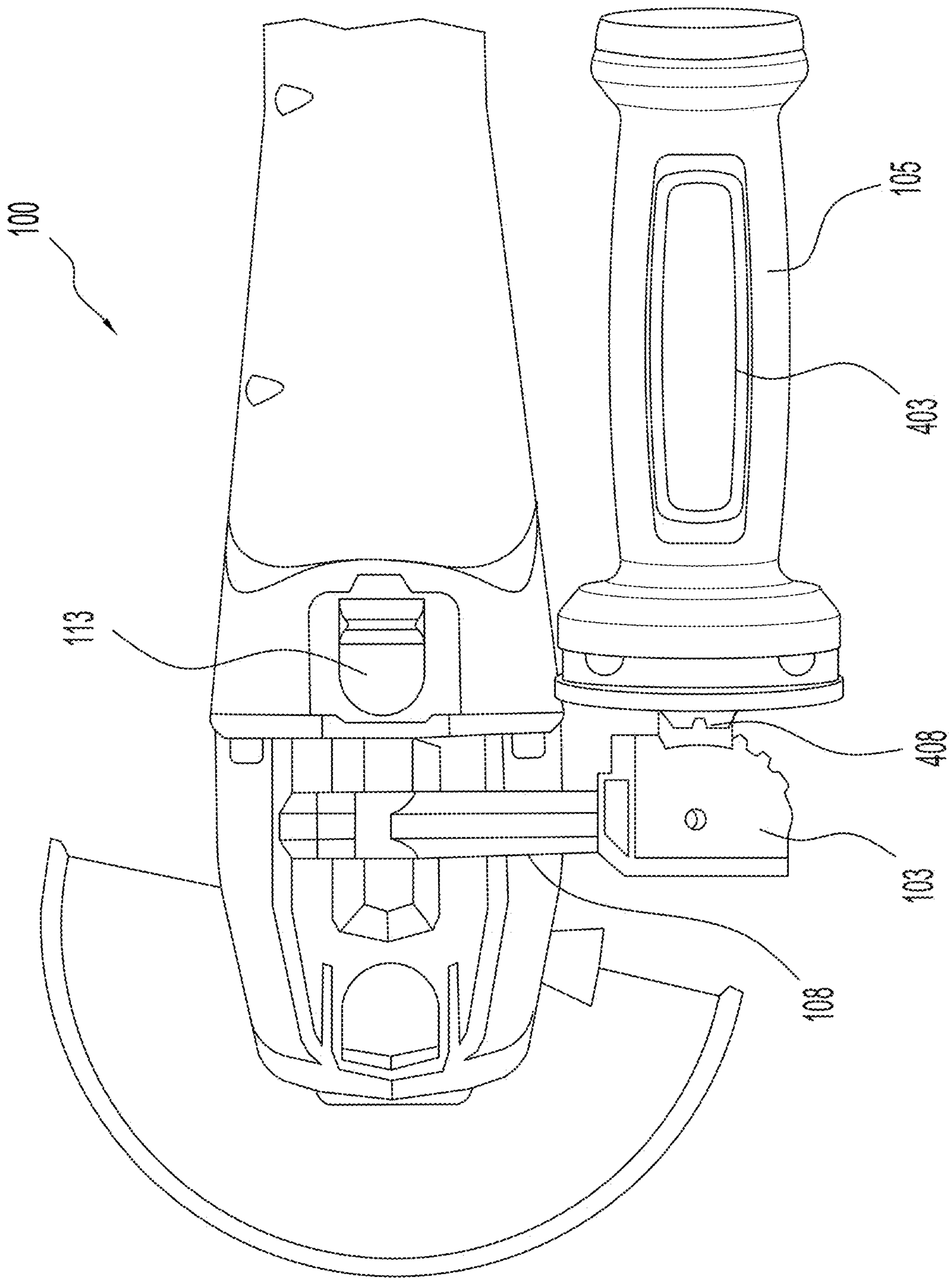
FIG. 4 illustrates the adjustable second handle of the power tool of FIG. 1 according to some embodiments.
Figure 5:
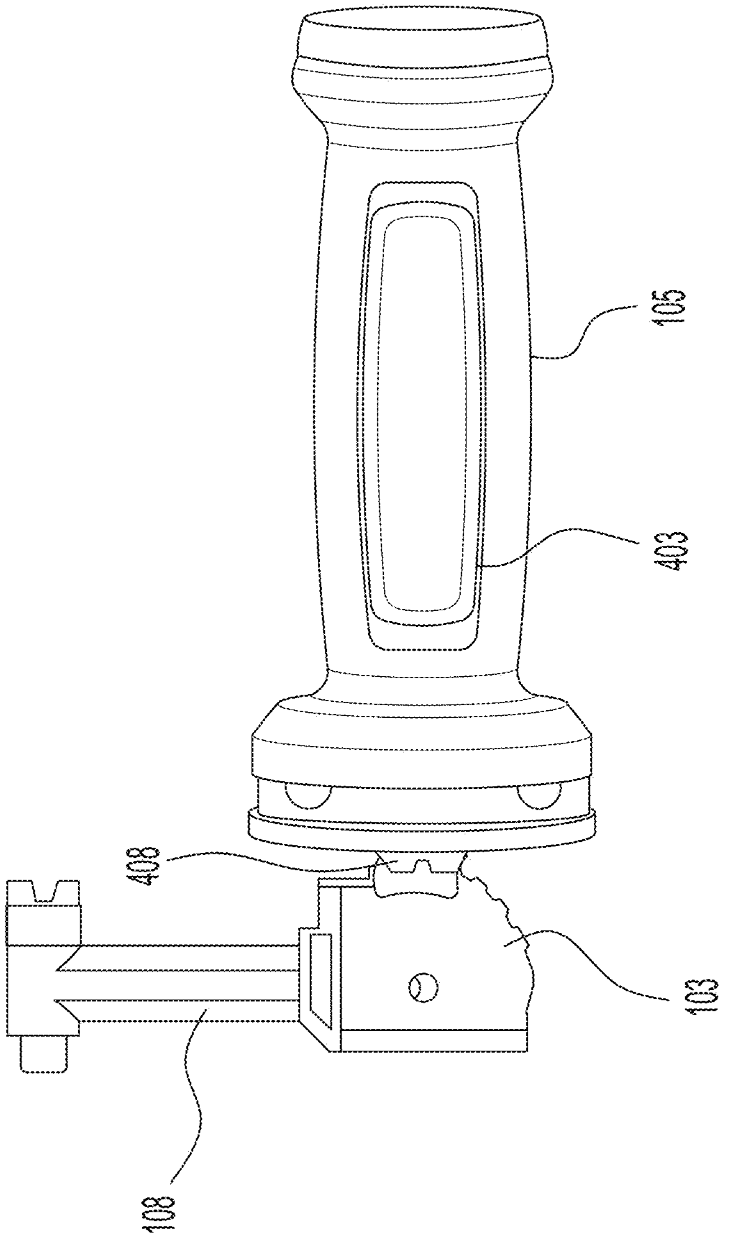
FIG. 5 illustrates the adjustable second handle of FIG. 4 according to some embodiments.

FIG. 4 and FIG. 5 are illustrations of partial views of the second handle 105 of the grinder 100, according to some embodiments. The second handle 105 incudes a first over-mold portion 403 positioned on the second handle 105 and configured to protect internal components of the second handle 105 from water, dust, or other unwanted foreign debris. The second handle 105 also includes a second over-mold portion, positioned opposite the first over-mold portion 405 (see FIG. 8). The pivot arm 108 of the second handle 105 includes locking mechanism 408 configured to mechanically couple with the pivot mechanism 103.

Figure 6:
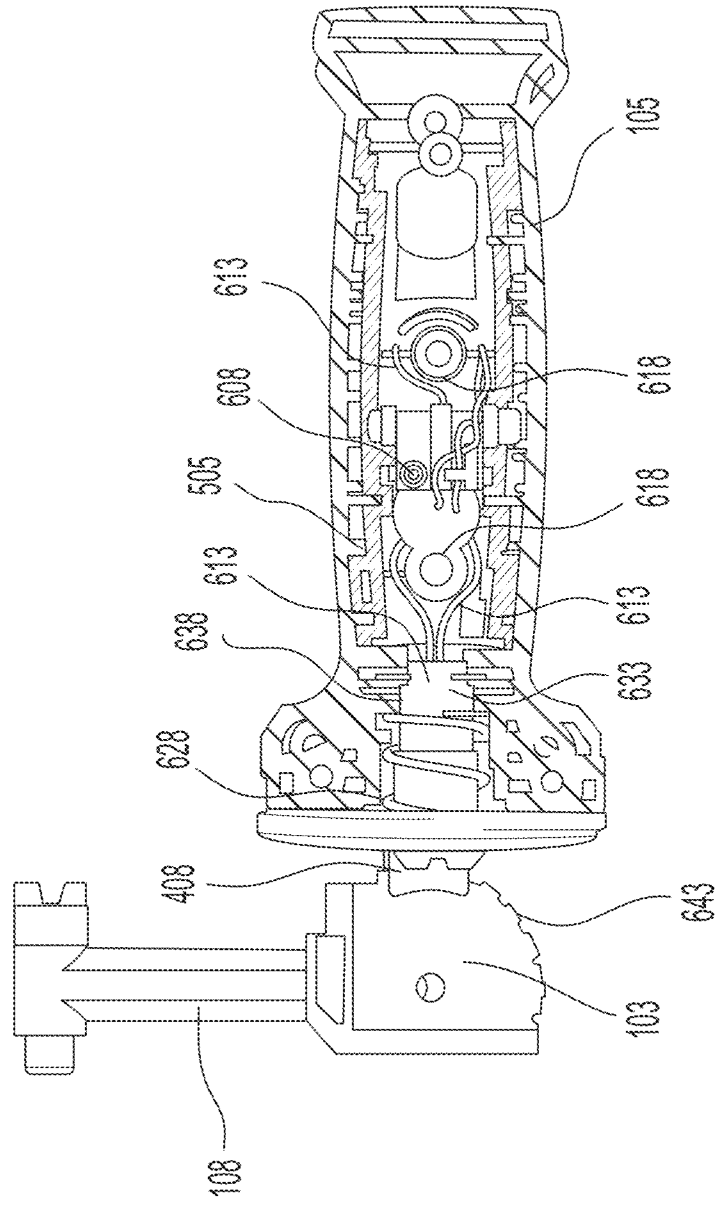
FIG. 6 illustrates the adjustable second handle of FIG. 4 according to some embodiments.
Figure 7:
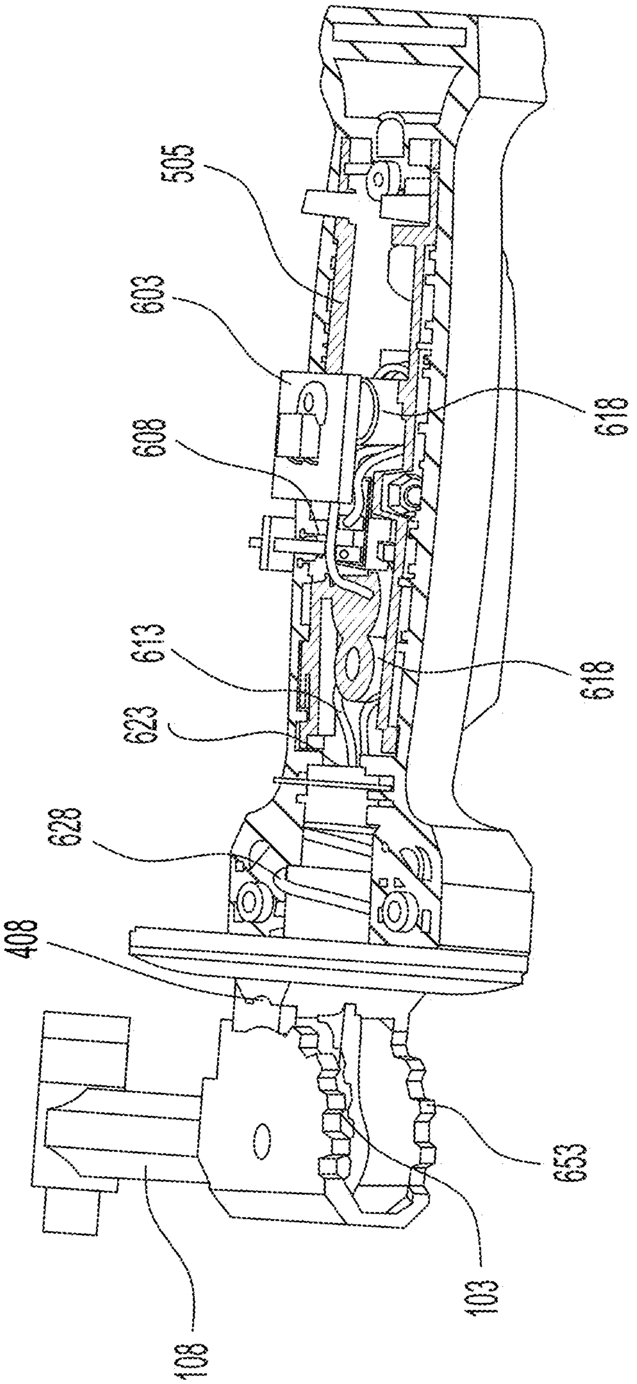
FIG. 7 illustrates the adjustable second handle of FIG. 4 according to some embodiments.

FIG. 6 and FIG. 7 are illustrations of the second handle 105 of the grinder 100 with an outer housing removed. The second handle 105 includes an internal cavity 505. The second handle 105 includes a printed circuit board ("PCB") 603 (e.g., a flexible printed circuit board) which includes a microswitch sensor 608 positioned on the PCB. In some embodiments, the PCB 603 is folded or molded around the outer circumference 515 of the second handle 105. The microswitch sensor 608 is configured to mechanically contact the first over-mold portion 403. Additionally, the microswitch sensor 608 is configured to detect the presence of a hand. For example, when a user grips the second handle 105 with sufficient grip force (e.g., to overcome a spring force biasing the first over-mold portion 403 away from the microswitch sensor 608), the first over-mold portion 403 is depressed and the microswitch sensor 608 is activated. In some embodiments, a grip force above a threshold value is required for the grinder 100 to detect hand presence. In other embodiments, a user's hand is detected merely by detecting a user's hand touching the second handle 105. The microswitch sensor 608 then sends a signal to the controller 200. In some embodiments, the microswitch sensor 608 acts as a secondary trigger mechanism. For example, in some embodiments, the microswitch sensor 608 must be activated prior to the activation of the trigger 155 in order for the grinder to operate. In some embodiments, there is an activation time associated with the operation of the trigger 155 after a user grips the second handle 105. For example, in some embodiments, the trigger 155 must be activated within a predetermined time period after a user's grip has been detected by the microswitch sensor 608.

The internal cavity 505 includes wires 613 for connecting the microswitch sensor 608 to the controller 200. In some embodiments, the wires 613 are routed around support structures 618 for the second handle 105. The support structures 618 are configured to, for example, maintain the structural integrity of the internal cavity 505 during use of the second handle 105. The wires 613 are configured to exit the second handle 105 through a first channel 623 through the locking mechanism 408.

The locking mechanism 408 is configured to engage the pivot mechanism 103 to move the second handle 105 to a plurality of different position. The locking mechanism includes a spring 628 to bias the locking mechanism 408 toward the pivot mechanism 103. In order to pivot the second handle 105 with respect to the pivot mechanism 103, a user would have to pull the second handle 105 away from the pivot mechanism 103 and against the bias force of the spring 628. A body portion 633 that forms the first channel 623 also includes ribs or projections 638. The projections 638 prevent the second handle 105 from rotating with respect to the pivot mechanism 103. When the locking mechanism 408 clears teeth 643 of the pivot mechanism 103 after being pulled away from the pivot mechanism 103, the second handle 105 can be pivoted to a different position with respect to the pivot mechanism 103.

Figure 8:
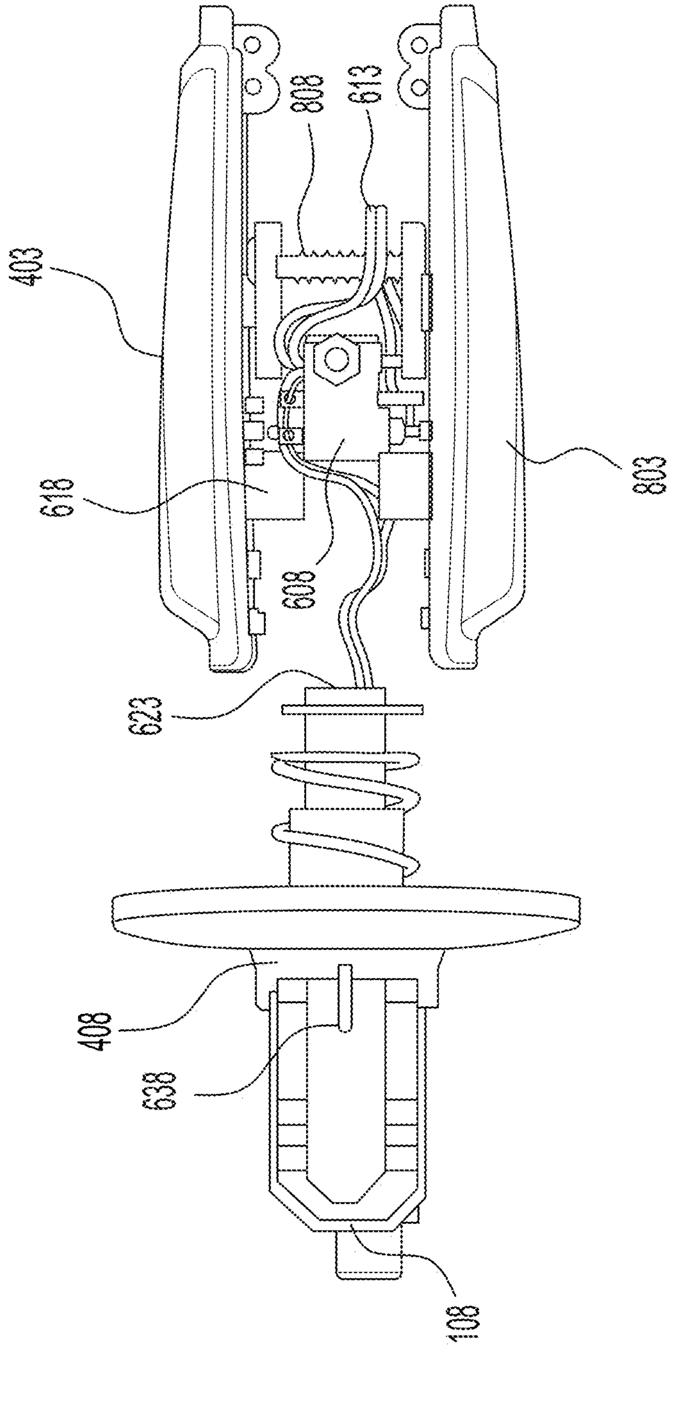
FIG. 8 illustrates the adjustable second handle of FIG. 4 with an exterior housing removed according to some embodiments.

FIG. 8 is an illustration of an interior portion of the second handle 105 of the grinder 100. In this illustration, portions of the second handle 105 are removed in order to illustrate the first over-mold portion 403 and a second over-mold portion 803. The second over-mold portion 803 is positioned opposite the first over-mold portion 403. Either the first over-mold portion 403 or the second over-mold portion 803 can activate the microswitch sensor 608. For example, depending on the position of the second handle (e.g., right or left side of the grinder 100), one of the first over-mold portion 403 and the second over-mold portion 803 would correspond to a top portion of the second handle 105. In some embodiments, both the first and second over-mold portions 403, 803 need to be pressed to activate the microswitch sensor 608 and operate the grinder 100. In some embodiments, the second handle includes a second microswitch sensor 608 for the second over-mold portion 803. Wires 613 are routed around a screw 808 associated with the support structures 618 and into the first channel 623. In some embodiments, the first over-mold portion 403 and the second over-mold portion 803 are mechanically connected to the microswitch sensor 608. The second handle 105 additionally includes the projections 638 for rotationally locking the second handle 105 with respect to the pivot mechanism 103. The projections 638 prevent twisting of the second handle 105 relative to pivot mechanism 103.

Figure 9:
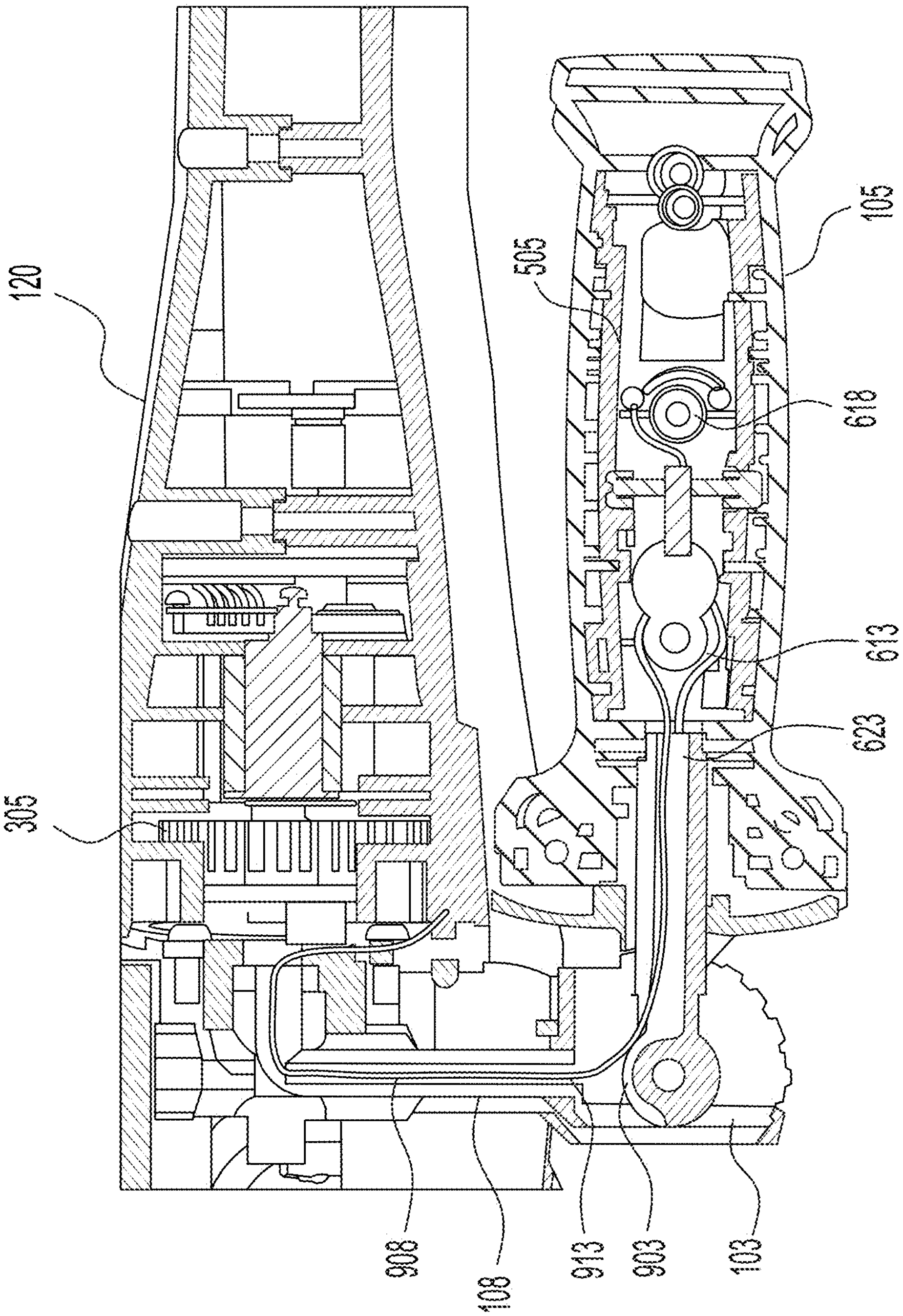
FIG. 9 illustrates a top section view of the adjustable side handle for the power tool of FIG. 1 according to some embodiments.
Figure 10:
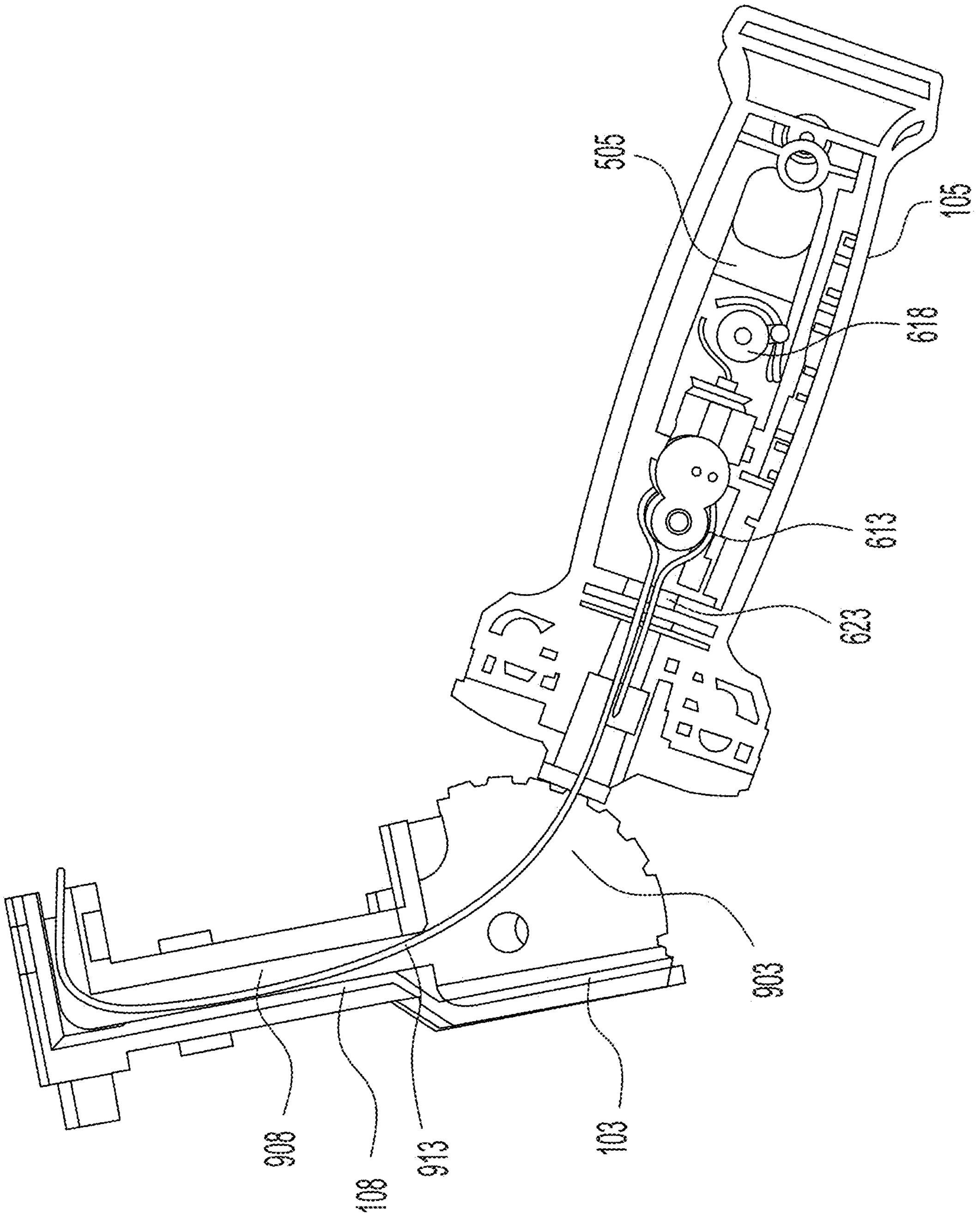
FIG. 10 illustrates a top section view of the adjustable side handle for the power tool of FIG. 1 according to some embodiments.
Figure 14:
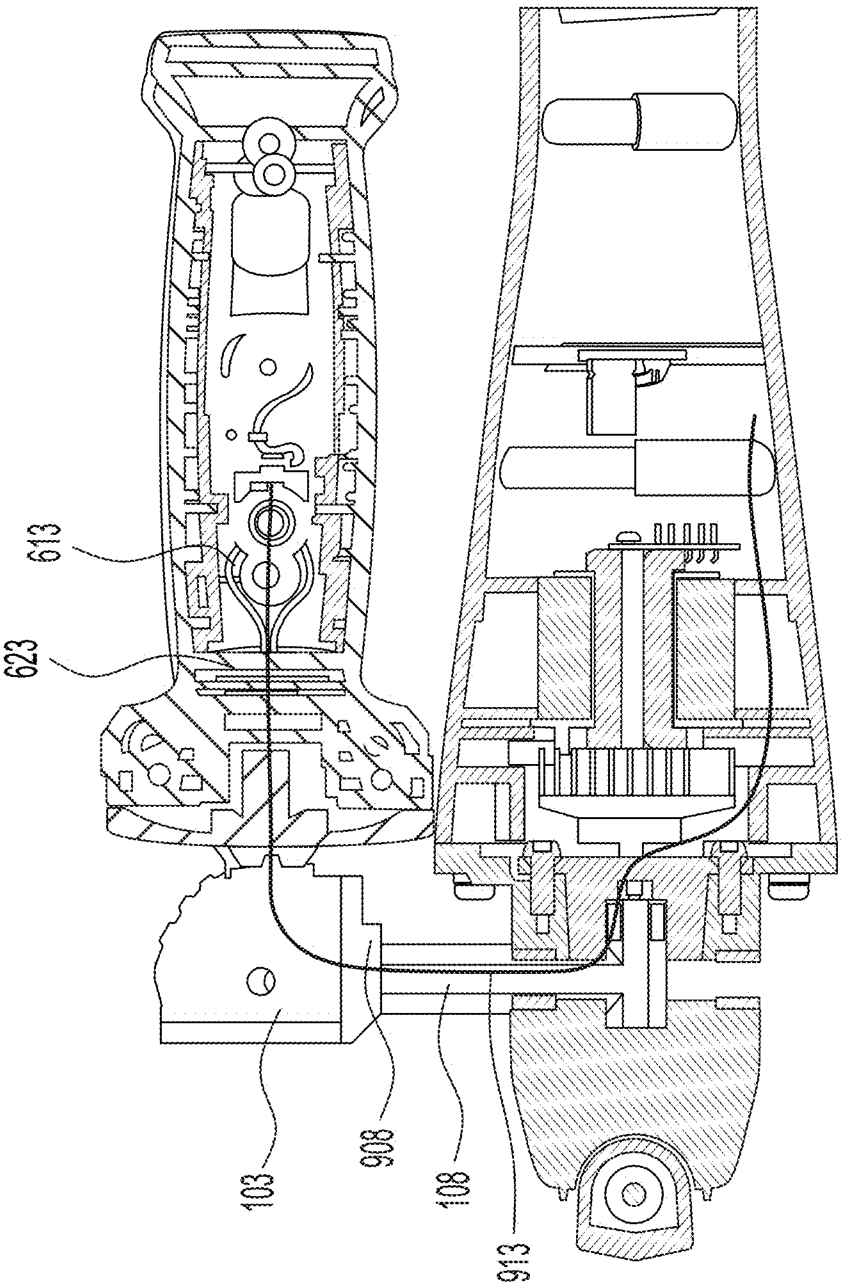
FIG. 14 illustrates wire routing through the side handle locking mechanism of the adjustable side handle for the power tool of FIG. 1 according to some embodiments.

FIG. 9 and FIG. 10 are illustrations of an internal wire routing portion of the second handle 105 and the grinder 100. The wires 613 run from the internal cavity 505 of the second handle 105 into the first channel 623, and then into a second channel 903 in the pivot mechanism 103. The wires 613 run from the second channel 903 into a third channel 908 within the pivot arm 108. The second channel 903 and the third channel 908 are configured to route the wires 613 such that the wires 613 do not interfere with the pivoting of the pivot mechanism 103 or the rotation of the pivot arm 108. As a result, the second channel 903 and third channel 908 prevent the wires 613 from bundling/crimping when the second handle 105 is pivoted with respect to the pivot mechanism 103 or the pivot arm 108 is rotated with respect to the grinder 100. A wire path 913 for routing the wires 613 from the second handle 105 to the main tool housing 120 is illustrated in FIG. 14. In the embodiment illustrated in FIG. 10, the second handle 105 is positioned at a 45-degree angle relative to the pivot arm 108.

Figure 11:
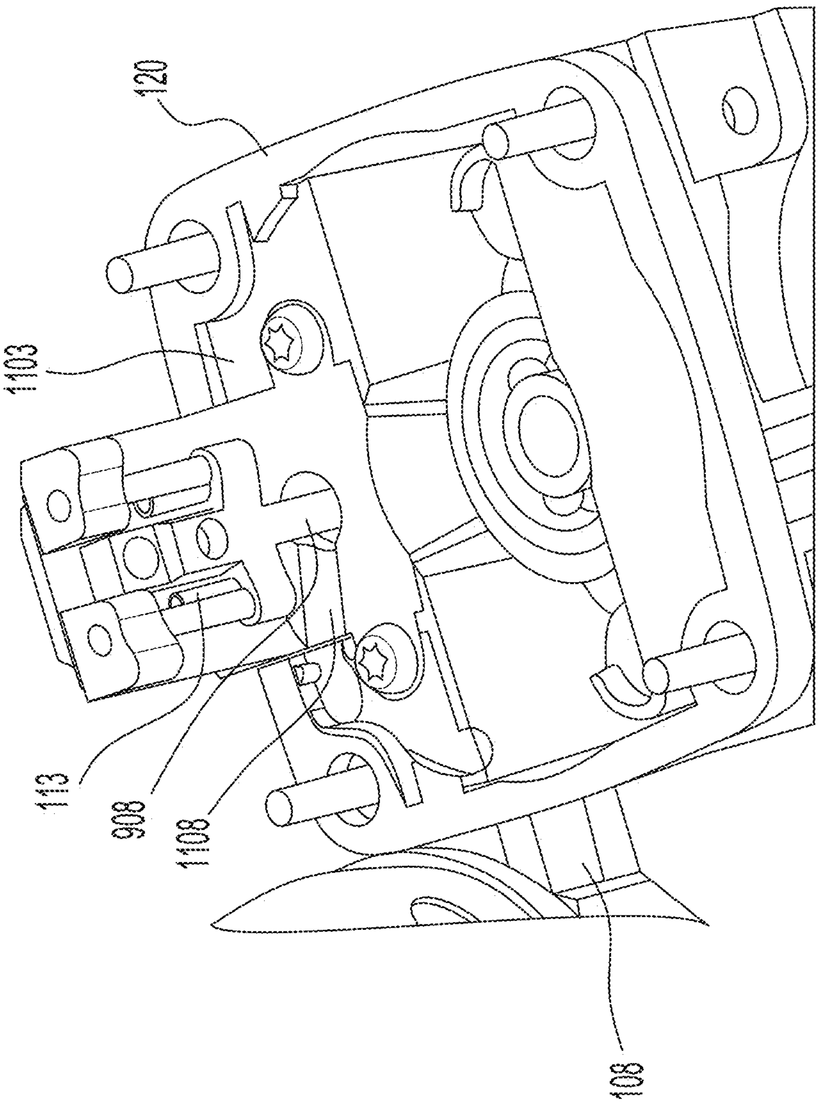
FIG. 11 illustrates a perspective view of an interior portion of the power tool including a side handle locking mechanism and a wire routing channel according to some embodiments.

FIG. 11 illustrates an interior portion of the grinder 100 associated with the routing of the wires 613. In some embodiments, the third channel 908 extends into and terminates in a main housing cavity 1103 of the main tool housing 120. The main tool housing 120 houses the motor, controller, and other such components of the grinder 100 that are not illustrated in FIG. 11. In some embodiments, the main housing cavity 1103 includes a fourth channel 1108 configured proximate to, and extending orthogonally from, the third channel 908. The fourth channel 1108 is configured to receive the wires 613 from the third channel 908 and route the wires 613 along the length of the fourth channel 1108 (e.g., around a gearcase of the grinder 100). The wires 613 terminate in or after the fourth channel 1108 at a first electrical connector (not illustrated). In some embodiments, the first connector is configured to electrically and mechanically connect with a main wire harness of the power tool to connect the wires 613 to the controller 200. In some embodiments, the first connector is configured to connect to a second connector (not illustrated) that extends from the controller 200 of the grinder 100. In some embodiments, the wires 613 extend all the way to the controller 200 without a first or second connector. In some embodiments, the grinder 100 includes additional channels or alternative wire routing paths.

Figure 12:
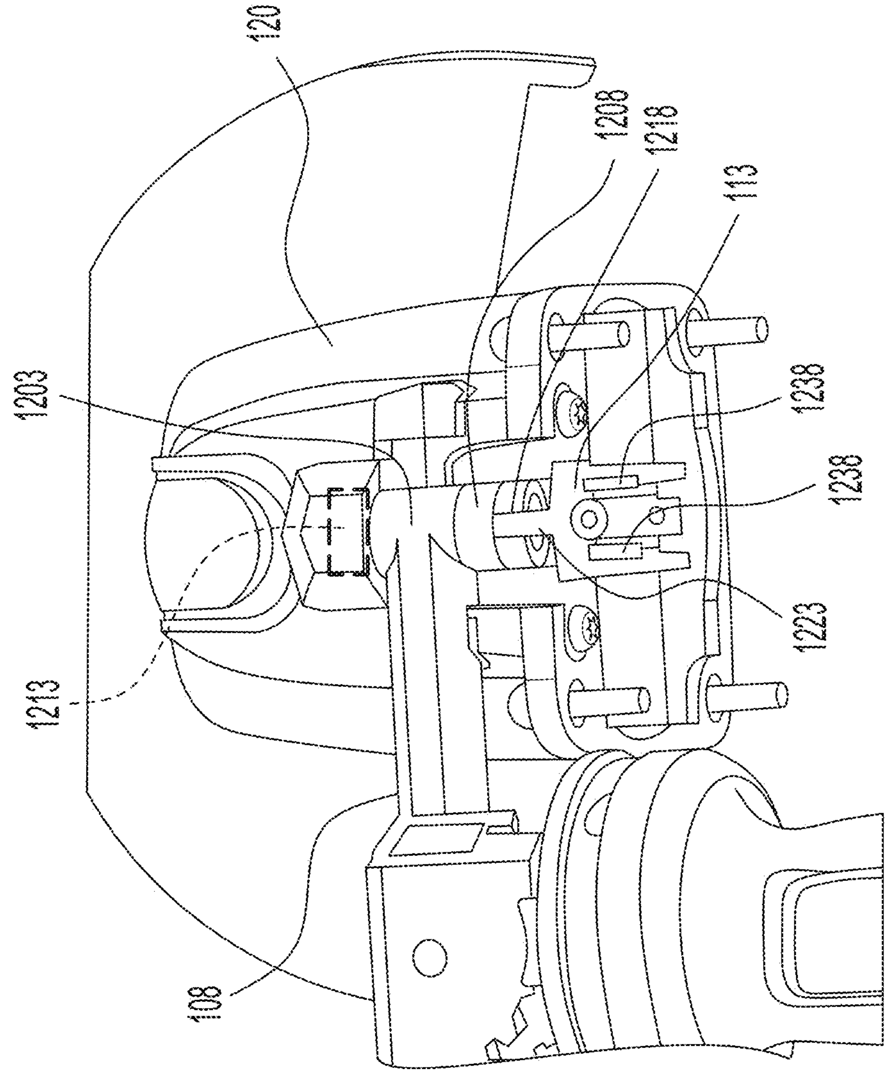
FIG. 12 illustrates the side handle locking mechanism of the adjustable side handle for the power tool of FIG. 1 according to some embodiments.
Figure 13:
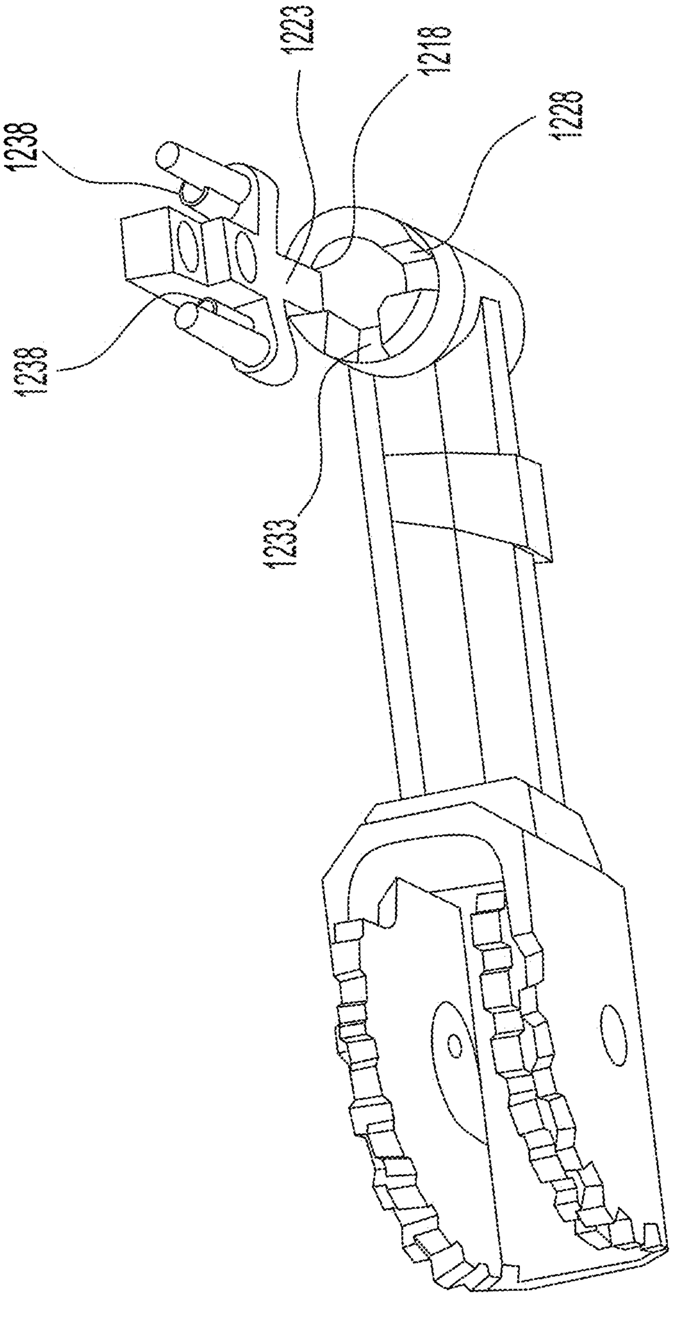
FIG. 13 illustrates the side handle locking mechanism of the adjustable side handle for the power tool of FIG. 1 according to some embodiments.

FIG. 12 and FIG. 13 illustrate the operation of the locking mechanism 113 for the pivot arm 108 of the grinder 100, according to some embodiments. The locking mechanism 113 is configured to lock the pivot arm 108 into one of a plurality of pivot positions. In some embodiments, the locking mechanism 113 a button, a switch, a lever, or the like, that is biased into a locked position. Once locked by the locking mechanism 113, the pivot arm 108 is secured in place and cannot be moved to another pivot position. In some embodiments, the pivot arm 108 includes a pivot joint 1203 in contact with the main tool housing 120 of the grinder 100. A first bushing 1208 is mechanically connected to the pivot joint 1203. The first bushing 1208 is configured to support the pivot joint 1203. In some embodiments, a second bushing 1213 opposite the first bushing 1208 is also used to support the pivot joint 1203. The pivot joint 1203 is configured to mechanically connect the pivot arm 108 with the locking mechanism 113. The pivot joint 1203 includes a first aperture or first groove 1218 configured to mechanically couple with a tooth or projection 1223 of the locking mechanism 113. When the projection 1223 is mechanically coupled to the first groove 1218, the pivot arm 108 is locked into position by the locking mechanism 113. In some embodiments, the first groove 1218 is associated with the first or left-handed pivot position. The pivot joint 1203 also includes a second aperture or second groove 1228 associated with a second or right-handed pivot position. The projection 1223 is configured to mechanically connect to the second groove 1228 to lock the pivot arm 108 into the second pivot position. The pivot joint 1203 further includes a third aperture or third groove 1233 associated with a third or middle position for the pivot arm 108. The projection 1223 is configured to mechanically connect to the third groove 1233 to lock the pivot arm 108 into the third pivot position. In some embodiments, the pivot joint 1203 includes additional apertures or grooves associated with additional pivot positions. In some embodiments, the locking mechanism 113 includes one or more springs 1238 configured to bias the projection 1223 toward one of the first groove 1218, the second groove 1228, or the third groove 1233.

FIG. 14 is an illustration of an internal wire routing portion of the second handle and the grinder 100. The wire path 913 routes the wires 613 from the second handle 105 to the main tool housing 120. The wires 613 run from the internal cavity 505 of the second handle 105 into the first channel 623, and then into a second channel 903 in the pivot arm 108. The wires 613 run from the second channel 903 into a third channel 908 within the pivot arm 108. The second channel 903 and the third channel 908 are configured to route the wires 613 such that the wires 613 do not interfere with the pivoting of the pivot mechanism 103 or the rotation of the pivot arm 108. As previously described, in some embodiments the wires may be configured to electrically and mechanically connect with a main wire harness of the power tool to connect the wires 613 to the controller 200. In some embodiments, the wires 613 connect directly to the controller 200.

Figure 15:
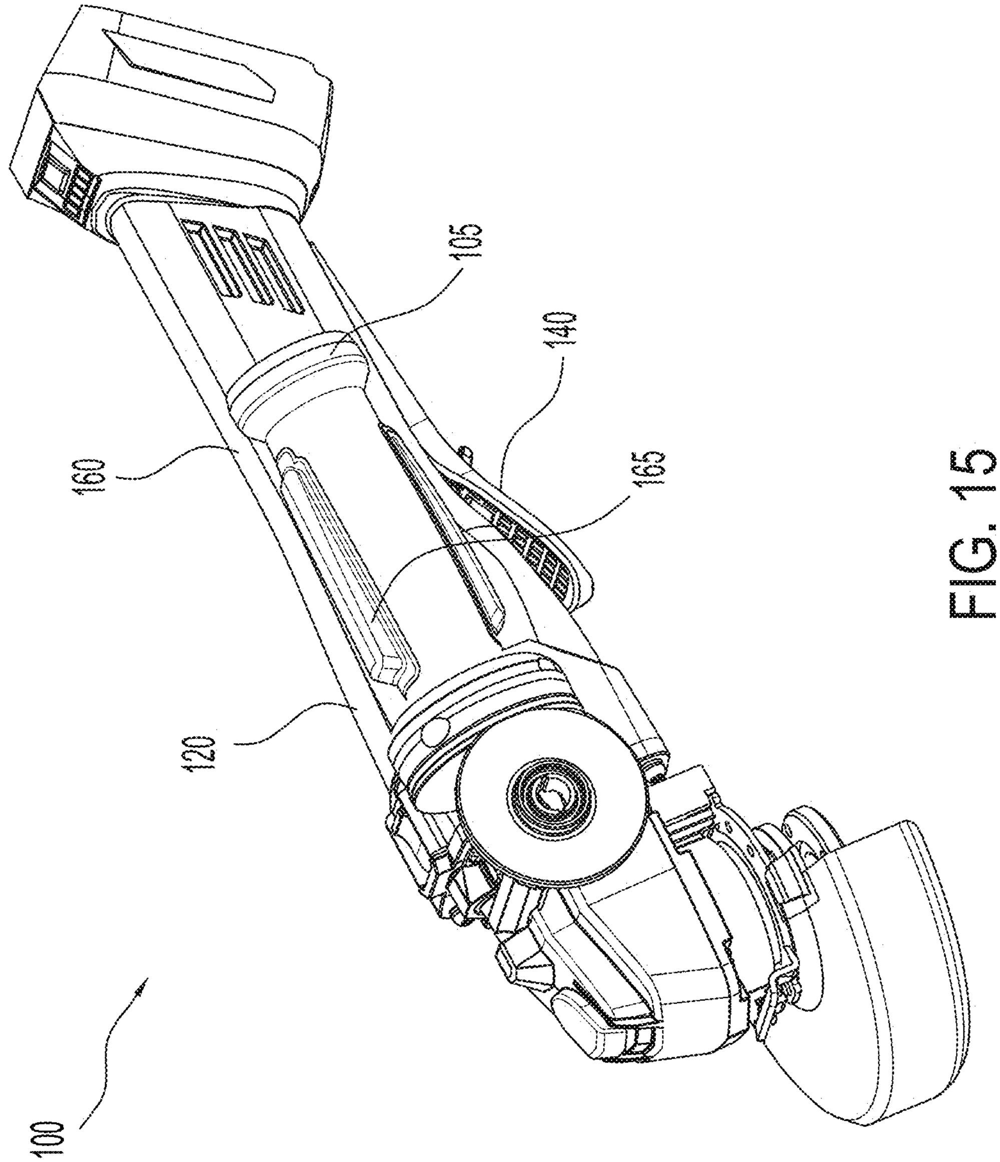
FIG. 15 illustrates a perspective view of a power tool including two-hand control according to some embodiments.

FIG. 15 illustrates an embodiment of the grinder 100 including a two-handed control feature. The grinder 100 includes the first handle 140 for the user to grip with one hand, and a second handle 105 for the user to grip with another hand. In some embodiments, for the grinder 100 to operate, the first handle 140 and/or the second handle 105 include a variety of sensors to detect different operational characteristics and/or user characteristics (e.g., operator presence, grip pressure, etc.). For example, the first handle 140 includes a first sensor 160 for detecting the presence of a user's hand on the first handle 140, and the second handle 105 includes a second sensor 165 for detecting the presence of a user's second hand on the second handle 105. In some embodiments, the sensors 160, 165 are pressure sensors that detect the presence of a minimum grip pressure on the handles 140, 105. Various signals from the sensors located in the second handle 105 may be sent to the grinder 100's main control system, and the operation of the motor 210 may be controlled based on the signals (e.g., enabling or disabling the motor 210, modifying a torque limit, etc.).

In another embodiment, the sensors 160, 165 are capacitive sensors that detect the presence of the user's hands on or near the handles 140, 105. In other embodiments, the sensors 160, 165 are microswitches that detect the presence of the user's hands on the handles 140, 105. In another embodiment, the sensors 160, 165 are photolight sensors that are configured to detect the adjustment of light based on the position of the users hand on the handles 140, 105 (e.g., no light detected indicates hand presence).

In some embodiments, the grinder 100 includes one sensor, such as second sensor 165. The second sensor 165 (e.g., pressure sensor, capacitive sensor, microswitch, photolight sensor, etc.) is located in the second handle 105 to detect the presence of a user's second hand. The user uses the other hand to grip the first handle 140 and pull the main trigger 170 to operate the grinder 100. The sensor 165 must detect the presence of one of the user's hands in addition to compressing the main trigger 170 in order for a signal to be sent to the grinder 100's main control system, and the operation of the motor 210 may be controlled based on the signals (e.g., enabling or disabling the motor 210, modifying a torque limit, etc.).

Figure 16A:
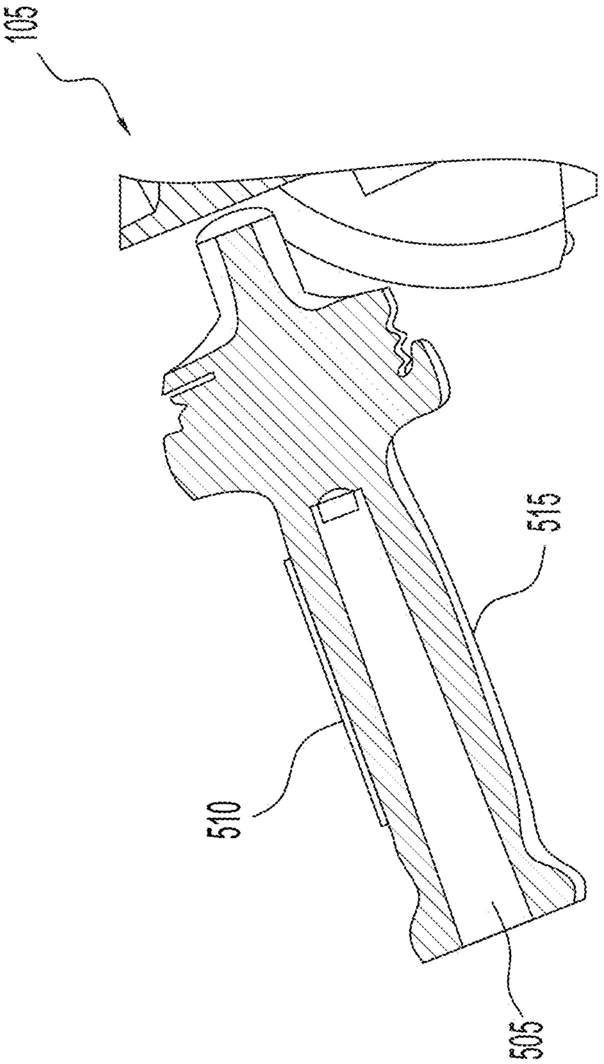
FIG. 16A illustrates a side handle of a power tool of FIG. 15 according to some embodiments.

FIG. 16A illustrates a perspective view of the second handle 105. In some embodiments, the grinder 100 will only operate if a user is operating the grinder 100 by gripping both the first handle 140 and the second handle 105. In some embodiments, the first handle 140 may support a switch or trigger 155 operable to selectively electrically connect the power source (e.g., the battery pack) and the motor 305. In some embodiments, the trigger 155 may be a "lock-off" trigger having a paddle member and a lock-off member supported by the paddle member. The paddle member is operable to actuate a microswitch to selectively activate and deactivate the motor during operation of the grinder 100. The lock-off member selectively prevents operation of the paddle member. Specifically, the lock-off member is pivotable to selectively lock and unlock the paddle member. The speed of the motor may be controlled by varying the level of depression of the paddle member. In some embodiments, the paddle member acts as the detection for a user's first hand on the first handle 140. In other embodiments, a first force sensitive resistor is located on the first handle 140 and is configured to detect pressure (e.g., from a user's first hand). In other embodiments, a user's hand is detected using other sensors (e.g., grip sensors, pressure sensors, touch sensors, electromechanical sensors, etc.).

The second handle 105 includes an internal surface which includes an internal cavity 505. In some embodiments, the internal cavity 505 remains hollow throughout the length of the second handle 105. In some embodiments, the second handle 105 includes a flexible printed circuit board ("PCB") 510 which includes a force sensitive resistor printed on the PCB 510. The PCB is folded or molded around an outer circumference 515 of the second handle 105. The force sensitive resistor may be configured to detect a relatively light pressure (e.g., by a hand). In other embodiments, a grip force above a threshold value is required for the grinder to detect hand presence. In other embodiments, a user's hand is detected using other sensors (e.g., pressure sensors, touch sensors, electromechanical sensors, etc.).

Figure 16B:
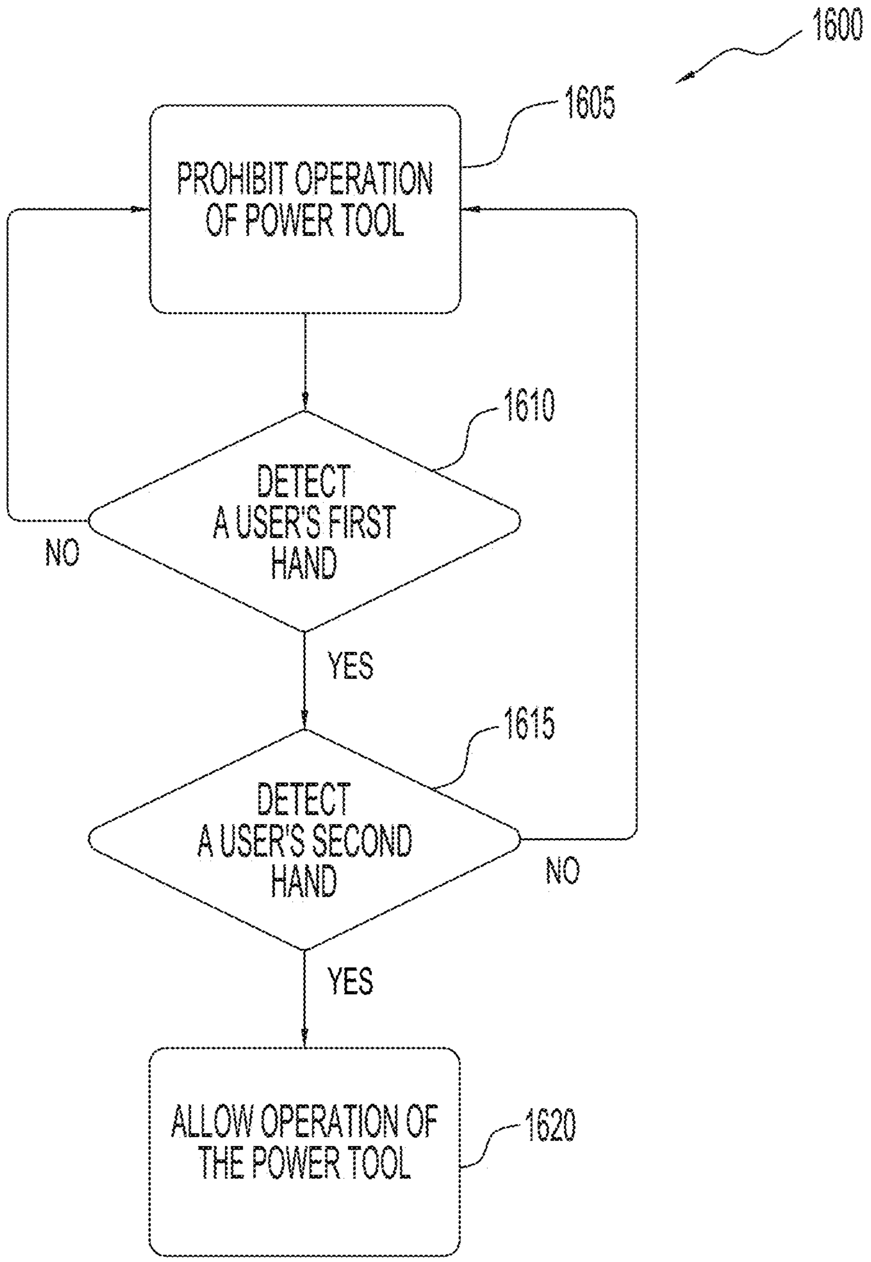
FIG. 16B illustrates a method for detecting operator presence according to some embodiments.

FIG. 16B illustrates a method 600 for allowing use of the grinder 100. When a user indicates an intention to use the grinder 100, the grinder 100 detects a pick-up of the grinder 100 but the grinder 100 is prohibited from operating (STEP 605). The method 600 then includes checking if the user's first hand is detected on the first handle 140 (STEP 610). If the first hand is not detected on the first handle 140, the user is prohibited from using the grinder 100. If the user's first hand is detected, the method 600 then includes checking to see if the user's second hand is detected on the second handle 105 (STEP 615). If the second hand is not detected on the second handle 105, the user is prohibited from using the grinder 100. If the user's second hand is detected to be located on the second handle 105, the controller 300 allows operation of the grinder 100 (STEP 620). As previously described, in some embodiments, there is an activation time associated with the operation of the trigger after a user grips the second handle. For example, in some embodiments, the trigger must be activated within a predetermined time period after a user's grip has been detected. In some embodiments, the controller 300 allows operation of the grinder 100 immediately.

In some embodiments, the grinder 100 includes an electrical connection to an accessory device (e.g., a second handle). The grinder 100 includes the main tool housing 120 that includes the first handle 140 for being gripped by a user. The grinder 100 also includes an accessory device attachment portion on the main tool housing 120. The accessory device attachment portion includes, for example, a threaded hole that can receive an accessory (e.g., having a threaded stud). The accessory device attachment portion is configured to receive an accessory device such as the second handle 105 to provide a second hand grip for a user. When the accessory device is attached to the grinder 100, an electrical connection is provided between the grinder 100 and the accessory device. As a result of this electrical connection, power is provided to the accessory device for powering one or more circuits (e.g., sensors, outputs, etc.) of the accessory device.

Figure 17A:
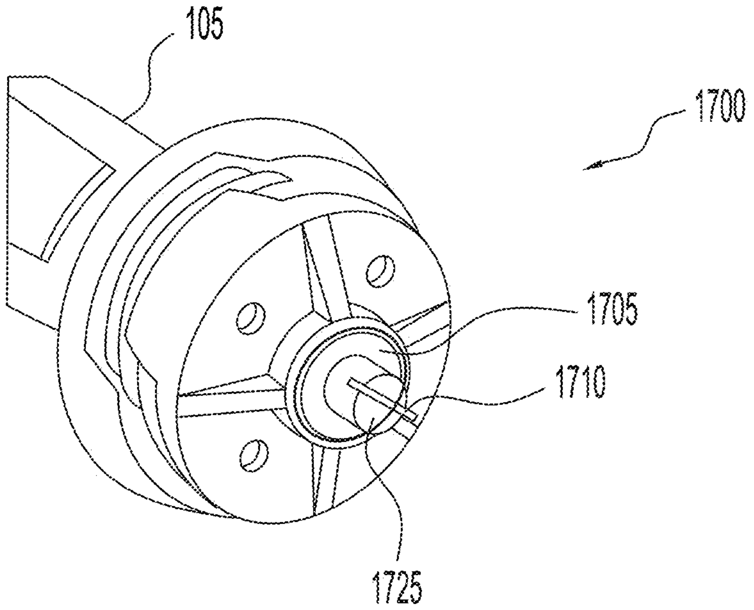
FIGS. 17A and 17B illustrate a perspective view of a side handle including an electrical connection to a power tool according to some embodiments.

For example, FIG. 17A illustrates an embodiment of the electrical connection of the accessory device. In this embodiment, the accessory device is illustrated as second handle 105. The second handle 105 includes a first electrical contact 1710 located on a threaded stem 1725, and a second contact 1705. In some embodiments, the second contact 1705 is a metal annular ring positioned on the second handle 105, and is configured to contact a corresponding electrical contact located on the main tool housing 120. Once the first electrical contact 1710 and the second contact 1705 have made proper connections with their counterparts on the main tool housing 120 (e.g., the second handle 105 is fully screwed down), a sensor (e.g., the force sensitive resistor) will be able to begin sensing on the second handle 105.

Figure 17B:
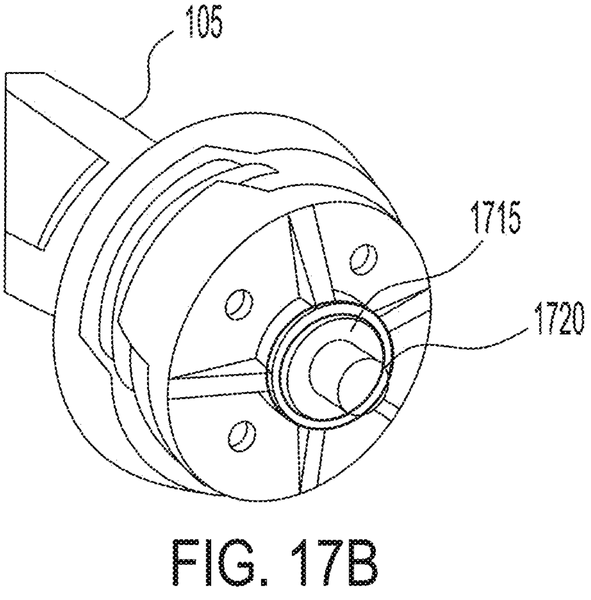

FIG. 17B illustrates another embodiment of the electrical connection of the accessory device. In this embodiment, the accessory device is illustrated as the second handle 105. The second handle 105 includes a first electrical contact 1715 and a second contact 1720, which are metal annular rings positioned on the second handle 105. Once the first electrical contact 1715 and the second contact 1720 have made proper connections with their counterparts on the main tool housing 120 (e.g., the second handle 105 is fully screwed down), a sensor (e.g., the force sensitive resistor) will be able to begin sensing on the second handle 105. In some embodiments, the electrical connection of the accessory device would be a wireless connection between the main tool housing 120 and the accessory device. For example, an inductive or capacitive coupling can be used to wirelessly transmit power to the accessory device. Such a configuration enables a water-tight seal between the grinder 100 and the accessory device.

Figure 17C:
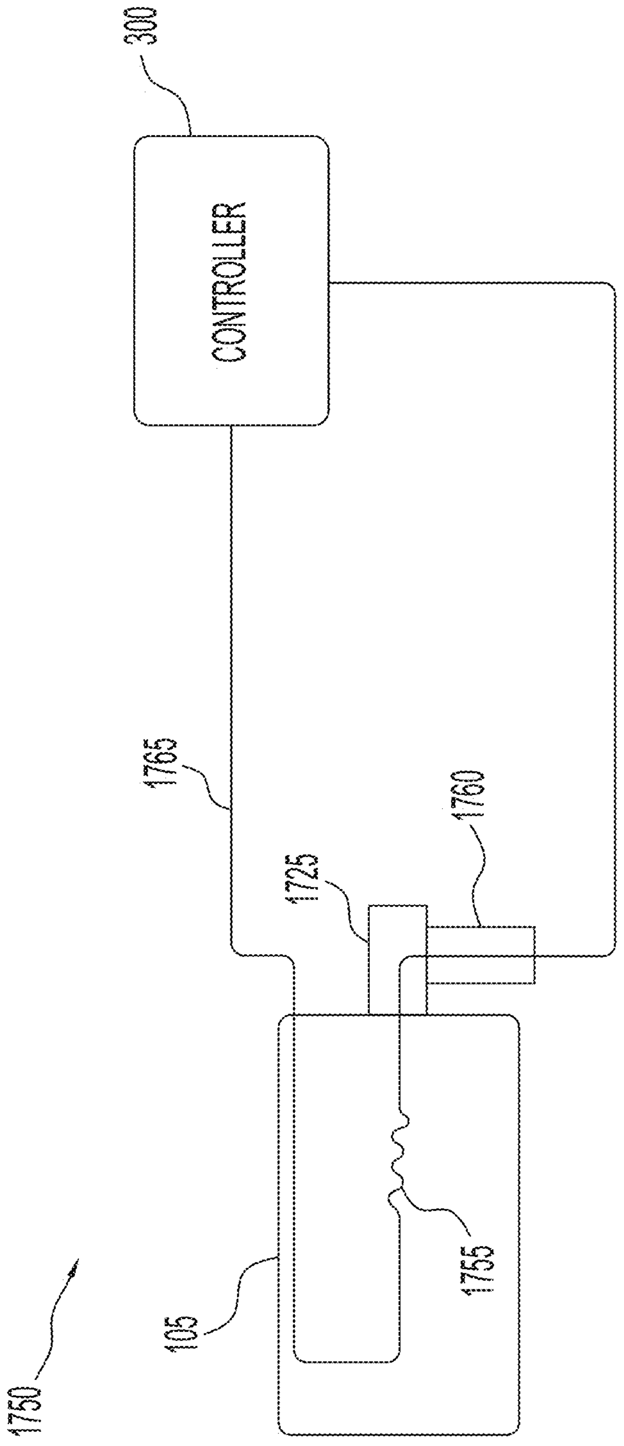
FIG. 17C illustrates a circuit implemented in a power tool for detecting operator presence according to some embodiments.

FIG. 17C illustrates a schematic 1750 for the electrical connection of the accessory device to the grinder 100. The schematic 1750 includes a sensor 1755 (e.g., a force sensitive resistor), a gearcase 1760, and the controller 300. An electrical connection 1765 is made between the grinder 100 and the second handle 105 using, for example, the connection techniques described above with respect to FIGS. 17A and 17B. The controller 300 monitors the resistance of the force sensitive resistor to detect, for example, the presence or absence of a user's hand.

Figure 18:
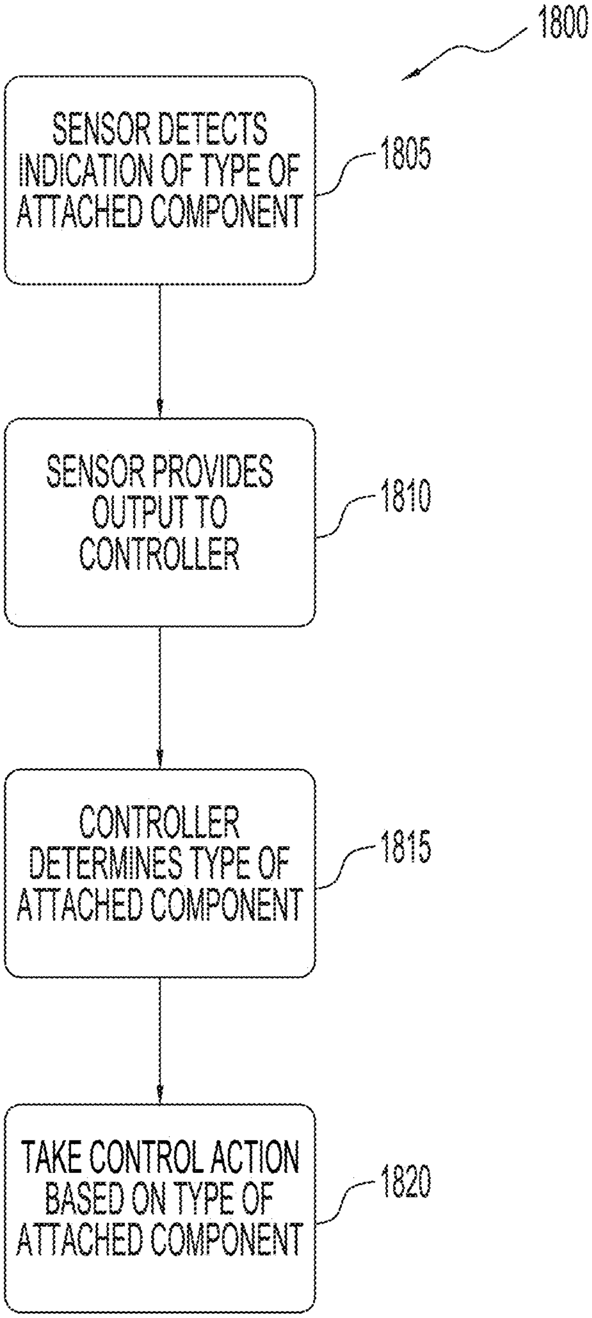
FIG. 18 illustrates a flowchart for a detecting a type of attached component according to some embodiments.

FIG. 18 illustrates a method 1800 for the grinder 100 that detects a type of component connected to the grinder 100 (STEP 1805). For example, the grinder 100 can detect a particular type of disk guard, a particular type of dust hood, etc. The detection of the particular type of component connected to the grinder 100 can be achieved using a sensor (e.g., an induction coil sensor, a Hall effect sensor, an optical sensor, wireless communication, etc.). In some embodiments, the sensor is configured to detect a passive characteristic of the component (e.g., read a bar code, serial number, QR code, etc.). In other embodiments, the component can provide information to the grinder (e.g., using the component type indicator 220). In some embodiments, the component type indicator 220 is an RFID tag. In other embodiments, the component type indicator 220 includes a power source and is configured to communicate with the grinder 100 (e.g., using a short-range communication protocol, such as Bluetooth).

The sensor provides an output to the controller 300 of the grinder 100 (STEP 1810). The controller 300 can then determine the type of attached component based on the output of the sensor (STEP 1815). In some embodiments, the controller 300 looks up a characteristic of the component (e.g., a bar code, serial number, QR code, etc.) to determine the type of component. In other embodiments, information received from the component includes an indication of the type of component attached to the grinder 100. After the grinder 100 determines the particular type of component connected to the grinder 100, the grinder 100 can take a control action based on the detected type of component connected to the grinder (e.g., adjust a torque or speed setting) (STEP 1820).

Figure 19A:
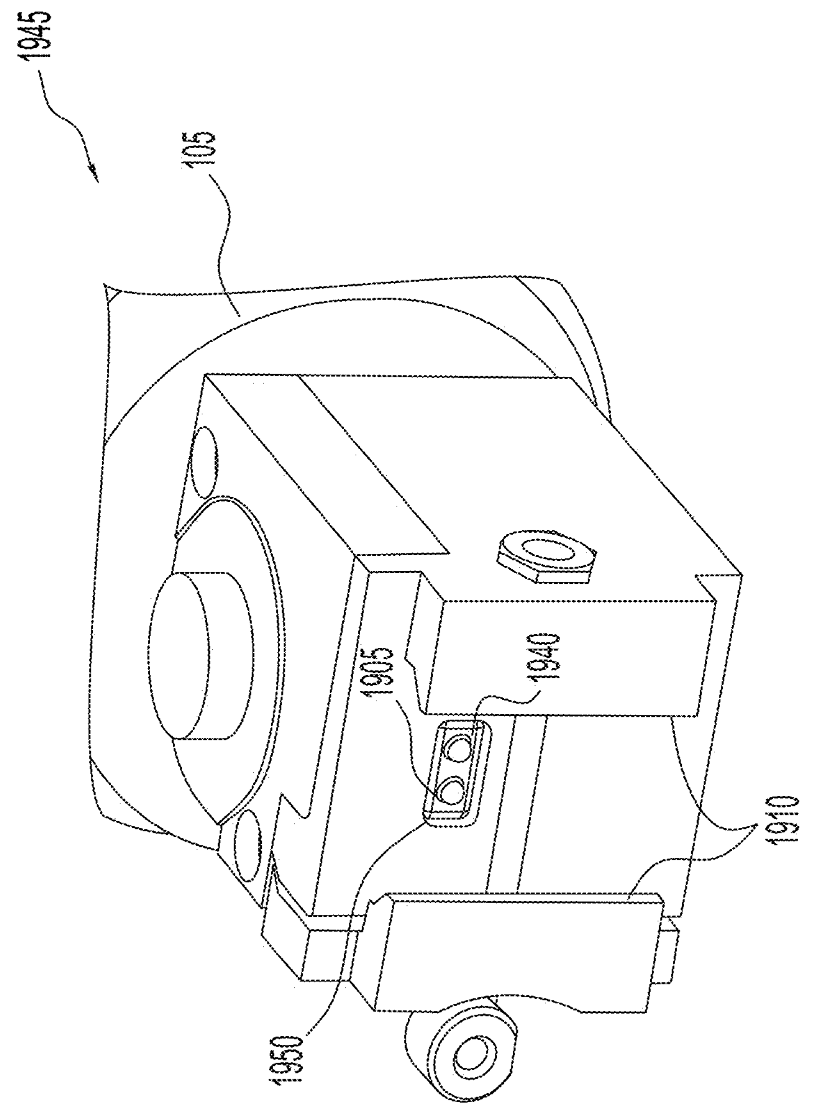
FIG. 19A illustrates a side handle including a side handle electrical connection according to some embodiments.

FIG. 19A illustrates an embodiment of an electrical connection of an accessory device 1945. In this embodiment, the accessory device 1945 is illustrated as the second handle 105. The second handle 105 includes spring loaded contacts 1905. The spring loaded contacts 1905 are used to form the electrical connection from the second handle 105 to the main tool housing 120. The spring loaded contacts 1905 are mounted, for example, on a printed circuit board ("PCB") 1940 located within an accessory device 1945 of the second handle 105. The accessory device 1945 includes an aperture or hole 1950 on a surface of the accessory device 1945. The PCB 1940 is mounted on the surface of the accessory device 1945 that includes the hole 1950. The spring loaded contacts 1905 are positioned on the PCB 1940 to be accessible through the hole 1950.

Figure 19B:
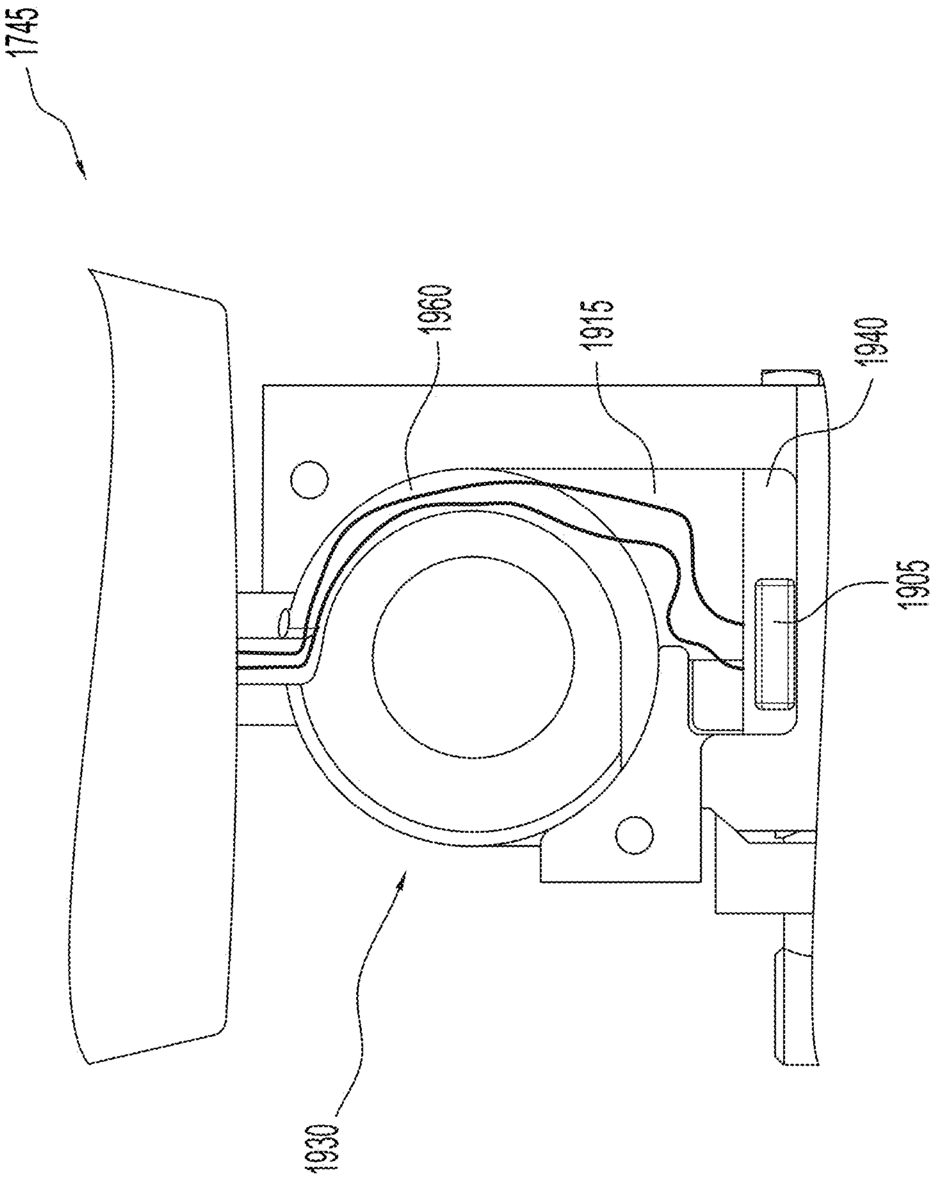
FIG. 19B illustrates wire routing through the side handle of FIG. 19A according to some embodiments.
Figure 19C:
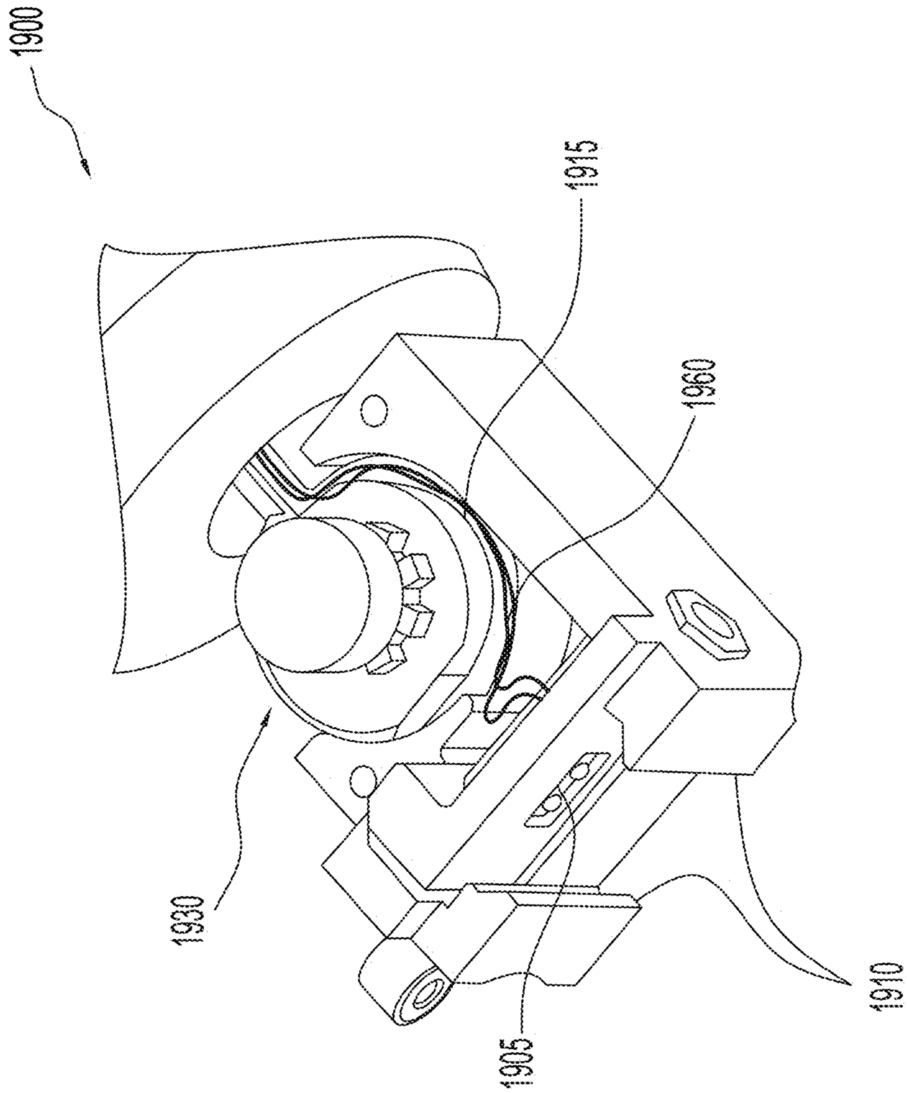
FIG. 19C illustrates wire routing through the side handle of FIG. 19A according to some embodiments.
Figure 19D:
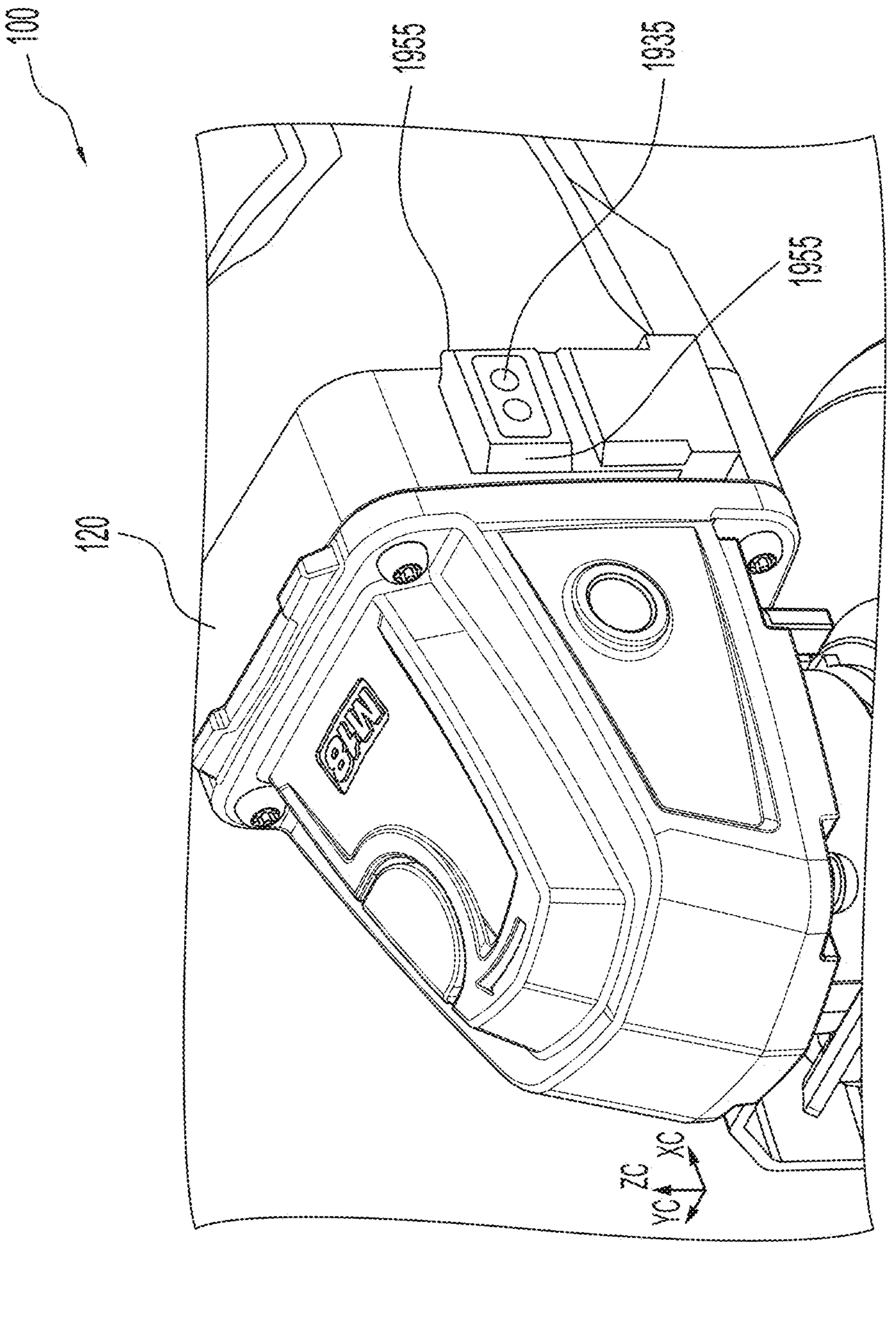
FIG. 19D illustrates a power tool including a side handle electrical for connecting to the side handle of FIG. 19A according to some embodiments.

In some embodiments, the grinder 100 includes a plurality of rails 1955 (see FIG. 19D) located on the side of the main tool housing 120 (as shown in FIG. 19D). The plurality of rails 1955 of the grinder 100 are used to attach to a plurality of rails 1910 of the second handle 105. The rails 1910 slide directly on the rails of the grinder 100, mechanically connecting the grinder 100 and the second handle 105.

When the grinder 100 and the second handle 105 are connected to one another, the spring loaded contacts 1905 are then coupled to a corresponding electrical contact 1935 located on the main tool housing 120. Once the spring loaded contacts 1905 have made electrical connection with their counterparts on the main tool housing 120 (e.g., the second handle 105 has attached rails 1910 with the corresponding rails of the main tool housing 120), a sensor (e.g., pressure sensor, capacitive sensor, microswitch, photolight sensor, etc.) will be able to be used to sense the second handle 105 and a user's hand.

FIG. 19B illustrates an interior of the accessory device 1945. The accessory device 1945 is illustrated as the second handle 105. The second handle 105 includes the spring loaded contacts 1905. In some embodiments, the accessory device 1945 includes a pivoting mechanism 1930. The pivoting mechanism 1930 allows the second handle 105 to rotate with respect to the grinder 100, while the accessory device 1945 remains securely attached and electrically connected to the main tool housing 120. In some embodiments, the accessory device 1945 includes extra space extending from the second handle 105 to the PCB 1940. This extra space allows wire to coil as the second handle 105 is adjusted. In some embodiments, the extra space includes a channel 1915 for the extra wire to travel to. For example, as the second handle 105 rotates with respect to the accessory device 1945 via the pivoting mechanism 1930, the extra wire extends and retracts based on the positioning of the second handle 105.

FIG. 19C illustrates another view of the electrical connection of the accessory device 1945. In some embodiments, the accessory device 1945 includes the pivoting mechanism 1930. To allow the wires 1960 to move with the pivoting mechanism 1930, the extra space includes the channel 1915 for the wire to extend from the second handle 105 to the PCB 1940. The channel 1915 is curved around the pivoting mechanism 1930, allowing for the extra wire to travel around the pivoting mechanism 1930 and not interfere with the rotation of the pivoting mechanism 1930.

FIG. 19D illustrates the electrical connection of the grinder 100 to the second handle 105. As previously noted, the main tool housing 120 includes an accessory device interface. The accessory device interface includes a plurality of rails 1955 that are attached to the plurality of rails 1910. Once the second handle 105 is attached to the main tool housing 120, a plurality of electrical contacts 1935 are configured to come into contact with the corresponding spring loaded contacts 1905. When the plurality of electrical contacts 135 and the spring loaded contacts 1905 have made electrical connection, a sensor (e.g., pressure sensor, capacitive sensor, microswitch, photolight sensor, etc.) will be able to begin sensing on the second handle 105 and a user's hand.

Figure 19E:
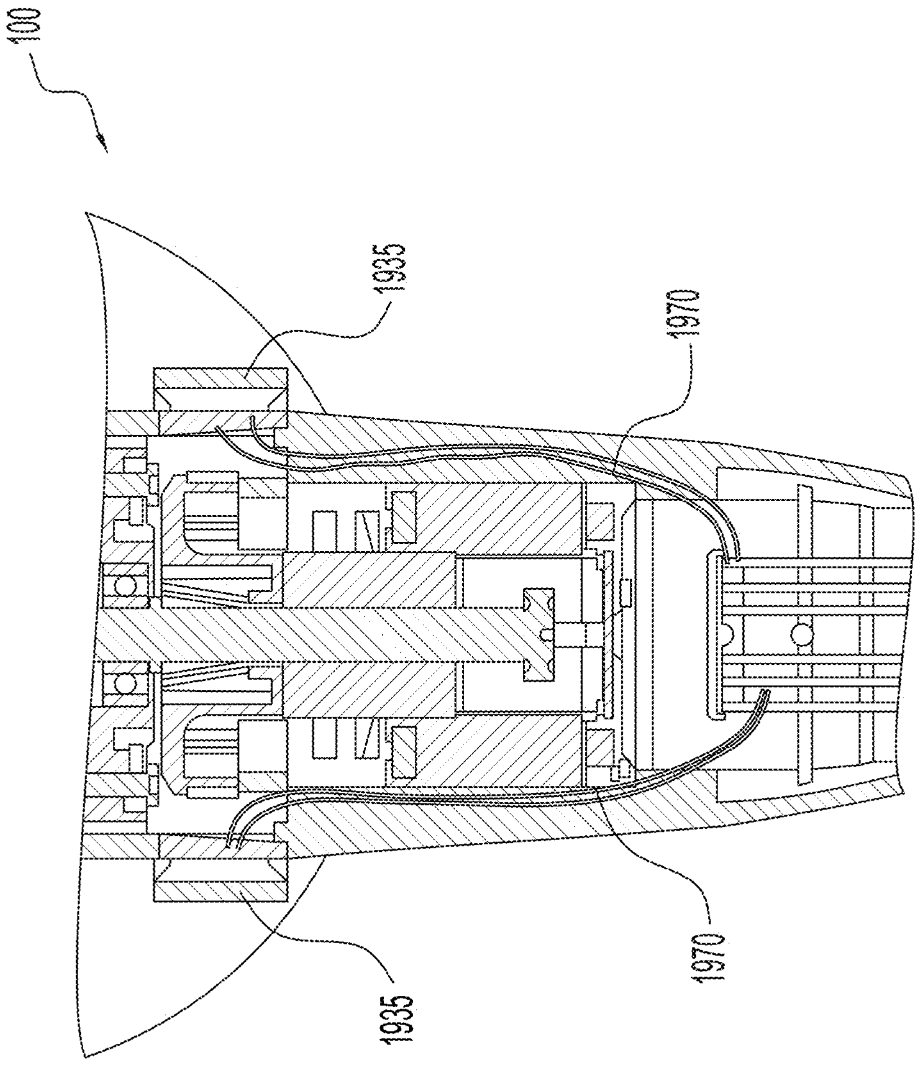
FIG. 19E illustrates wire routing of the power tool of FIG. 19D according to some embodiments.

FIG. 19E illustrates electrical connections of the grinder 100 to the second handle 105. In some embodiments, the second handle 105 may be electrically and mechanically connected to either side of the grinder 100. Furthermore, because the second handle 105 can be connected to either side of the grinder 100, there is a set of mechanical components on either side of the grinder 100. For example, the mechanical components include rails 1955 for the rails 1910 of the second handle 105 to firmly attach to. In addition to the mechanical components, there are also electrical contacts 1935 on either side of the grinder so that an electrical connection may be made from the second handle 105 and the grinder 100. In some embodiments, a plurality of wires 1970 extend from the grinder 100's main control system to the plurality of electrical contacts 1935 of the grinder 100. Two sets of the plurality of wires 1970 extend from the main control system, one set of the plurality of wires 1970 extend to one side of the grinder 100 and the other set of the plurality of wires 1970 extend to the other side of the grinder 100. When the second handle 105 is attached to either or both sides of the grinder 100, the plurality of electrical contacts 1935 on either side of the grinder 100 are configured to come into contact with the corresponding spring loaded contacts 1905 of the handle 105. When the plurality of electrical contacts 1935 and the spring loaded contacts 1905 have made electrical connection, a sensor (e.g., pressure sensor, capacitive sensor, photolight sensor, etc.) will be able to begin sensing on the second handle 105 and a user's hand.

Figure 20:
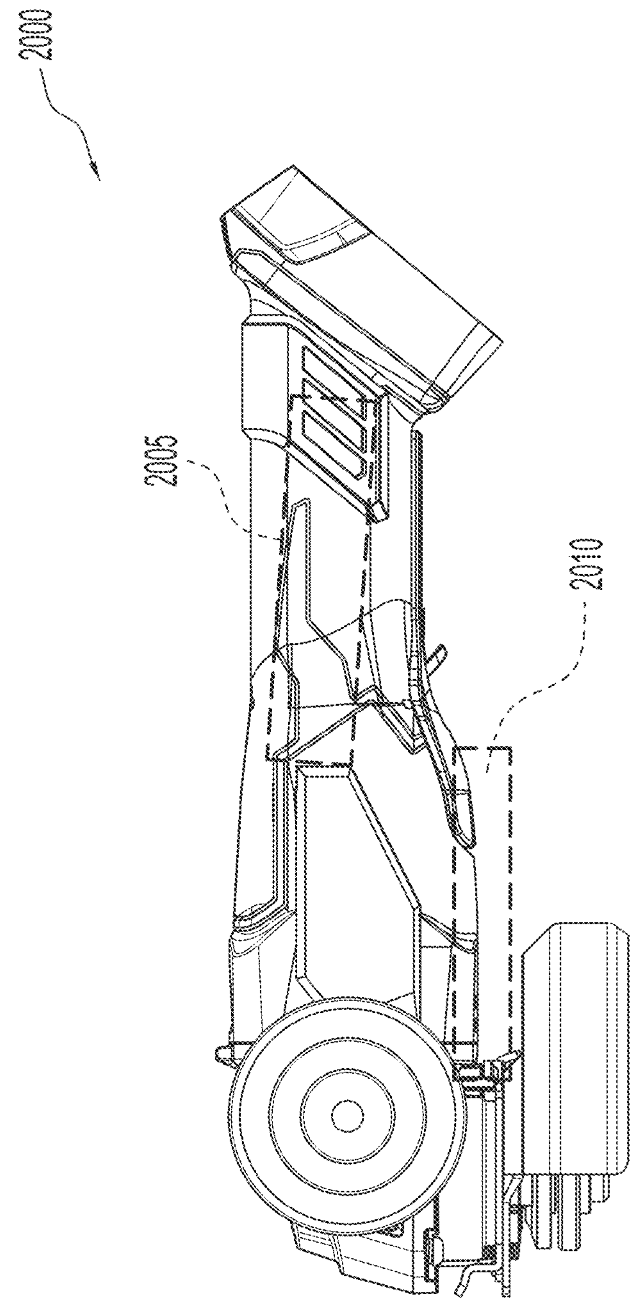
FIG. 20 illustrates a power tool including an autostop function according to some embodiments.

FIG. 20 illustrates a grinder 2000 that includes a loss of control mitigation system. In some embodiments, the grinder 2000 includes some or all of the previously described features of the grinder 100. The grinder 2000 includes a loss of control module. The loss of control module includes a sensor (e.g., an accelerometer, a gyroscope, an inertial measurement unit ["IMU"]) and is configured to detect linear and/or rotational motion of the grinder 2000. In some embodiments, the loss of control module is located in a first position 2005. The first position 2005 couples the loss of control module to the main control system. The main control system is located within the first handle 140 between the main tool housing 120 and the battery pack interface 310. In some embodiments, by coupling the loss of control module with the main control system of the grinder 2000, the loss of control module will be slightly tilted relative to a longitudinal axis of the grinder 2000 (i.e., the cutting plane of the blade 150).

In another embodiment, the loss of control module is located in a second position 2010. The second position 2010 locates the loss of control module in the area of the guard presence sensor 215 described above. The guard presence sensor 215 is located near the front of the grinder 2000, above the disk guard 130 so that, when the guard presence sensor 215 is coupled to the loss of control module, the loss of control module will be close to the front of the grinder 2000. In the second position, the loss of control module is parallel to the longitudinal axis of the grinder 2000 (i.e., the cutting plane of the blade 150).

Figure 21A:
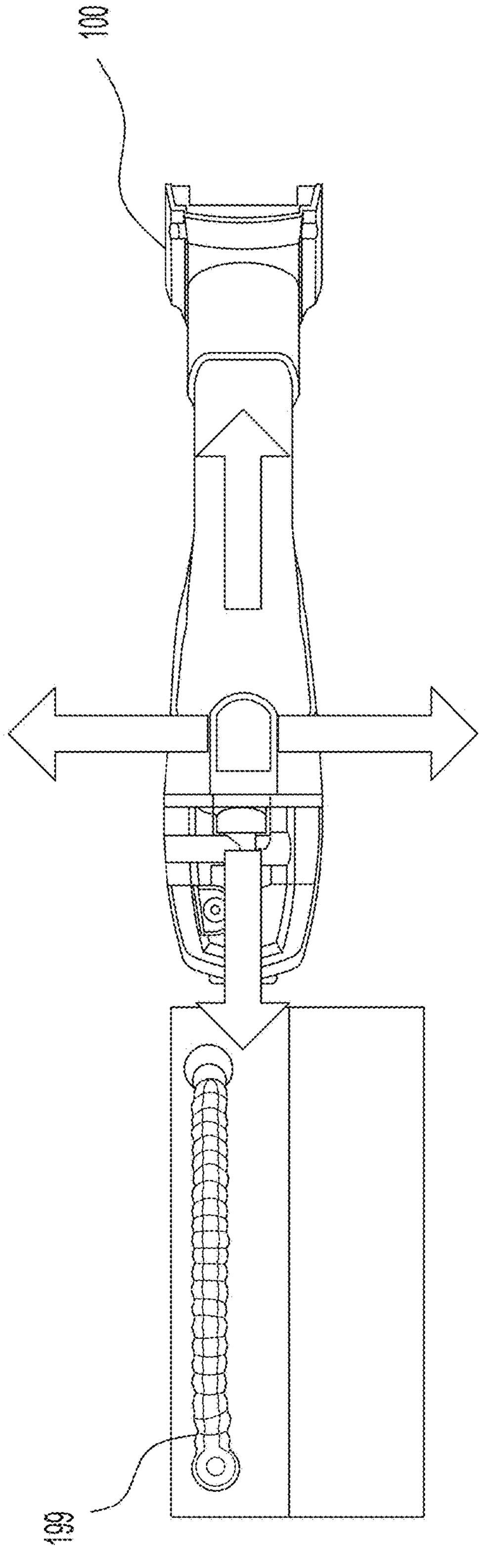
FIGS. 21A and 21B illustrates a perspective view of a power tool including loss of control detection according to some embodiments
Figure 21B:
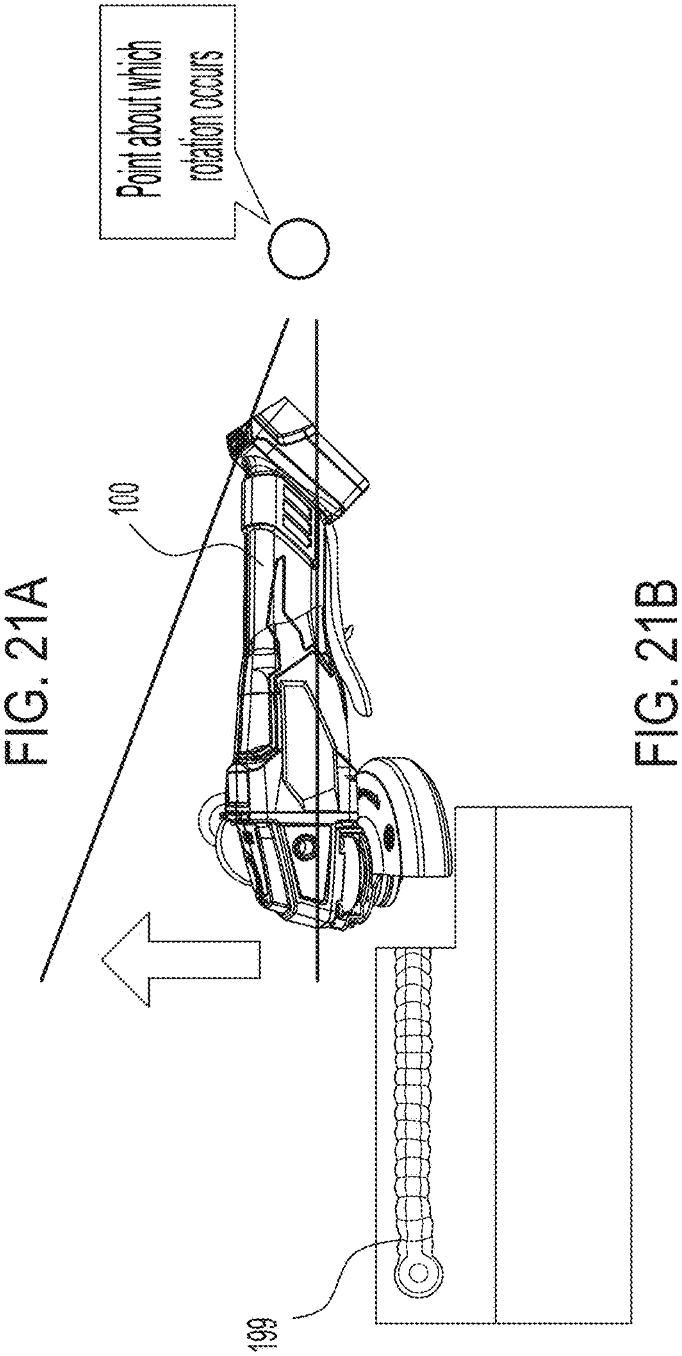

FIGS. 21A and 21B illustrate a grinder that includes a loss of control mitigation system. The grinder 100 includes at least one sensor located, for example, within the main tool housing 120. The at least one sensor is configured to detect a motion of the grinder 100 indicative of a loss of control of the grinder 100.

In some embodiments, as illustrated in FIG. 21A, a sensor (e.g., an accelerometer, a gyroscope, an inertial measurement unit ["IMU"]) is configured to detect linear motion of the grinder 100. The linear motion may be described as a forward motion or a reverse motion with respect to a workpiece 199. In other embodiments, the linear motion may be described as lateral to the workpiece 199. If the linear motion, as detected by the sensor, exceeds a predetermined threshold, a loss of control is determined. In some embodiments, when the loss of control is determined, the grinder 100 is configured to brake the motor 305.

In other embodiments, as illustrated in FIG. 21B, a sensor (e.g., an accelerometer, a gyroscope, an inertial measurement unit ["IMU"]) is configured to detect a rotation of the grinder 100. The rotation of the grinder 100 may be described as an upward or vertical motion with respect to a workpiece 199. In another embodiment, the rotation of the grinder 100 may be described as a rotation about the battery pack receptacle 145. If the rotational motion, as detected by the sensor, exceeds a predetermined threshold, a loss of control is determined. In some embodiments, when the loss of control is determined, the grinder 100 is configured to brake the motor 305.

Figure 21C:
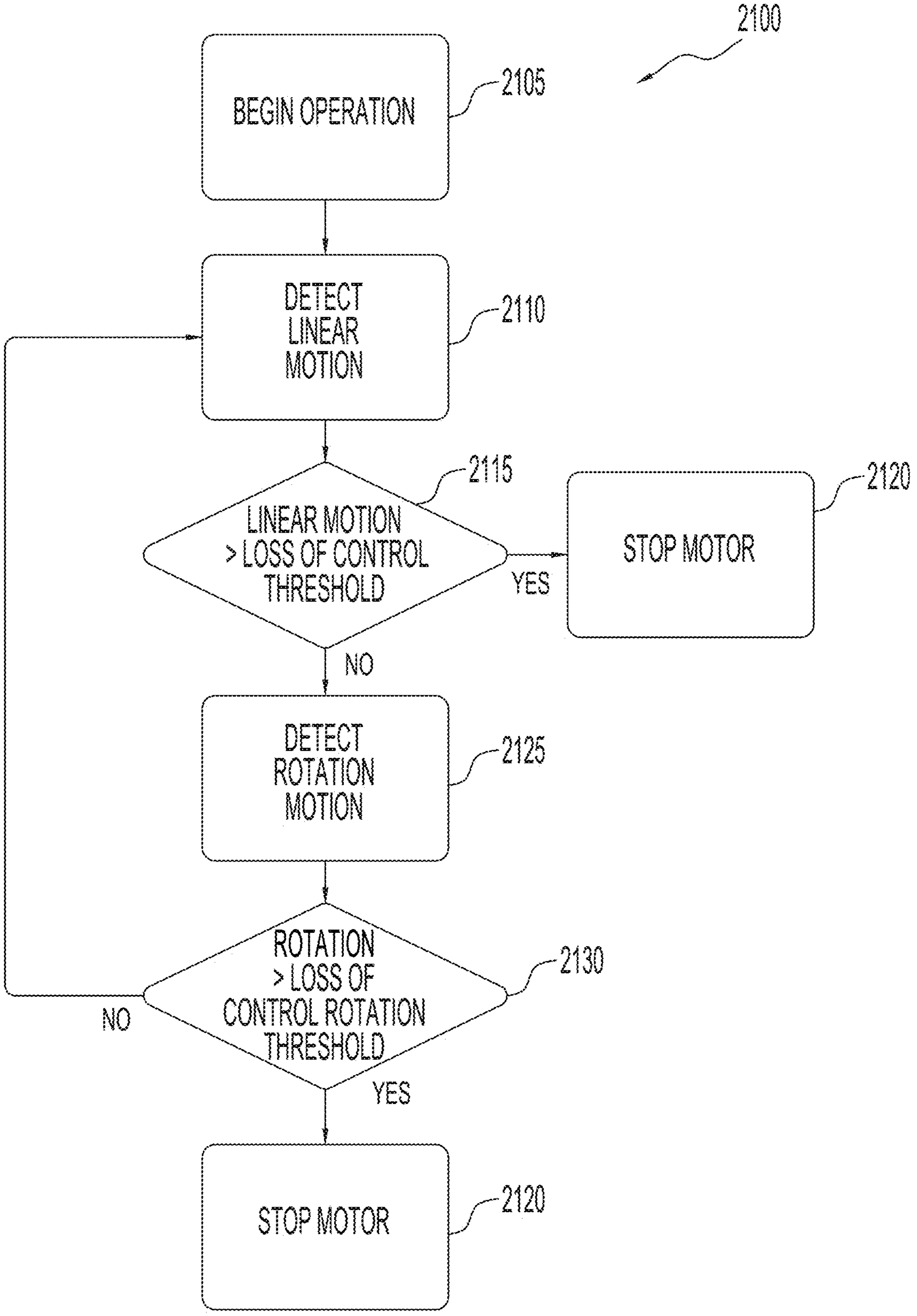
FIG. 21C illustrates a flowchart for a power tool including loss of control detection according to some embodiments

FIG. 21C shows a method 2100 for detecting a loss of control condition of the grinder 100. When a user initiate use of the grinder 100 (STEP 2105), work on a workpiece begins. The method 2100 includes detecting linear motion (STEP 2110) as detected from a sensor (e.g., an accelerometer, a gyroscope, an inertial measurement unit ["IMU"]). If the linear motion detected by the sensor exceeds a linear loss of control threshold (STEP 2115), the motor 305 of the grinder 100 is stopped (e.g., braked). If the linear motion detected does not exceed the linear loss of control threshold, the method 2100 then includes detecting rotational motion of the grinder 100 (STEP 2125). If the rotational motion of the grinder 100 exceeds a rotational loss of control threshold (STEP 2130), the motor 305 of the grinder 100 is stopped (e.g., braked). If the rotational motion of the grinder 100 does not exceed the rotational loss of control threshold, the method 2100 restarts, providing a constant monitoring of a loss of control mitigation method. In some embodiments, both linear and rotational motion are detected and monitored for the loss of control condition simultaneously. In some embodiments, rotational motion is monitored prior to linear motion of the grinder 100.

Figure 21D:
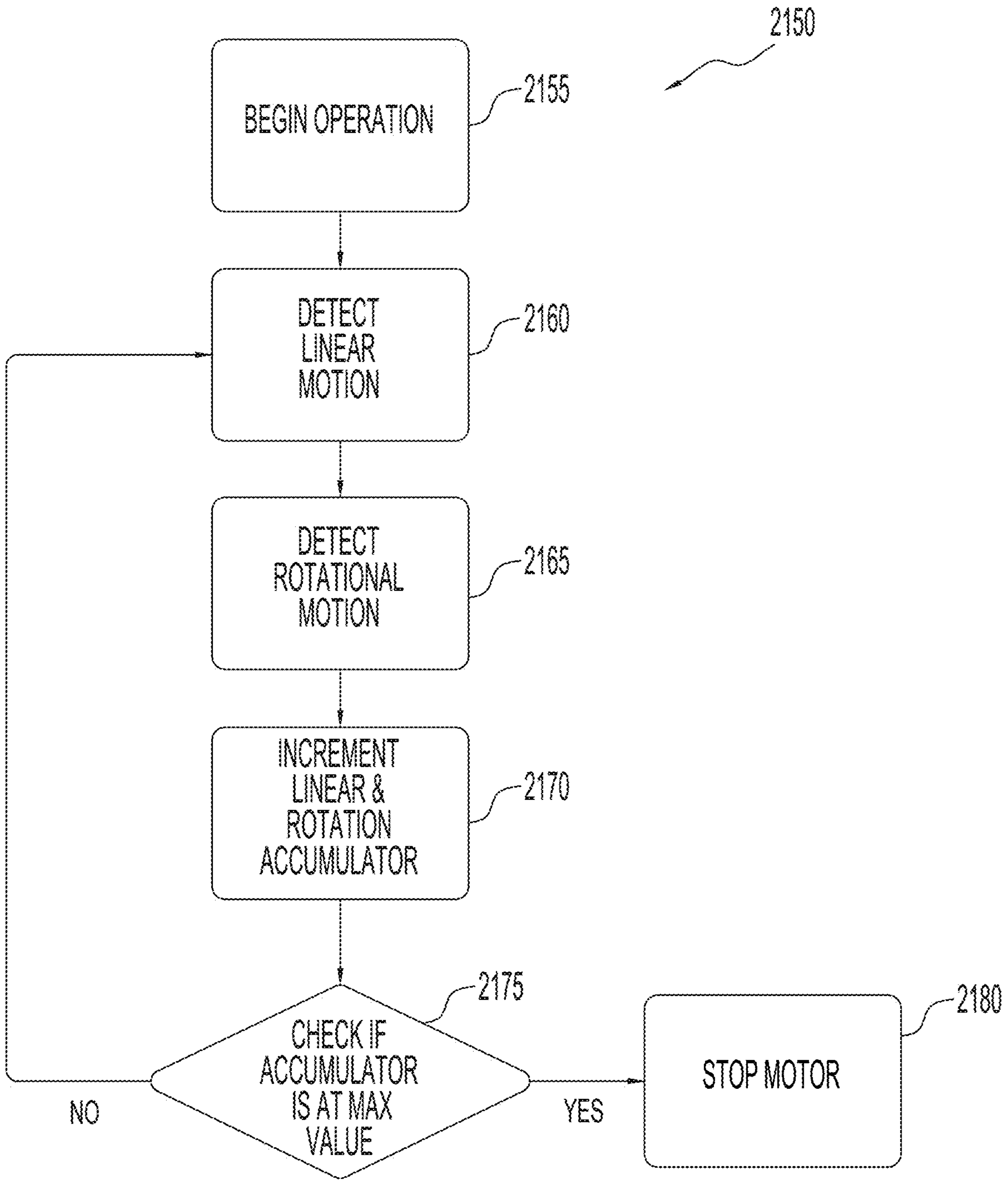
FIG. 21D illustrates a flowchart for a power tool including loss of control detection according to some embodiments.

FIG. 21D shows a method 2150 for detecting a loss of control condition of the grinder 100. When a user initiates use of the grinder 100 (STEP 2155), work on a workpiece begins. The method 2150 includes detecting linear motion (STEP 2160) as detected from a sensor (e.g., an accelerometer, a gyroscope, an inertial measurement unit ["IMU"]). The method 2150 includes detecting rotational motion (STEP 2165) as detected from a sensor (e.g., an accelerometer, a gyroscope, one or more Hall effect sensors, or the like). The method 2150 further includes incrementing a linear and rotation accumulator (STEP 2170) based upon a threshold level. For example, if the linear motion detected in STEP 2160 exceeds a first threshold and/or the rotational motion detected in STEP 2165 exceeds a second threshold, the accumulator will increment. In some examples, the accumulator increments based upon both a linear motion threshold and a rotational motion threshold. In some examples, the linear motion and the rotational motion have separate accumulators that increment independently. If the accumulator has reached a predetermined maximum value at STEP 2175, the motor 305 of the grinder 100 is stopped (e.g. braked) (STEP 2180). On the other hand, if the accumulator has not reached a predetermined maximum value, the method 2150 returns to STEP 2160 to again detect motion, and thus providing a constant monitoring for a loss of control mitigation method. In some embodiments, rotational motion is monitored prior to linear motion of the grinder 100.

FIGS. 22A, 22B, 22C, 22D, 22E, and 22F illustrate embodiments of a grinder including a connected second handle 105. In some examples, the grinder includes some or all of the previously described features of the grinder 100. The second handle 105 includes several different embodiments regarding the movement and placement of the second handle 105, making the second handle 105 adjustable to suit the user's needs.

Figure 22A:
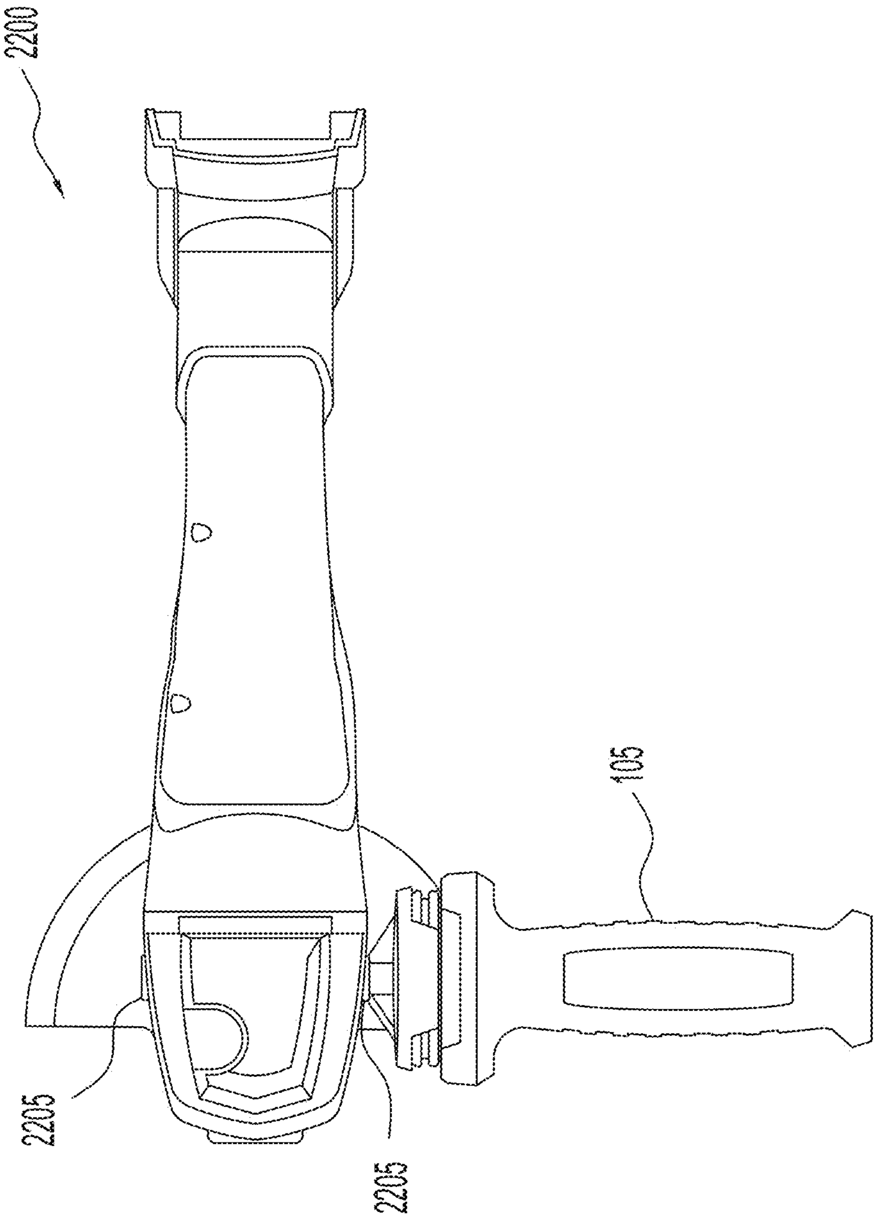
FIG. 22A illustrates a power tool including an adjustable side handle location according to some embodiments.

As illustrated in FIG. 22A, an embodiment 2200 of the grinder 100 includes the second handle 105. The second handle 105 includes, for example a threaded screw for fastening the second handle to the grinder 2200. The grinder

2200 includes corresponding threaded holes 2205 for receiving the threaded screw of the second handle 105 on either side of the grinder 2200. FIG. 22A illustrates the second handle 105 in a standard position on a left-hand side of the grinder 2200 with the second handle 105 configured at a 90-degree angle to the grinder 2200. The second handle 105 can alternatively or additionally be positioned on the right-hand side of the grinder 2200.

Figure 22B:
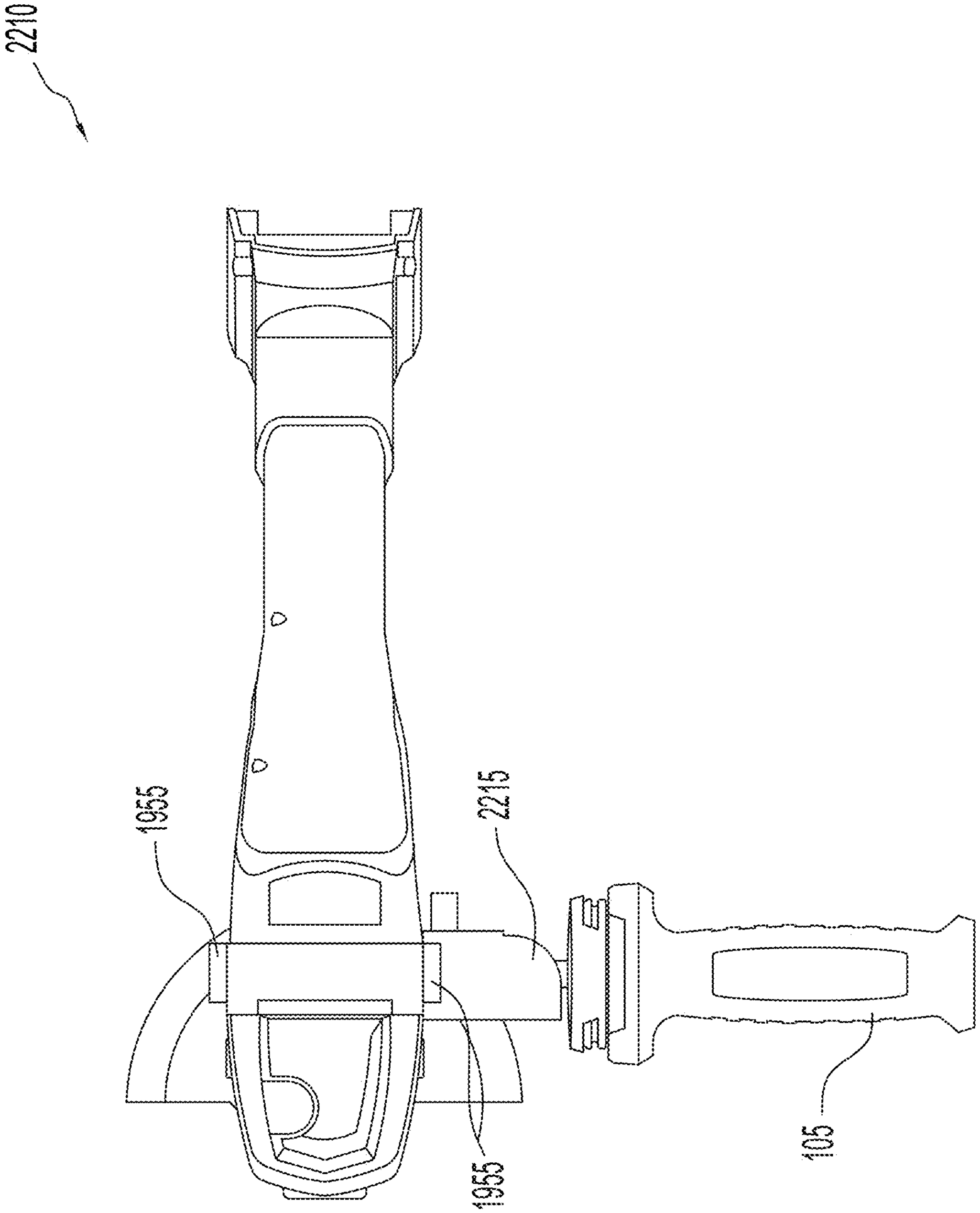
FIG. 22B illustrates a power tool including an adjustable side handle location according to some embodiments.

In some embodiments, if the 90-degree angle for the user is not conducive to the operation that the user is performing, an embodiment 2210 of the grinder 100 can include the second handle 105 having a pivoting mechanism 2215 for pivoting the second handle 105 from a position perpendicular to the grinder 2210 to a position parallel to the grinder 2210 (not shown), as illustrated in FIG. 22B. The pivoting mechanism 2215 allows for the second handle 105 to pivot towards the grinder 2210. In some embodiments, the second handle 105 can attach to the grinder 2210 using rails as described above with respect to FIGS. 19A-19D. The second handle 105 can alternatively or additionally be positioned on the right-hand side of the grinder 2210. In some embodiments, the pivoting mechanism includes a button to release the second handle 105 for movement of the second handle 105.

Figure 22C:
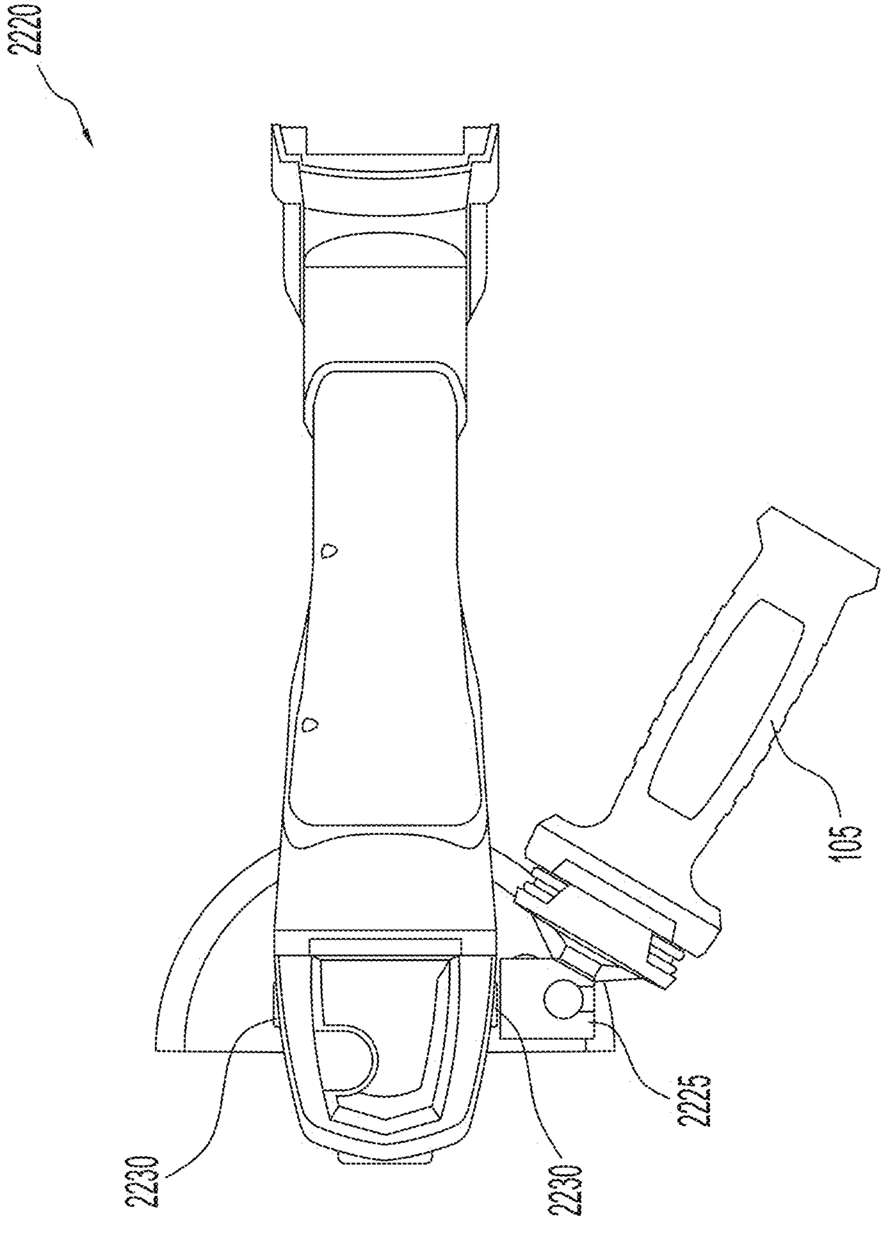
FIG. 22C illustrates a power tool including an adjustable side handle location according to some embodiments.

FIG. 22C illustrates an embodiment 2220 of the grinder 100 that includes a two-position pivoting handle. When the second handle 105 has pivoted away the grinder 2220 to a primary position, the second handle 105 is an approximately 90 degree angle (i.e., perpendicular) with respect to the grinder 2220. In some embodiments, when the second handle is pivoted toward a secondary position, the second handle 105 is in an approximately 45 degree angle with respect to the grinder 100. In other embodiments, the secondary position can be at another angle (e.g., 40-degrees, 60-degrees, etc.) with respect to the grinder 2220. A pivoting mechanism 2225 is connected between the handle 105 and the grinder 2220 such that the second handle includes two (or possible more) discrete locked mechanical positions for securing the orientation of the second handle 105. The pivoting mechanism 2225 can then include a threaded screw or hole for securing the second handle 105 to a complementary interface 2230 on the left and/or right side of the grinder 2220.

Figure 22D:
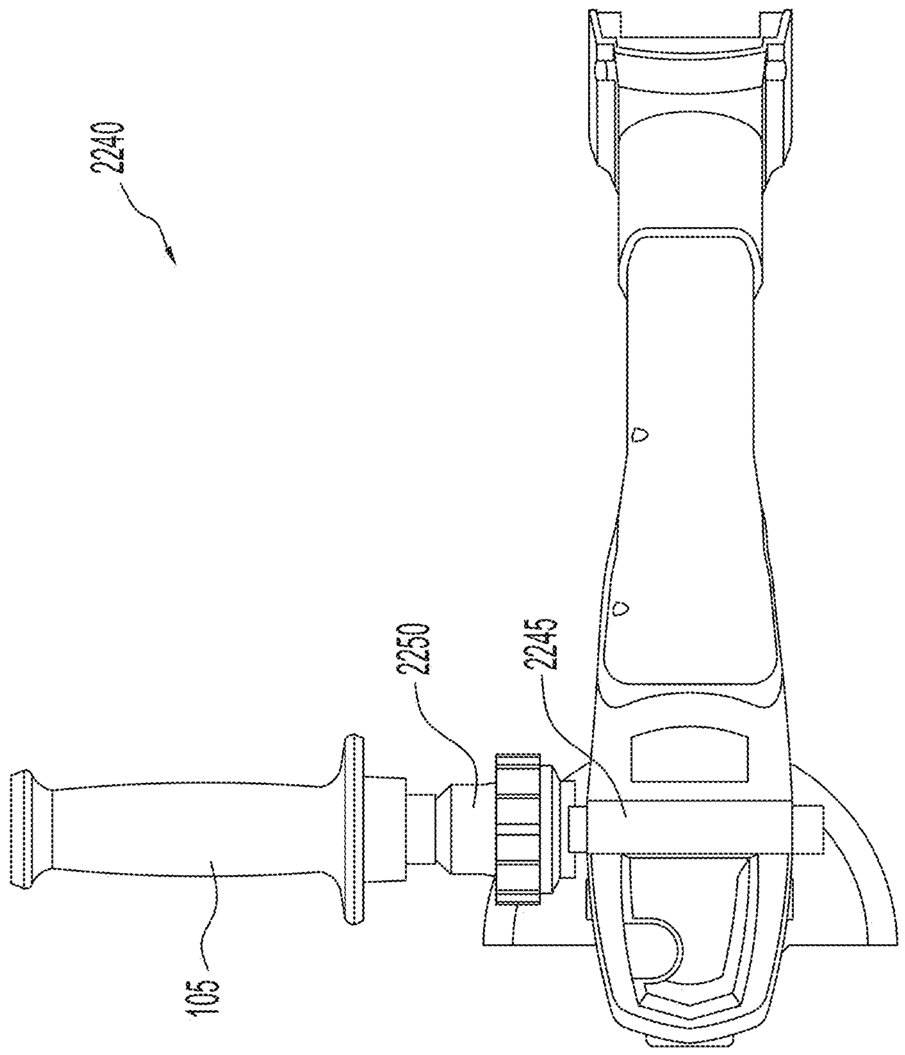
FIG. 22D illustrates a power tool including an adjustable side handle location according to some embodiments.

In another embodiment 2240 of the grinder 100, the second handle 105 can be secured to the grinder 2240 by a strap 2245, as illustrated in FIG. 22D. A tightening mechanism 2250 can be rotated to slacken or tighten the strap 2245 around the housing of the grinder 2240. Because the strap 2245 secures the second handle 105 to the grinder 2240 by friction and not a dedicated mechanical interface of the grinder 2240, the second handle can be rotated to any desirable orientation of the second handle 105 perpendicular to the grinder 2240.

Figure 22E:
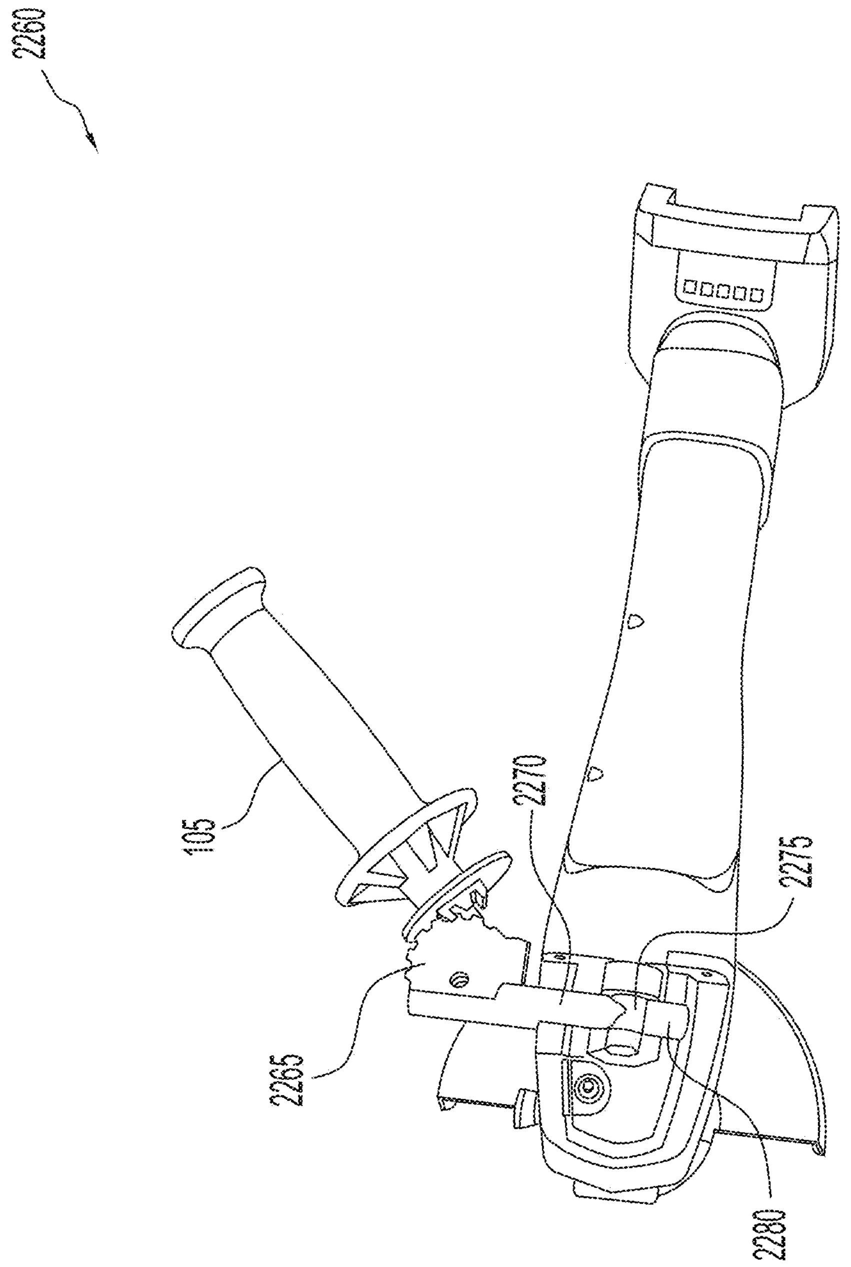
FIG. 22E illustrates a power tool including an adjustable side handle location according to some embodiments.

FIG. 22E illustrates in another embodiment 2260 of the grinder 100 that includes a pivoting mechanism 2265, similar to the pivoting mechanisms described previously. The pivoting mechanism 2265 enables the second handle 105 to be pivoted closer to the grinder 2260 in a secondary position other than perpendicularly to the grinder 100. In some embodiments, the secondary position is in a 45 degree angle from the grinder 2260. In other embodiments, the secondary position can be at another angle (e.g., zero degrees, 20 degrees, 40 degrees, 60 degrees, etc.) with respect to the grinder 100. The pivoting mechanism is also attached to a pivot arm 2270 that permits the second handle 105 to be rotated from the right side of the grinder 2260 to the left side of the grinder 2260 about a pivot axis 2275. The grinder 2260 includes a channel 2280 for receiving the pivot arm 2270 on either side of the grinder 2260. Once the second handle 105 is rotated to either side of the grinder, the pivot arm 2270 can be secured in place (e.g., by a button and a retention mechanism, a lever, etc.) to secure the pivot arm 2270 in place.

Figure 22F:
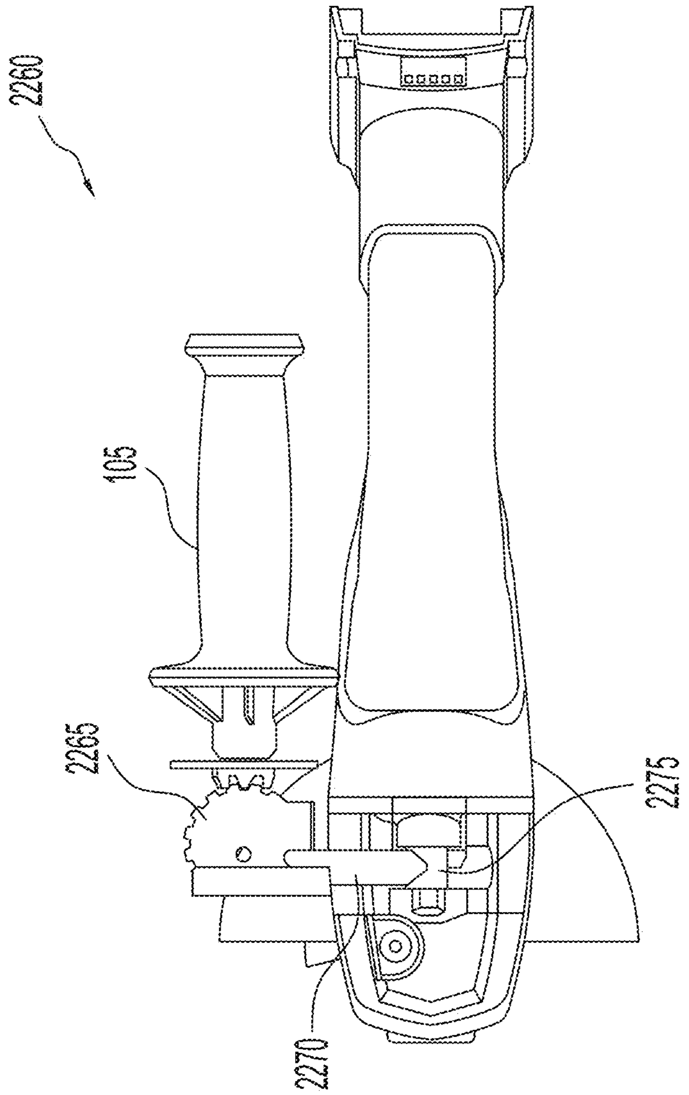
FIG. 22F illustrates a power tool including an adjustable side handle location according to some embodiments.

FIG. 22F illustrates the embodiment 2260 of the grinder 100 with the second handle 105 pivoted to be directly adjacent to the grinder at a 0-degree angle in a fold-away position. By pivoting the second handle 105 to be adjacent to the grinder 100, it allows for a more compact and efficient method of storage. In some embodiments, the fold-away position prevents an opportunity for damage to occur to the second handle 105 when the second handle 105 is secured against the main tool housing 120. The second handle 105 could be similarly stowed on the left side of the grinder 2260.

Figure 23A:
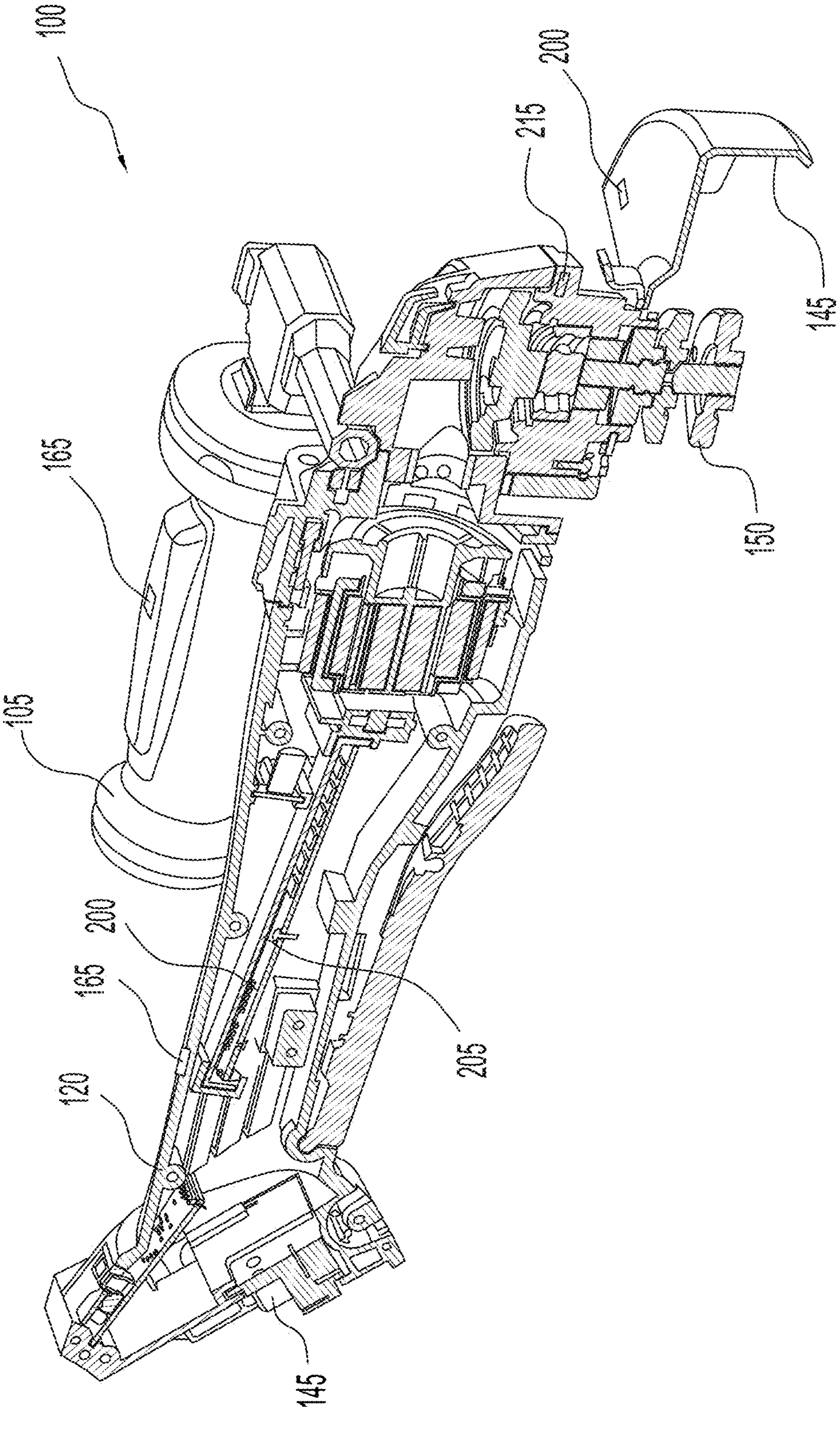
FIG. 23A-23C illustrate a power tool including component sensing according to some embodiments.
Figure 23B:
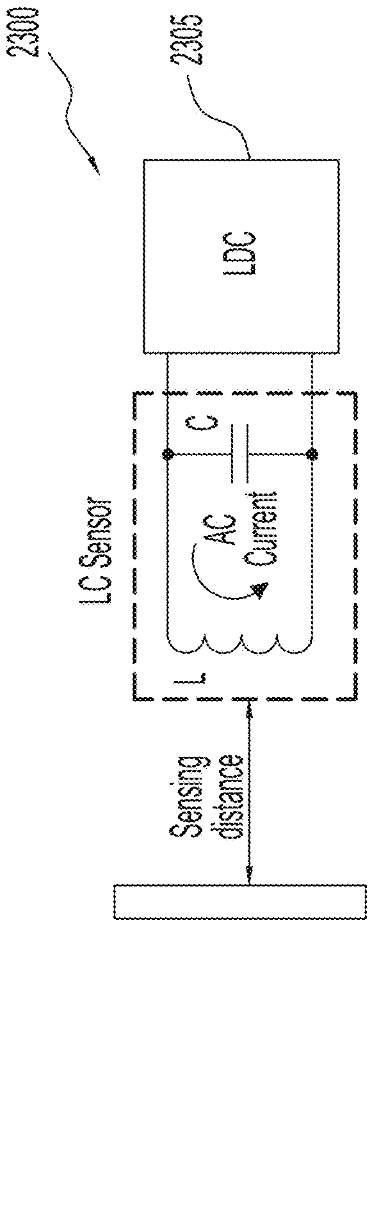
Figure 23C:
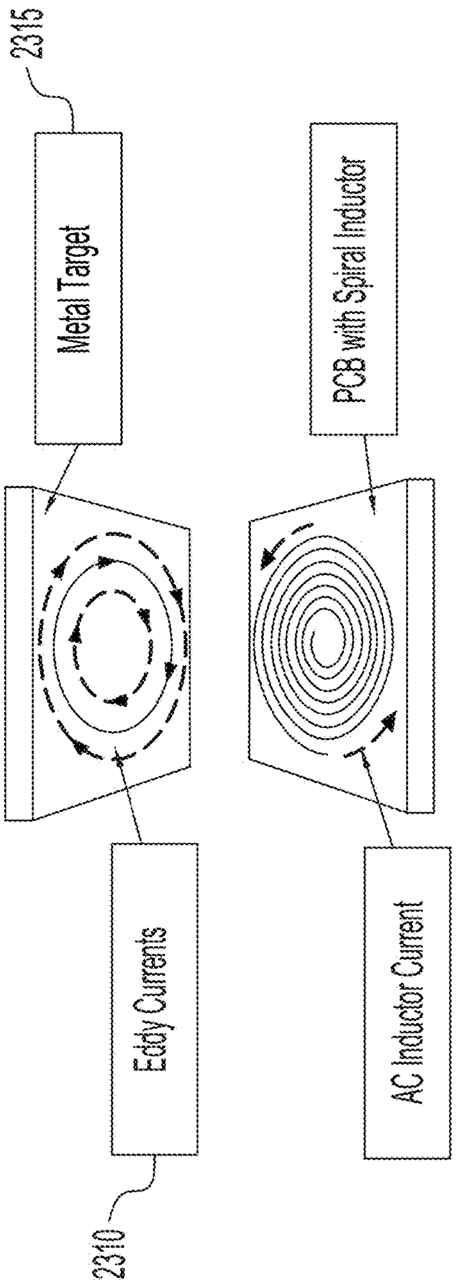

FIGS. 23A, 23B, and 23C illustrate the grinder 100 including a guard presence lockout system. The grinder that includes the guard presence sensor 215 for detecting the presence of the guard 130 on the grinder 100. In some embodiments, the guard presence sensor 215 is an electromechanical sensor (e.g., a pressure sensor) that is actuated when the guard 130 is coupled to the grinder 100 (e.g., a switch is closed when the guard 130 is attached to the grinder 100). In other embodiments, the guard presence sensor 215 is an optical sensor that, for example, detects light reflected off of the guard 130 to detect presence. In other embodiments, an inductive sensor, such as inductive sensor 400 illustrated in FIGS. 23B and 23C is used to detect the guard 130. For example, the grinder 100 may only function if the inductive sensor 400 is at a certain distance from the guard 130, depending on the material of the guard 130. For example, the inductive sensor 400 must be within a minimum to maximum distance range to allow the grinder 100 to operate. In some embodiments, the inductive sensor 400 detects the inductive response of the metal blade 150 placed in proximity to the inductive sensor. In other embodiments, the guard presence sensor 215 detects the inductive response of the guard 130 based on material type (e.g., zinc, steel, zinc-plated steel, copper, aluminum, bronze, plastic with metal film, glass with metal film, etc.), material thickness, or material geometry. In some embodiments if the guard presence sensor 215 detects that the inductive response of the guard 130 is outside a desired range, the controller 300 will halt the operation of the grinder 100.

In some embodiments, the smaller the distance from the guard presence sensor 215 and the guard 130 itself, the greater the detected inductance change will be. The reduced range between the guard presence sensor 215 and the guard 130 provides a more accurate reading of an inductance value, allowing for a more accurate reading.

In some embodiments, the grinder 100 detects the type of component connected to the grinder 100. In this embodiment, the component is the guard 130. The detection of the particular type of component connected to the grinder 100 is achieved using a sensor (e.g., an induction coil, a Hall effect sensor, an optical sensor, wireless communication, etc.) for detecting the type of component. For example, an induction coil detects if the guard 130 is coupled to the grinder 100 or if it is disconnected from the grinder 100. In one embodiment, the induction coil and a reference coil are inputs to a differential switch, which returns a binary "yes/no" or "1/0" output. The coil and reference coil can be tuned such that metal guards are detected at varying distances from the sensor input.

As illustrated in FIG. 23B, the inductive sensor 2300 includes an inductor capacitor ("LC") circuit formed by an inductor L and a capacitor C. The LC circuit is connected to an inductance-to-digital converter ("LDC") 2305, which is used to measure proximity to metal by detecting subtle changes in an alternating current ("AC") magnetic field resulting from the interaction with a metal target 2315 (e.g., the metal guard). The LDC 2305 generates an AC magnetic field by supplying an AC current into the LC circuit.

If a conductive target is brought into the vicinity of the AC magnetic field, small circulating currents (i.e., eddy currents 2310), will be induced by the magnetic field onto the surface of the conductor (shown in FIG. 23C). The eddy currents 2310 produce their own magnetic fields that oppose the magnetic field generated by the LC circuit. A resulting inductance shift is measured by the LDC 2305 and is used to provide information about the position of a metal target 2315 over a sensor coil (e.g., a distance to the metal target 2315, whether the metal target 2315 is present or not, a characteristic of the metal target 2315, etc.). In some embodiments, the inductor L is a spiral or coil inductor, as illustrated in FIG. 23C. In some embodiments, the LC circuit is located on a printed circuit board ("PCB") that is positioned within housing of the grinder 100, as illustrated in FIG. 23A.

Figure 23D:
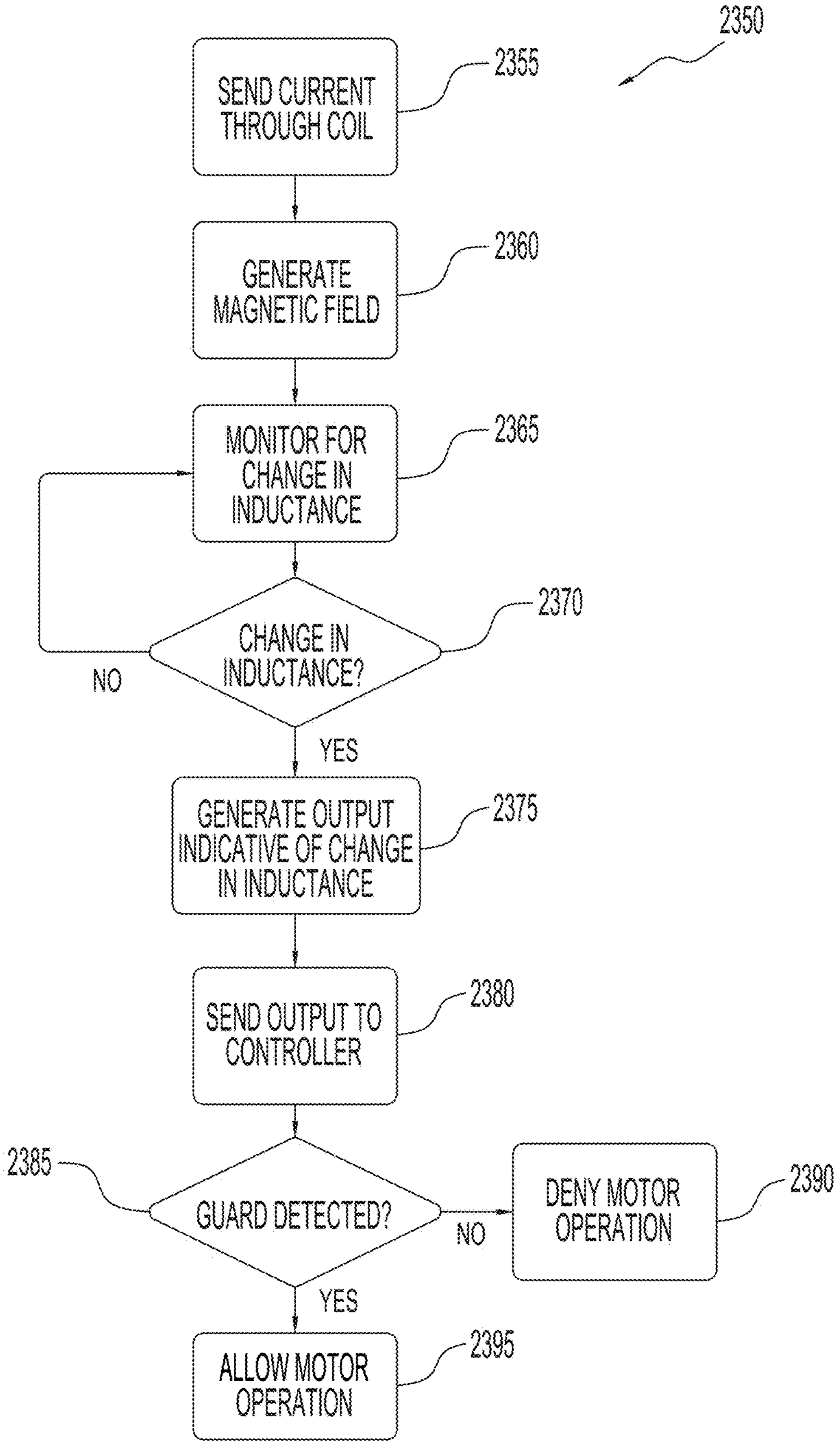
FIG. 23D illustrates a flowchart for the power tool of FIGS. 23A-23C according to some embodiments.

FIG. 23D illustrates a method 2350 to detect the presence of the guard 130 and to ensure that the guard 130 is properly attached to the grinder 100. When a user indicates an intention to use the grinder 100, a current is sent through the coil (i.e., LC circuit in FIG. 24B) (STEP 2355) to attempt to detect the presence of metal in proximity to the grinder 100. The current through the coil generates a magnetic field (STEP 2360). As described above, if a metal object is in proximity to the inductive sensor 2300, eddy currents 2310 will be induced in the metal object. These eddy currents 2310 generate their own magnetic field that opposes the magnetic field generated by the LC circuit. The magnetic field from the eddy currents 2310 causes a change in the inductance of the LC circuit. The LDC 2305 monitors for this change in inductance (STEP 2365). If no change in inductance is detected at STEP 2370, the grinder 100 will continue to monitor for a change in inductance. If a change in inductance is detected at STEP 2370, the LDC 2305 generates an output signal indicative of the change in inductance (STEP 2375). In some embodiments, the LDC 2305 continuously outputs an output signal related to the inductance of the LC circuit. A value associated with that continuous output signal then change when the inductance of the LC circuit changes. The output signal is then sent or provided to the controller 300 (STEP 2380). Based on the output signal from the LDC 2305, the controller 300 then determines whether the guard 130 is present (STEP 2385). If the guard 130 is not present (e.g., no change in inductance or not a significant enough change in inductance), the controller 300 prevents the motor 305 and grinder 100 from operating (STEP 2390). If the guard 130 is determined to be present, the controller 300 allows operation of motor 305 and grinder 100 (STEP 2395).

Figure 24:
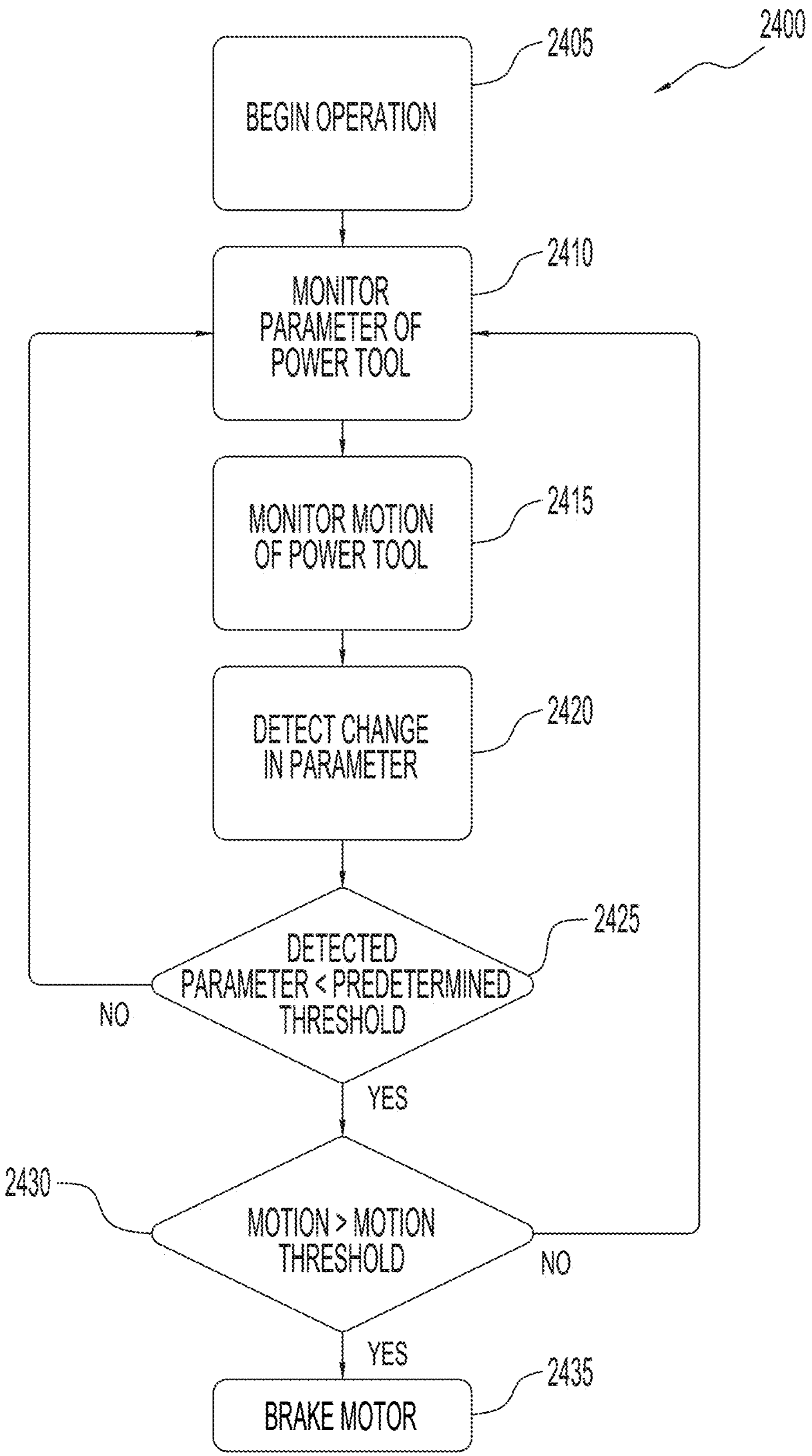
FIG. 24 illustrates a flowchart for detecting loss of control for a power tool according to some embodiments.

FIG. 24 illustrates a method 2400 for the grinder 100 which includes an accessory 150 (e.g., a grinder wheel) that can be used to grind (e.g., cut) through a workpiece (STEP 2405). The grinder 100 is configured to detect when the grinder 100 has completed a cut through a workpiece. The grinder 100 includes a sensor (e.g., a current sensor) and is configured to monitor a parameter (e.g., motor current) of the grinder 100 (STEP 2410). In some embodiments, the parameter includes the motor current of the grinder 100. For example, a high current can be indicative of the grinder being used to cut a workpiece. When the grinder cuts through the workpiece, the amount of current drawn by the motor 305 decreases. This decrease in current can be used to detect when cut through has occurred. In some embodiments, an additional sensor (e.g., a gyroscope) monitors a motion of the grinder 100 (STEP 2415). The grinder 100 detects a change in the parameter (e.g., motor current), such as a reduction in motor current or loading of the grinder 100 (STEP 2420). The controller 300 of the grinder 100 then compares the change in the parameter to a predetermined threshold (STEP 2425). If the detected parameter is greater than the predetermined threshold, the grinder continues to monitor the parameter. If the detected parameter falls to or below the predetermined threshold for the parameter, the grinder 100 determines whether the motion of the grinder 100 is greater than a motion threshold (STEP 2430). For example, the motion of the grinder below the motion threshold (e.g., a velocity, and acceleration, etc.) indicates a user may be slowly pulling the grinder 100 away from a workpiece. In such an instance, it may be undesirable to stop the motor 305. If the motion of the grinder 100 is greater than the motion threshold, the motor 305 is stopped (e.g. braked) (STEP 2435).

Figure 25:
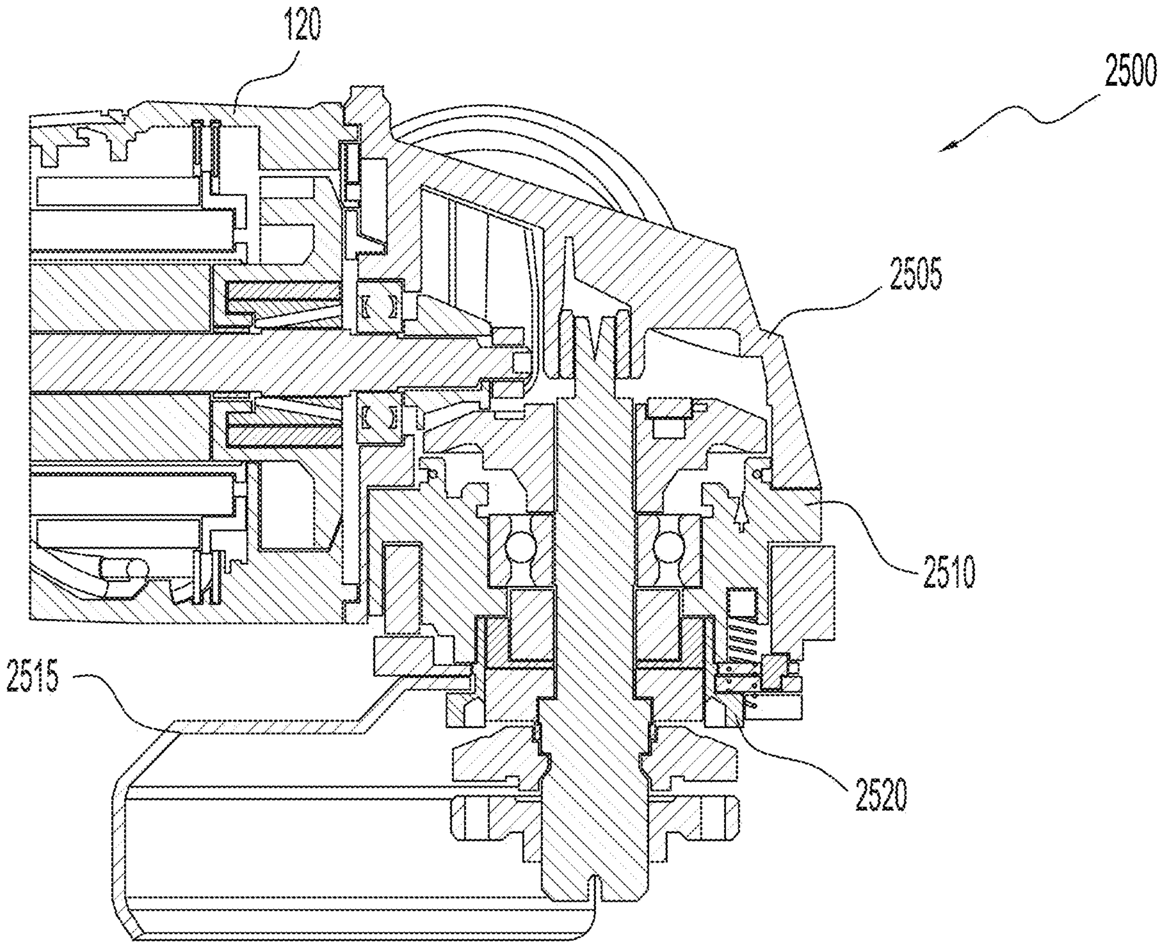
FIG. 25 illustrates a fixed wheel guard according to some embodiments.

FIG. 25 illustrates an embodiment 2500 of the grinder 100 which includes a fixed guard 2515. The fixed guard 2515 is coupled to, for example, the main tool housing 120 of the grinder 100, and is unable to be removed from the main tool housing 120 of the grinder 100 by a user. The fixed guard 2515 is used to protect a user or another object in the surrounding environment from the different accessory types that may be attached to the tool holder (e.g., a blade). In some embodiments, the fixed guard 2515 prevents a user from contacting the accessory. In some embodiments, the fixed guard 2515 provides protection against, for example, sparks.

In some embodiments, the fixed guard 2515 is permanently affixed to a gearcase 2505 including gearcase cover 2510 via a guard locking flange 2520. The gearcase cover 2510 is an outer portion of the main tool housing 120 which protects the gearcase 2505. Below both the gearcase cover 2510 and the gearcase 2505 are the fixed guard 2515 and the guard locking flange 2520.

Figure 26B:
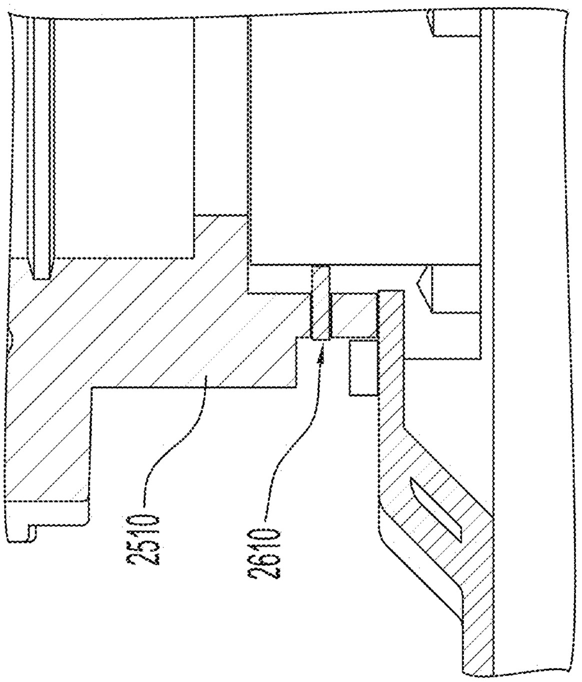
FIG. 26B illustrates a roll pin according to some embodiments.
Figure 26A:
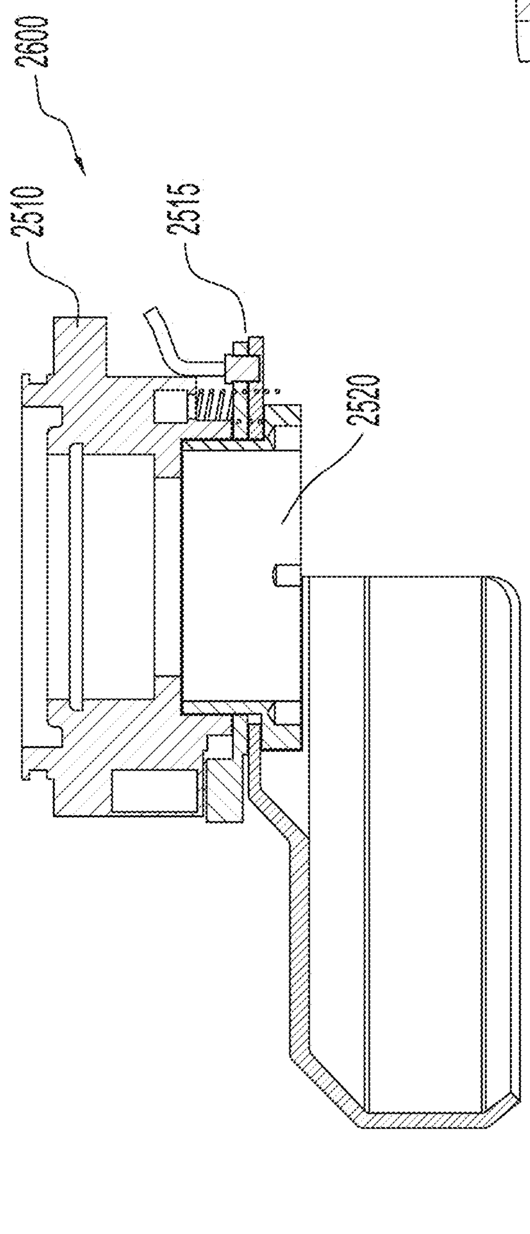
FIG. 26A illustrates a guard locking flange according to some embodiments.

FIG. 26A illustrates an embodiment 2600 of the grinder 100 to attach the fixed guard 2515 to the gearcase cover 2510 via the guard locking flange 2520. In some embodiments, a left handle thread and various torque driving features are used to attach the fixed guard 2615 to the gearcase cover 2510. In other embodiments, the guard locking flange 2520 attaches the fixed guard 2515 to the gearcase cover 2510 via a press fit into the gearcase cover 2510. FIG. 26B illustrates an additional retention feature for securing the fixed guard 2515 to the gearcase cover 2510. In some embodiments, a blind roll pin 2610 is inserted through the gearcase cover 2510 as well as the guard locking flange 2520 to further secure the gearcase cover 2510 and the guard locking flange 2520 together. In some embodiments, the blind roll pin 2610 is perpendicular to the output shaft 125 of the grinder 100.

Figure 27:
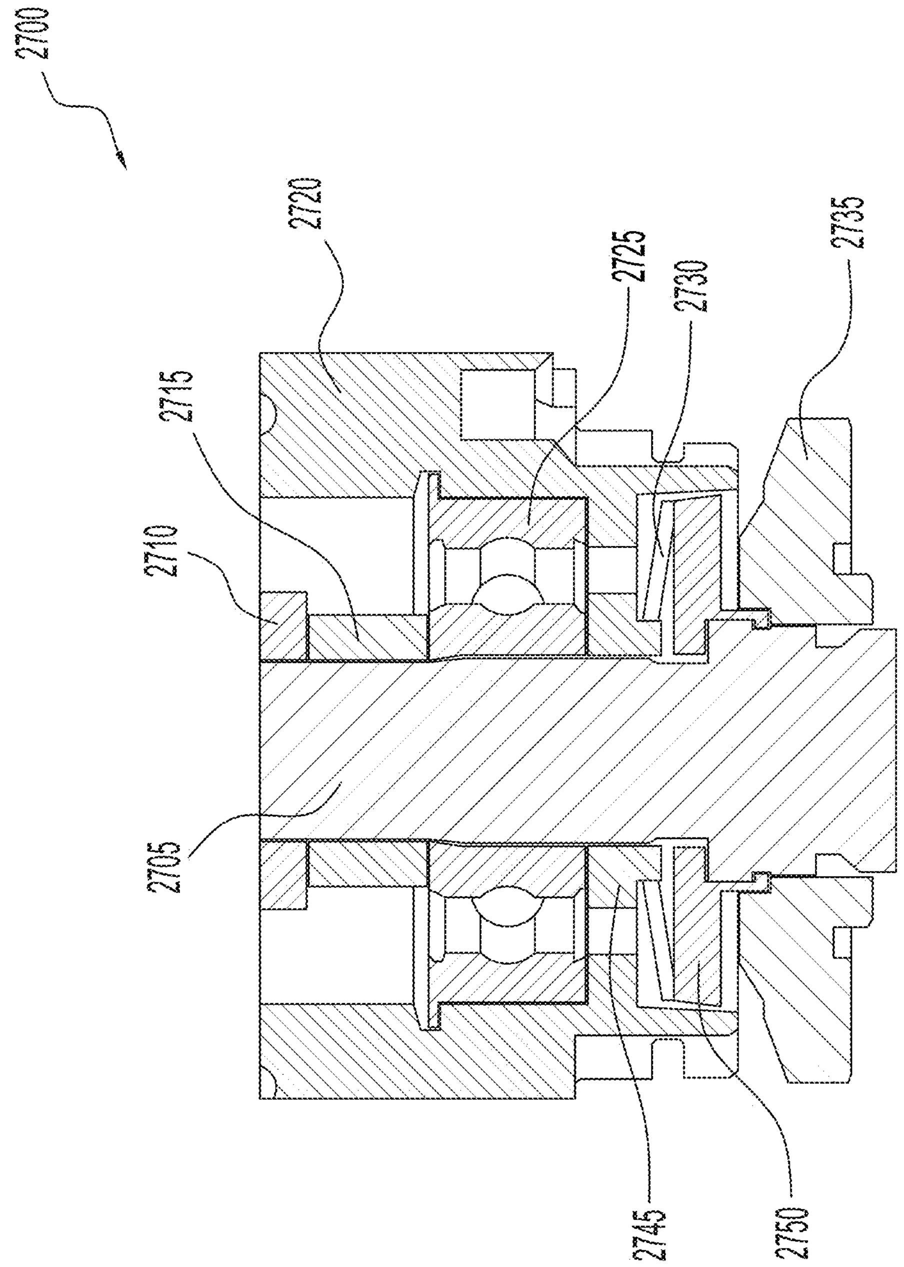
FIG. 27 illustrates a spindle locknut assembly according to some embodiments.

FIG. 27 illustrates a spindle locknut design 2700. In some embodiments, the spindle locknut design 2700 includes a spacer 2745. The spacer 2745 includes a reduced thickness relative to conventional designs of a spindle locknut assembly. This reduced thickness allows the spindle locknut design 2700 to position a ball bearing 2725 close to the blade 150 when it is secured to a spindle shaft 2705. The ball bearing 2725 then supports the spindle shaft 2705 to reduce vibrations imparted to the spindle shaft 2705 by the blade 150 during a user's operation of the grinder 100. In some embodiments, the ball bearing 2725 supporting the spindle shaft 2705 also protects the grinder 100's components, allowing the grinder 100 to function for a longer period of time and reducing the chances that the grinder 100 will frequently require repairs.

The spindle locknut design 2700 further includes at least one disc spring 2730 positioned between the ball bearing 2725 and a spindle flange 2740 to bias the spacer 2745 into engagement with the ball bearing 2725. In some embodiments, the spacer 2745 and the ball bearing 2725 are coupled due to the disc spring 2730 being positioned between the ball bearing 2725 and the spindle flange 2740. Furthermore, another spacer 2715 is positioned between a bevel gear 2710 and the ball bearing 2725 to account for the ball bearing 2725 being positioned closer to an outboard end of the spindle shaft 2705, the bevel gear 2710 being directly above the spacer 2715. The spindle shaft 2705 is driven about a longitudinal axis by the bevel gear 2710. In some embodiments, the spindle locknut design 2700 further includes a locking flange 2735. The blade 150 is positioned between the spindle flange 2740 and the locking flange 2735, and is secured to the spindle shaft 2705 by tightening the locking flange 2735 on the spindle shaft 2705 (e.g., using threads). The locking flange 2735 firmly secures spindle flange 2740 against the spacer 2745, which ensures that the ball bearing 2725 fixed against the other spacer 2715 allowing the spacer 2715 to properly be positioned against the bevel gear 2710. This embodiment reduces unnecessary and unwanted vibrations or movement that could cause damage to the components of the grinder 100 and allows for smoother operation of the grinder 100.

Figure 28:
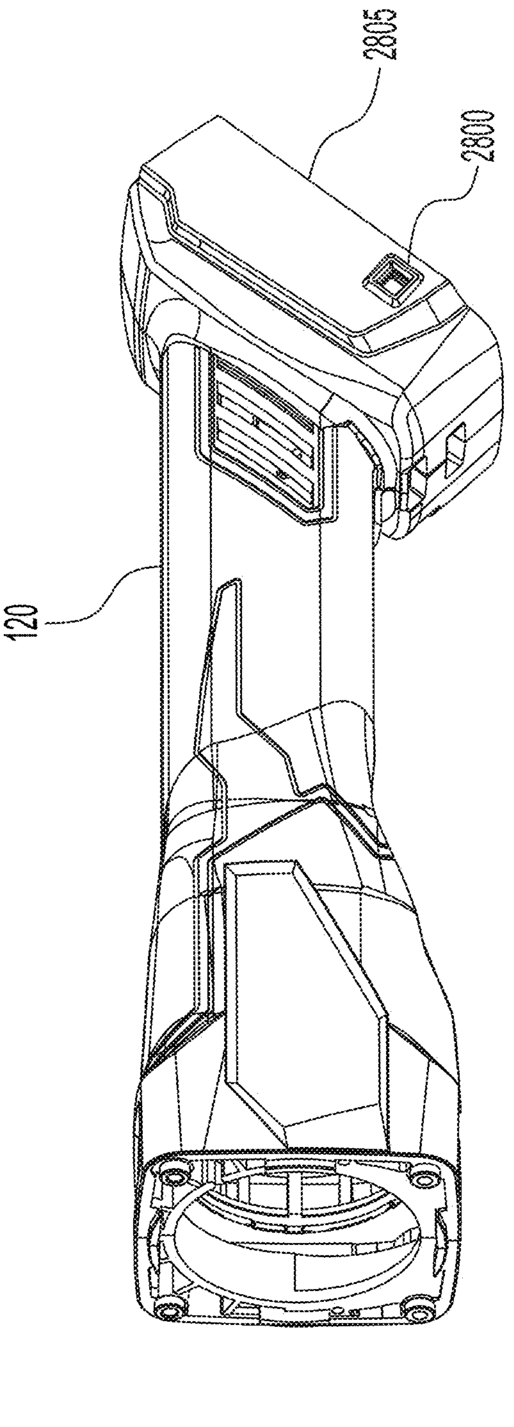
FIG. 28 illustrates a power tool including lanyard integration according to some embodiments.

FIG. 28 illustrates an embodiment for the main tool housing 120. The main tool housing 120 includes a lanyard integration assembly. The lanyard integration assembly includes a lanyard interface 2800 affixed to or built into the surface of the main tool housing 120. In some embodiments, the lanyard interface 2800 is located by the rear of the grinder 100, directly above a battery pack interface 2805. The lanyard interface 2800 includes a component (e.g., a loop, a hook, etc.) that is operable to attach a lanyard to the lanyard interface 2800. By attaching a lanyard to the grinder 100, the grinder 100 is less susceptible to dropping or damage because the lanyard can secure the grinder 100 to a user (e.g., a belt).

Figure 29:
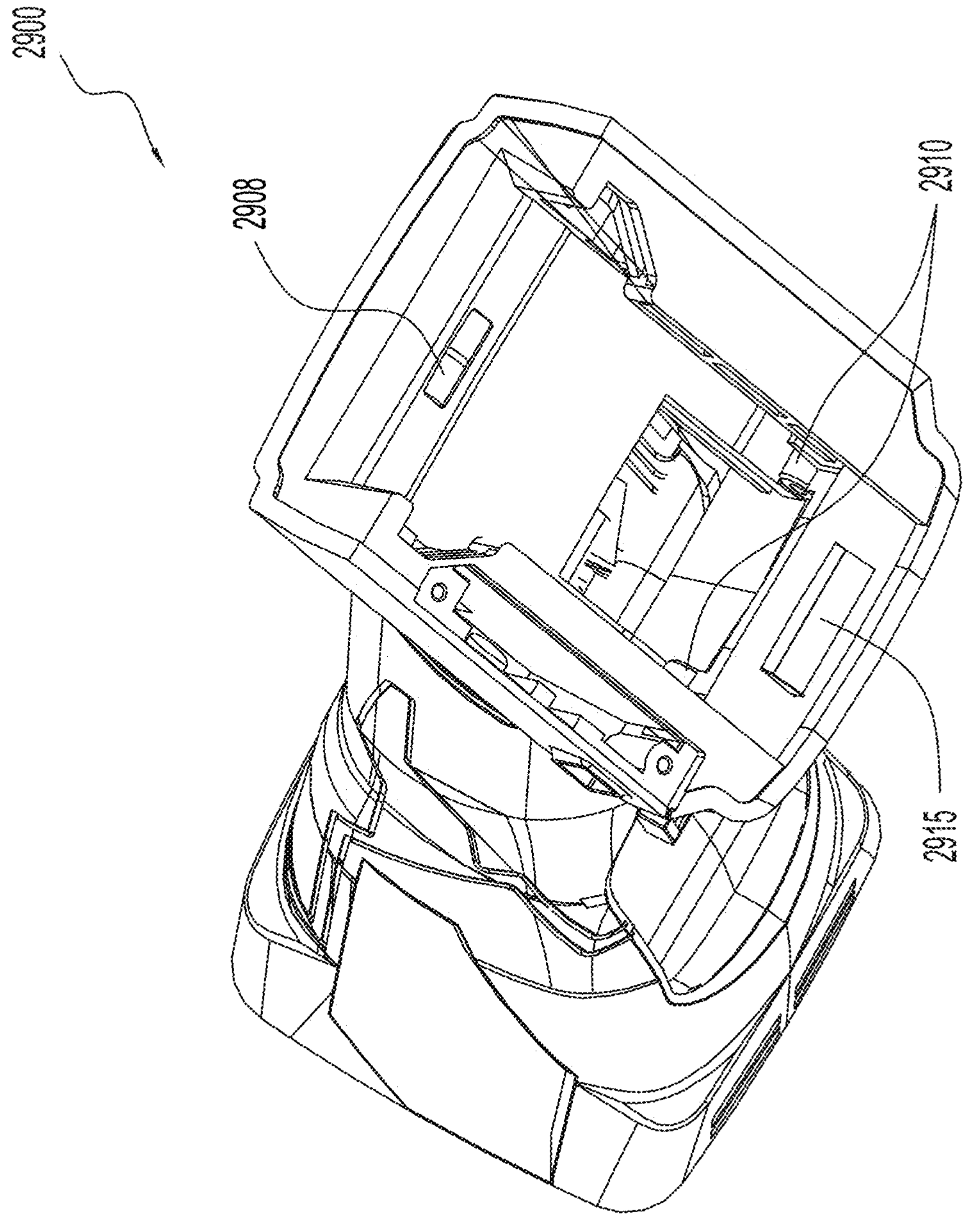
FIG. 29 illustrates a power tool including battery isolation according to some embodiments.

FIG. 29 illustrates an embodiment 2900 of a battery pack interface that includes battery pack isolation features. During operation, the grinder 100 may generate aggressive vibrational forces, so it is advantageous to isolate the vibrational forces within the grinder 100 so that the vibrational forces do not propagate to an attached battery pack. Excess vibrational forces exerted on the battery pack can limit the life cycle of the battery pack (e.g., loosen electrical connections, etc.). The battery pack interface 310 of the grinder 100 includes a plurality of front isolators 2905 (e.g., cylindrical isolators) and rear isolators 2910 (e.g., cylindrical isolators). The front isolators 2905 are positioned on a front end of the battery pack interface 310, and the rear isolators 2910 are positioned on a rear end of the battery pack interface 310. By having both the front isolators 2905 and the rear isolators 2910, the battery pack experiences vibrational isolation on either side of the battery pack. The battery pack interface 310 further includes a rear ramp 2915. The rear ramp 2915 is used to secure the battery pack to the battery pack interface 310 and press the battery pack against the isolators 2905, 2910.

Figure 30:
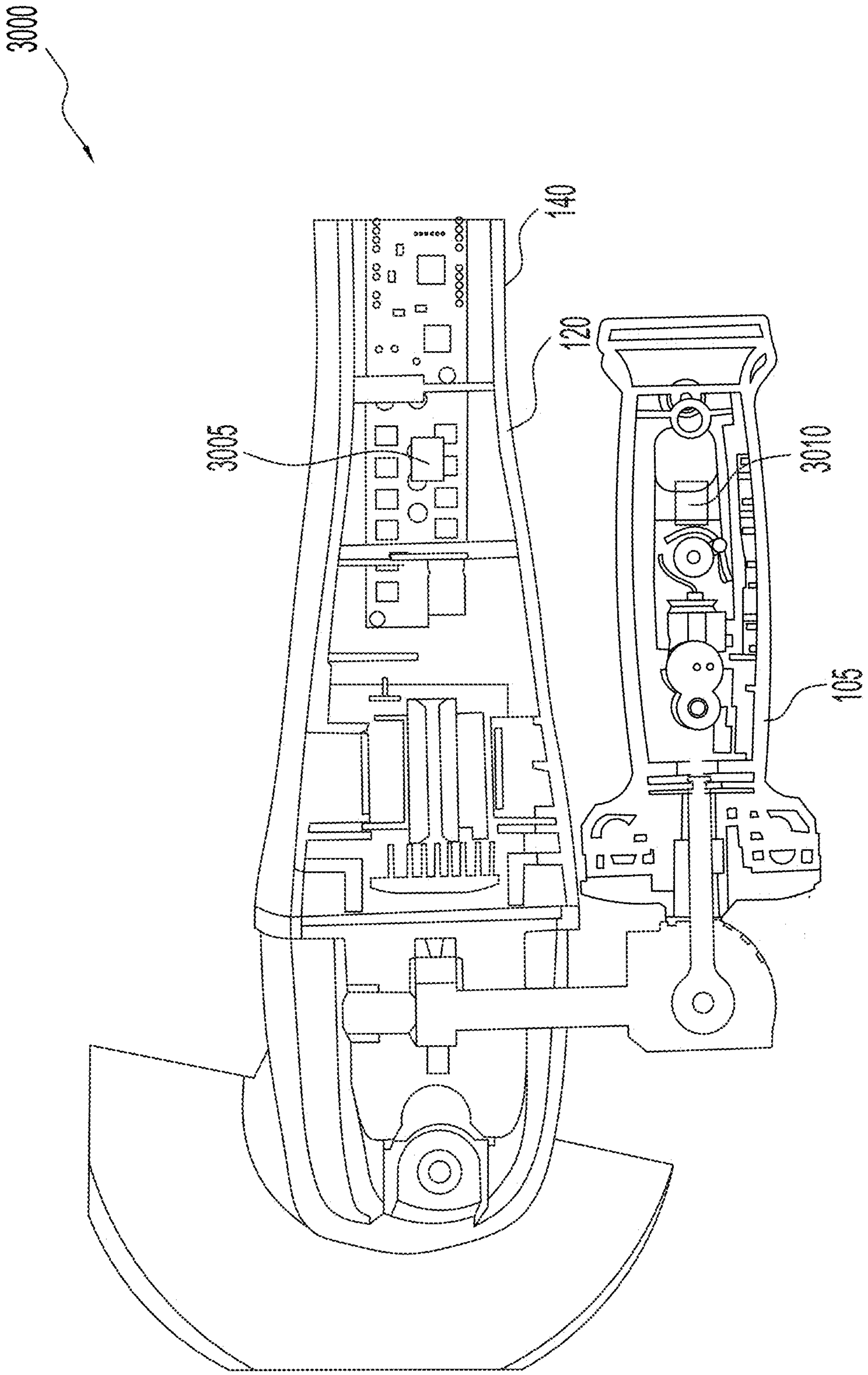
FIG. 30 illustrates a power tool including an adjustable side handle in wireless communication with a power tool main housing according to some embodiments.

FIG. 30 illustrates an embodiment of the grinder 100 including the second handle 105 and a wireless communication system 3000. The wireless communication system 3000 includes a wireless receiver 3005 within the main tool housing 120. In some embodiments, the wireless receiver 3005 is part of the controller 300. In some embodiments, the wireless receiver 3005 is separate from the controller 300. The second handle 105 includes a wireless transmitter 3010. The wireless transmitter is configured to wirelessly communicate with the wireless receiver 3005. The wireless transmitter 3010 is electrically connected to the microswitch sensor 608 which is configured to mechanically contact the first over-mold portion 403, as previously described. In some embodiments, when the microswitch sensor 608 detects the presence of a hand, the wireless transmitter 3010 transmits a signal to the wireless receiver 3005. In this embodiment, the wireless transmitter 3010 and wireless receiver 3005 perform the same functions as the previously described second handle 105 without the need for a wired connection. In some embodiments, the second handle 105 includes a power source (e.g., a battery, a coin cell battery, etc.) for powering the transmitter 3010.

Figure 31:
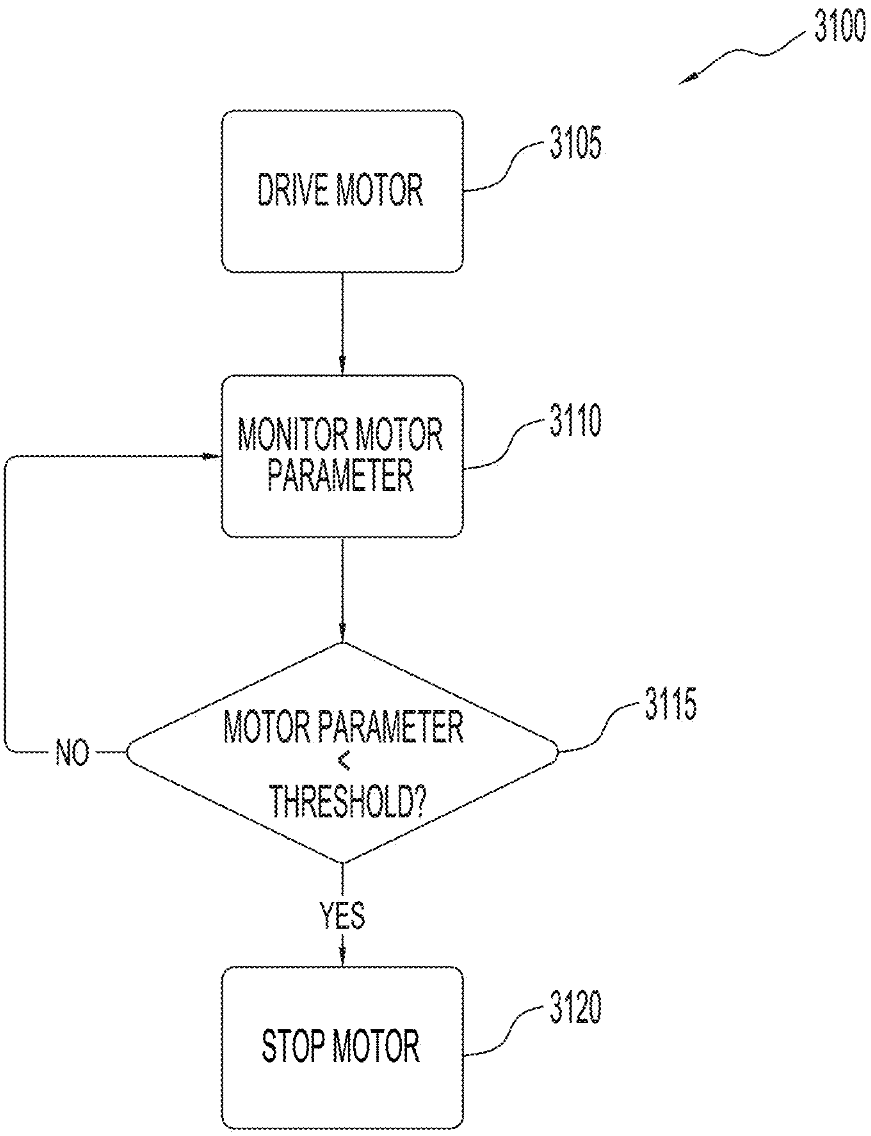
FIG. 31 illustrates a flowchart for detecting cut-through for a power tool according to some embodiments.

FIG. 31 illustrates a method 3100 for the grinder 100. In some embodiments, the method 3100 is referred to as cut-through breaking. For example, the method 3100 may include monitoring operation of the grinder 100 such that when the controller 300 detects that the accessory 150 has completed a cutting operation, the controller 300 stops driving the motor 210. The method 3100 begins at step 3105, where the grinder 100 is being operated by a user and the motor 210 is being driven. The method 3100 includes step 3110 where a parameter of the grinder 100 is monitored. For instance, in some embodiments, a current sensor monitors a current of the motor 305. The current sensor generates data associated with the current of the motor 305, and transmits the data to the controller 300. If, at step 3115, the motor parameter is less than a threshold value (e.g., motor current is less than a threshold value), the motor is stopped at step 3120 (e.g., indicating that cut-through has occurred). If the motor parameter is greater than or equal to the threshold, the controller 300 continues to monitor the motor parameter at step 3110.

Thus, embodiments described herein provide, among other things, systems and methods for a grinder with enhanced sensing and component detection. Various features and advantages are set forth in the following claims.

What is claimed is:

1. A grinder comprising:

a housing;

a motor within the housing;

a first handle including a first sensor configured to detect a presence of a user, the first handle attached to the housing;

a second handle attached to a pivot arm, the pivot arm attached to the housing and configured to be pivoted around a circumference of the housing, the second handle including a second sensor configured to detect the presence of the user; and a controller configured to:

determine a type of component coupled to the grinder based upon data detected via at least one sensor, and control the motor based upon a first output of the first sensor, a second output of the second sensor, and the type of component coupled to the grinder by:

controlling an action of the motor based upon the type of component coupled to the grinder, and preventing the motor from operating in response to at least one of the first sensor or the second sensor not detecting the presence of the user.

2. The grinder of claim 1, wherein the pivot arm further includes a locking mechanism, the locking mechanism configured to lock the pivot arm into one of a plurality of different positions around the circumference of the housing.

3. The grinder of claim 1, wherein the second sensor includes a microswitch sensor connected to a printed circuit board, the microswitch sensor configured to detect the presence of a second hand of the user.

4. The grinder of claim 3, wherein:

the first sensor is configured to detect a first hand of the user; and the controller is configured to prevent the motor from operating when the first sensor does not detect the first hand of the user and the second sensor does not detect the second hand of the user.

5. The grinder of claim 1, wherein the pivot arm further includes a wire routing portion through which wires are routed from the second handle to the housing.

6. The grinder of claim 5, wherein the wire routing portion includes a first channel within the pivot arm and a second channel that extends into the housing.

7. The grinder of claim 1, the grinder further comprising:

a wireless transmitter inside the second handle; and a wireless receiver inside the first handle, wherein the wireless transmitter is configured to transmit a signal when the second sensor detects the presence of the user, and wherein the wireless receiver is configured to receive the signal and communicate to the controller that that the second sensor has detected the presence of the user.

8. The grinder of claim 1, wherein the data detected via the least one sensor includes data detected via a wireless communication sensor or data detected via an optical sensor.

9. The grinder of claim 1, wherein the data detected via the at least one sensor includes a machine-readable code.

10. The grinder of claim 1, wherein the data detected via the at least one sensor includes a serial number.

11. The grinder of claim 1, wherein the data detected via the at least one sensor includes data communicated via the component.

12. A grinder comprising:

a housing;

a motor located within the housing;

a first handle including a first sensor configured to detect a presence of a first hand of a user;

a second handle attached to a pivot arm, the pivot arm attached to the housing and configured to be pivoted around a circumference of the housing, the second handle including a second sensor configured to detect a presence of a second hand of the user;

a pivot mechanism attached to the pivot arm and configured to pivot the second handle into one of a plurality of different positions with respect to the pivot arm; and a controller configured to:

detect a type of component coupled to the grinder based upon data communicated via a component type indicator included in the component, modify a control setting of the motor based upon the detected type of component coupled to the grinder, and control the motor based upon the modified control setting, a first output of the first sensor, and a second output of the second sensor, wherein the controller prevents the motor from operating when the second sensor does not detect the presence of the second hand of the user.

13. The grinder of claim 12, wherein the pivot arm further includes a locking mechanism, the locking mechanism configured to lock the pivot arm into one of a plurality of different positions around the circumference of the housing.

14. The grinder of claim 13, wherein the plurality of different positions around the circumference of the housing includes a left-handed position and a right-handed position.

15. The grinder of claim 12, wherein the plurality of different positions with respect to the pivot arm include at least two discrete positions.

16. The grinder of claim 12, wherein the pivot arm further includes a wire routing portion through which wires are routed from the second handle to the housing.

17. The grinder of claim 16, wherein the wire routing portion includes a first channel within the pivot arm and a second channel that extends into the housing.

* * * * *